(12) United States Patent
Kimoto

(10) Patent No.: US 8,340,178 B2
(45) Date of Patent: Dec. 25, 2012

(54) MOVING IMAGE ENCODER AND MOVING IMAGE DECODER, AND ITS METHOD AND PROGRAM

(75) Inventor: Takahiro Kimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 1692 days.

(21) Appl. No.: 11/628,777

(22) PCT Filed: Jun. 10, 2005

(86) PCT No.: PCT/JP2005/010680
§ 371 (c)(1),
(2), (4) Date: Dec. 7, 2006

(87) PCT Pub. No.: WO2005/122591
PCT Pub. Date: Dec. 22, 2005

(65) Prior Publication Data
US 2008/0049835 A1 Feb. 28, 2008

(30) Foreign Application Priority Data
Jun. 11, 2004 (JP) ................................. 2004-173296

(51) Int. Cl.
*H04N 7/12* (2006.01)
(52) U.S. Cl. ................................................ 375/240.11
(58) Field of Classification Search ............. 375/240.01, 375/240.28; *H04N 7/12*
See application file for complete search history.

(56) References Cited

U.S. PATENT DOCUMENTS
5,659,363 A 8/1997 Wilkinson
6,907,075 B2 6/2005 Felts et al.
(Continued)

FOREIGN PATENT DOCUMENTS
EP 1294196 A2 3/2003
(Continued)

OTHER PUBLICATIONS

Takahiro Kimoto et al., 3-D Wavelet Transformation With Perfect Reconstruction on Spatial Scalability (PCSJ2003), IEICE 18$^{th}$ Symposium, Nov. 14, 2003, pp. 51-52.
Seung-Jong Choi et al., "Motion-Compensated 3-D Subband Coding of Video," IEEE Transactions on Image Processing, vol. 8:2, Feb. 1999, pp. 155-167.
(Continued)

*Primary Examiner* — Gims Philippe
(74) *Attorney, Agent, or Firm* — Foley & Lardner LLP

(57) ABSTRACT

In a time/space-division filtering, a moving image signal in a certain resolution-hierarchy, for which time hierarchizing is performed, is divided into a time low-band signal and a time high-band signal. A moving image signal, which has the moving image signal corresponding to the time high-band signal reconstructed by employing the time low-band signal and the time high-band signal, is generated. A reduced image signal having the moving image signal reduction-processed is generated. A high-band generating process by space hierarchizing is performed for the time high-band signal, thereby to generate a time high-band/space high-band signal. The time low-band signal, the reduced image signal, and the time high-band/space high-band signal are assumed to be a division result respectively. The time/space-division filtering is recursively performed for the time low-band signal that is assumed to be a moving image signal of which the time-resolution is lower by one stage, and the reduced image signal that is assumed to be a moving image signal of which the space-resolution is lower by one stage, thereby to hierarchize the moving image signal in a multi-step.

42 Claims, 40 Drawing Sheets

U.S. PATENT DOCUMENTS

| | | | |
|---|---|---|---|
| 6,944,225 B2* | 9/2005 | Li | 375/240.19 |
| 7,227,898 B2* | 6/2007 | Yanagihara et al. | 375/240.16 |
| 2003/0026341 A1 | 2/2003 | Li | |

FOREIGN PATENT DOCUMENTS

| | | |
|---|---|---|
| JP | 7-284108 | 10/1995 |
| JP | 2004-502358 A | 1/2004 |
| WO | WO 02/097734 A2 | 12/2002 |

OTHER PUBLICATIONS

Jens-Ranier Ohm, "Three-Dimensional Subband Coding with Motion Compensation," IEEE Transactions on Image Processing, vol. 3:5, Sep. 1994, pp. 559-571.

Takahiro Kimoto et al., Multi-Resolution MCTF for 3D Wavelet Transformation in Highly Scalable Video, International Organisation for Standardisation, ISO/IEC JTC1/SC29/WG11, Coding of Moving Pictures and Audio, Jul. 2003, 7 pages.

* cited by examiner

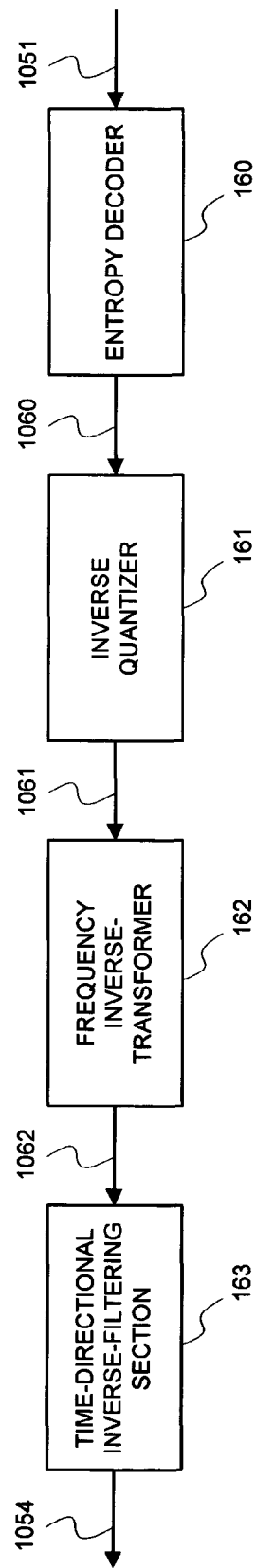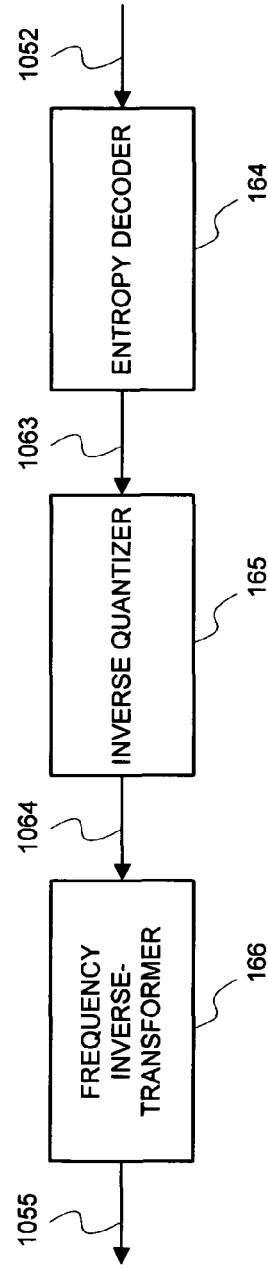

MOVING IMAGE ENCODER AND MOVING IMAGE DECODER, AND ITS METHOD AND PROGRAM

APPLICABLE FIELD IN THE INDUSTRY

The present invention relates to a moving image coding method, a moving image decoding method, a moving image coding apparatus, a moving image decoding apparatus and a computer program.

BACKGROUND ART

A subband coding method is a method of frequency-dividing an image signal, thereby to perform a coding process for signals (subband signals) in respective frequency bands. The subband coding is characterized in producing no block distortion in principle differently from a block-based orthogonal transform such as a discrete cosine transform, and in addition hereto, allowing hierarchy coding to be easily realized by recursively dividing a low-band component. The subband coding employing a wavelet transform for JPEG 2000, being the international coding standard, is adopted for a stationary image.

In a case of applying the subband coding for the moving image coding, not only a correlation in a spatial direction of signals, but also a correlation in a time direction thereof has to be taken into consideration. Conventionally, the sunband MC (Motion Compensation) has been studied of, after performing a subband division for a raw signal, removing the time-directional correlation by performing a motion compensation foe each subband region. However, there exists in the subband MC the problem that a predictive efficiency is bad in the high-band subband and a coding performance is low. To cope therewith, the three-dimensional wavelet coding has been developed for performing a subband coding for each frame after performing a time filtering, which accompanies the motion compensation in a spatial region, for the raw image to remove the time-directional correlation.

Hereinafter, a technology of the typical three-dimensional wavelet coding will be explained (for example, non-patent document 1).

Each of FIG. 18 to FIG. 21 is a view for explaining the three-dimensional wavelet coding shown in the non-patent document 1. FIG. 18 is a block diagram illustrating a configuration of a coding unit in the three-dimensional wavelet coding. Hereinafter, a flow of the process of the three-dimensional wavelet coding will be explained by employing FIG. 18.

A time-directional filtering section 201 performs a wavelet transform accompanying the motion compensation in the time direction for input image signals 2000, which are comprised of N sheets (N is the power of 2) of consecutive frames, thereby to generate N/2 sheets of time low-band subband signals 2001, N/2 sheets of time high-band subband signals 2002 and movement information 2003. The time-directional filtering in the time-directional filtering section 201 is recursively performed for the time low-band subband signals 2001 out of them. The subband division is performed in the spatial direction for one sheet of the time low-band subband signals 2004 and (N−1) sheets of the time high-band subband signals 2002 generated in the multi-staged time-filtering process, respectively.

A spatial sunband divider 202 horizontally and vertically performs a subband division for the time high-band subband signal 2002 into two respectively, and generates one time high-band/space low-band subband signal 2005 and three time high-band/space high-band subband signals 2006. The time high-band/space low-band sunband-signal 2005 out of them is recursively divided by the spatial subband divider 202. After performing a subband division in the spatial direction only the specified number of times in such a manner, the time high-band/space low-band subband signal 2005 and the time high-band/space high-band subband signal 2006 are quantized by quantizer 204.

The spatial subband division is performed for a time low-band subband signal 2004 as well in a multi-stage by a spatial subband divider 203, and a time low-band/space low-band subband signal 2007 and a time low-band/space high-band subband signal 2008 are quantized by a quantizer 204. Respective quantized signals are entropy-coded by an entropy coder 205.

In addition hereto, a movement-information coder 206 codes the movement information 2003 generated by the time filtering section 201. Respective coded signals, which are multiplexed by a multiplexer 207, are output as a bitstream 2010.

FIG. 19 is a conceptual view illustrating the subband division in the high-order time direction and spatial direction in the three-dimensional wavelet coding. An input signal 2011 is divided into a tertiary time low-band subband signal 2015 and a tertiary time high-band subband signal 2016, a secondary time high-band subband signal 2014, and a primary time low-band subband signal 2012 and a primary time high-band subband signal 2013 with the three-staged time-filtering.

The tertiary time low-band subband signal 2015 is divided into a tertiary time low-band/space low-band subband signal 2017, tertiary time low-band/space high-band subband signals 2018, 2019, and 2020, and secondary time low-band/space high-band subband signals 2021, 2022, and 2023, and primary time low-band/space high-band subband signals 2024, 2025, and 2026 with the three-staged spatial subband division.

The time high-band subband signal 2016 is divided into a tertiary time high-band/space low-band subband signal 2027, tertiary time high-band/space high-band subband signals 2028, 2029, and 2030, and secondary time high-band/space high-band subband signals 2031, 2032, and 2033, and primary time high-band/space high-band subband signals 2034, 2035, and 2036 with the three-staged spatial subband division.

In a case of reconfiguring the image signal having a spatial resolution or a frame rate, which is different from that of the input image signal, from the bitstream, the decoding unit decodes only one part out of coded data of a plurality of subband signals that are contained in the bitstream.

The process of extracting the coded data of the subband signals will be explained according to FIG. 19.

So as to reconfigure the moving image of which the frame rate is half, the decoding unit decodes the coded data that corresponds to the time low-band subband signal 2015 and the time high-band subband signals 2016 and 2014. So as to reconfigure the moving image of which the resolution is half, the decoding unit decodes 2023 from the subband signals except the primary time low-band/space high-band subband signal, i.e., the time low-band/space low-band subband signal 2017 and the time low-band/space high-band subband signal 2018, out of the time low-band subband signals.

In addition hereto, the decoding unit decodes 2033 from the subband signals except the primary time high-band/space high-band subband signal, i.e., the time high-band/space low-band subband signal 2027 and the time high-band/space high-band subband signal 2028, out of the time high-band sunband signals.

FIG. 20 is a block diagram illustrating configurations of the coded-data extracting apparatus for extracting the coded data that corresponds to the reduced image from the bitstream generated with the three-dimensional wavelet coding, and the moving image decoding apparatus.

The coded-data extracting apparatus discards a space high-band subband signal 2038 of which the order is lower than that of a bitstream 2010, generates a bitstream 2037 that is comprised of the coded data of the suitable subband signal, and transmits it to a moving image decoding apparatus 209. The moving image decoding apparatus 209 synthesizes the subband signals that are contained in the bitstream 2037, and outputs a decoded-image signal 2047.

FIG. 21 is a block diagram illustrating a configuration of the moving image decoding apparatus 209. A flow of the decoding process in the three-dimensional wavelet decoding will be explained by employing FIG. 21.

An inverse multiplexer 210 cuts out the coded data of the subband signal from the bitstream 2037, and generates a time high-band/space high-band subband signal 2039, a time high-band/space low-band subband signal 2040, a time low-band/space high-band subband signal 2041, and a time low-band/space low-band subband signal 2042 through an entropy decoder 211 and an inverse quantizer 212.

A spatial subband synthesizer 213 performs a subband synthesis for the time high-band/space high-band subband signal 2039 and the time high-band/space low-band subband signal 2040 recursively, and generates a time high-band subband signal 2043.

A spatial subband synthesizer 214 performs a subband synthesis for the time low-band/space high-band subband signal 2041 and the time low-band/space low-band subband signal 2042 recursively, and generates a time low-band subband signal 2044. Herein, the number of times of the spatial subband synthesizing process, which is smaller than that of the spatial subband dividing process performed in the coding unit, is decided by the space high-band subband signal discarded by the coded-data extracting apparatus 208.

In addition hereto, a motion-information decoder 215 decodes the motion information output by the inverse multiplexer 210, and generates movement information 2045. A vector reducer 216 reduces a vector length of the motion information 2045 according to a resolution ratio of the input signal at the time of coding to the decoded image signal that is output from the decoding unit. This ratio is decided by the number of the space high-band subband signal discarded by the extracting apparatus 208. For example, in a cased where the space high-band subband signal of which the order is lowest has been discarded, the vector length is reduced to a half.

Thereafter, a time-directional inverse-filtering section 217 performs an inverse transform of the time filtering at the time of coding for the time high-band subband signal 2043 and the time low-band subband signal 2044 according to a motion information 2046 output by the vector reducer 216, and generates a decoded signal 2047.

[Non-patent document 1] J.-R. Ohm, "Three-dimensional subband coding with motion compensation", IEEE Trans. Image Processing, vol. 3, pp. 559-571, September 1999

DISCLOSURE OF THE INVENTION

Problems to be Solved by the Invention

There exists in the three-dimensional wavelet coding, being the prior art, the problem that the image quality of the reduced-resolution image, which is obtained by applying spatial scalability, is inferior as compared with the image quality at the time of coding with the pre-reduced image assumed to be an input. There are three reasons for it.

The first reason lies in mismatching in the motion compensation. The process for predicting the motion compensation in block unit based upon the motion information is contained in the time-directional filtering of the time-directional filtering section 201 of the moving image coding apparatus shown in FIG. 18, and the time-directional inverse-filtering of the moving image decoding apparatus shown in FIG. 21. In a case where the precision of the motion information is of decimal fraction, the pixel value that is obtained in the predicting process is obtained by interpolation-processing the neighboring pixel values. When the reduced image is generated in the decoding unit, the interpolating process at the time of predicting the motion compensation is performed for the space low-band subband signal based upon the reduced vector. An interpolating filter at this time is decided irrespectively of an interpolating process that the time-directional filtering section 201 performs at the time of coding, and a low-band pass filter in the spatial subband divider 203. As a rule, the result that is obtained by subsampling the input signal at the time of coding after interpolation-processing it, and the result that is obtained by interpolation-processing the subsampled space low-band subband signal do not coincided with each other. An inconsistency of the predicting process in the motion compensation between the coding apparatus and the decoding apparatus gives rise to occurrence of distortion in the decoded signal. This distortion is accumulated to an extent at which the time-directional filtering has to be performed in a multi-stage.

Each of FIG. 22 and FIG. 23 is a specific example of the conceptual view illustrating a one-directional pixel array and a filter coefficient by which each pixel is multiplied in order to explain that the interpolating process of the motion compensation and the subsampling process are not commutable with each other. In the following explanation, it is assumed that a Haar wavelet is employed for the subsampling process, and a six-tap filter for the interpolating process.

In FIG. 22 and FIG. 23, p0 to p11, and p0' to p5', being marks on a traverse axis, signify the pixel, and marks on a longitudinal axis extending from each ordinate signify the filter value by which the pixel is multiplied, respectively. The filter values that are employed for calculating a pixel value q4 at the position shifted ½ from the pixel p4, and a pixel value q5 at the position shifted ½ from the pixel p5 are shown in the upper part of FIG. 22, respectively. Upon assuming the interpolating filters to be B0 to B6, it follows that $$q4 = B0*p2 + B1*p3 + B2*p4 + B3*p5 + B4*p6 + B5*p7$$

$$q5 = B0*p3 + B1*p4 + B2*p5 + B3*p6 + B4*p7 + B5*p8$$

The interpolating value in the reduced resolution that is obtained from q4 and q5 with the subsampling process becomes the value shown in the lower part of FIG. 22, i.e.

$$(q4+q5)/2 = B0/2*p2 + (B0+B1)/2*p3 + (B1+B2)/2*p4 + (B2+B3)/2*p5 + (B3+B4/2*p6 + (B4+B5)/2*p7 + B5/2*p8$$

With pixels p0' to p5' obtained by performing a subsampling process for p0 to p11, the filter value that is employed for calculating a pixel value q2' at the position shifted ¼ from the pixel p2' is shown in the upper part of FIG. 23. Upon assuming the interpolating filters to be C0 to C6, it follows that $$q2' = C0*p0' + C1*p1' + C2*p2' + C3*p3' + C4*p4' + C5*p5'$$

where it is assumed that the subsampling process has been performed in such a manner that $$p2'=(p4+p5)/2$$

Upon employing p0 to p11 for expressing p2' as shown in the lower part of FIG. 23, it follows that $$q2'=C0/2*p0+C0/2*p1+C1/2*p2+C1/2*p3+C2/2*p4+C2/2*p5+C3/2*p6+C3/2*p7+C4/2*p8+C4/2*p9+C5/2*p10+C5/2*p11$$

As a rule, the interpolating filter is decided independently of the subsampling process, whereby (q4+q5)/2 and q2' do not coincide with each other.

The second reason lies in an overhead of the motion information. In the moving image decoding apparatus in FIG. 21, the motion information needs to be identical to one generated at the time of coding. The identical motion information is allocated over the reduced resolution as well, whereby size of the coding block that becomes a unit of the motion compensating process, and the precision of the motion information are fined more than need. When a transfer route from the coded-data extracting apparatus to the moving image decoding apparatus is limited in FIG. 20, in some cases, the code quantity necessary for the motion information occupies a large part thereof, and even a minimum code quantity cannot be allocated to the coefficient information.

FIG. 24 is a conceptual view for explaining an overhead of the motion information. In FIG. 24, a motion information group obtained by motion-estimating frames B0 and C0 is called MV0, and a motion information group obtained by motion-estimating frames B1 and C1 obtained by subsampling the frames B0 and C0 respectively is called MV1. The minimum size of the block by which the motion information is allocated and the precision of the motion information have been decided in the motion estimation. In a case of reducing size of the motion information group MV0 to a half so as to match the frames B1 and C1, the minimum size of the block becomes half, and the precision of the motion information becomes double. The reduced motion information group MV0 is numerous in the number of pieces of motion information and yet is also much in code quantity necessary for expressing individual motion information as compared with the motion information group MV1.

The problem of scalability exists as the third reason. In the three-dimensional wavelet coding, parameters and processing modules employed in the coding unit are identical in the bitstreams in all different resolutions and at all different frame rates, which are obtained by applying the scalability. Coding at a high efficiency causes a delay, which is decided by these parameters, and operational quantity, which is decided by the processing module, to be augmented. In a case of applying the scalability to one part of the coded data generated in such a manner, thereby to deliver it to, for example, a mobile terminal, the delay and the operational quantity greatly impose restrictions upon the delivery. Conversely, upon deciding the parameter and the processing module in consideration of the application at a low rate, it follows that the coding performance at a high rate declines greatly.

Thereupon, the present invention has been accomplished in consideration of the above-mentioned problems, and an object thereof is to provide a moving image coding apparatus and a moving image decoding apparatus, a method thereof, and a controlling program thereof in which, in the hierarchized coded-data, the decoded signals in all hierarchies have the image quality identical to that of the decoded image in a case of having been coded in a single hierarchy.

Means to Solve the Problem

The first invention for solving the above-mentioned problem, which is a moving image coding apparatus, is characterized in including a time/space-division filtering section for employing a time low-band component and a time high-band component that are obtained by performing time hierarchizing for the moving image to generate a moving image signal that corresponds to said time high-band component, and to output a reduced-image signal of the moving image having this generation result reduction-processed.

The second invention for solving the above-mentioned problem, which is a moving image coding apparatus, is characterized in including a time/space-division filtering section for performing a reducing process for a time low-band component and a time high-band component that are obtained by performing time hierarchizing for a moving image signal, thereby to generate a reduced-image signal of the moving image that corresponds to said time high-band component by employing this generation result.

The third invention for solving the above-mentioned problem, which is a moving image coding apparatus including a time/space-division filtering section for hierarchizing a moving image signal and a signal-coding processor for coding said hierarchized signals, is characterized in that said time/space-division filtering section generates a time low-band component that is obtained by performing time hierarchizing for said moving image signal, a space high-band component that is obtained by performing space hierarchizing for a time high-band component that is obtained by performing time hierarchizing for said moving image signal, and a reduced-image signal that is obtained by, after employing said time low-band component and said time high-band component to reconfigure said moving image signal that corresponds to said time high-band component, performing a reducing process for this reconfiguration result.

The fourth invention for solving the above-mentioned problem, which is a moving image coding apparatus including a time/space-division filtering section for hierarchizing a moving image signal and a signal-coding processor for coding said hierarchized signals, is characterized in that after said time/space-division filtering section performs time hierarchizing for said moving image signal to obtain a time low-band component and a time high-band component, performs space hierarchizing for said time high-band component to obtain a space high-band component, and employs said time low-band component and said time high-band component to reconfigure said moving image signal that corresponds to the time high-band component, it generates a reduced-image signal having said reconfiguration result reduction-processed.

The fifth invention for solving the above-mentioned problem, which is a moving image coding apparatus including a time/space-division filtering section for hierarchizing a moving image signal and a signal-coding processor for coding said hierarchized signals, is characterized in that said time/space-division filtering section generates a time low-band component that is obtained by performing time hierarchizing for said moving image signal, a space high-band component that is obtained by performing space hierarchizing for a time high-band component that is obtained by performing time hierarchizing for said moving image signal, and a reduced-image signal of the moving image signal corresponding to said time high-band component by performing a reducing process for said time low-band component and said time high-band component to employ this reducing process result.

The sixth invention for solving the above-mentioned problem, which is a moving image coding apparatus including a time/space-division filtering section for hierarchizing a moving image signal and a signal-coding processor for coding said hierarchized signal, is characterized in that: said time/space-division filtering section includes a time-directional filtering section for filtering the moving image signal in a time direction, thereby to generate a time low-band signal, a time high-band signal, and motion information signifying motion between said image signals, a reduced-image generator for generating a reduced-image signal having the moving image signal corresponding to said time high-band signal reduced by employing said time high-band signal and said time low-band signal, and a high-band signal generator for generating a time high-band/space high-band signal that is equivalent to a space high-band component for said time high-band signal; and the signal-coding processor codes said time low-band signal, said reduced/decoded image signal, said time high-band/space high-band signal, and said motion information after said time low-band signal or said reduced-image signal is processed by said time/space-division filtering section, thereby allowing the moving image signal to be hierarchized.

The seventh invention for solving the above-mentioned problem is characterized in that in the above-mentioned sixth invention, said reduced-image generator includes a motion compensator for motion-compensating the time low-band signal based upon the motion information, thereby to generate a predicted-image, a time high-band signal inverse-transformer for generating a moving image signal that corresponds to said time high-band signal from said predicted image and the time high-band signal, and a low-band signal generator for performing a spatial filtering for the moving image signal generated by said time high-band signal inverse-transformer, thereby to generate a reduced decoded-image signal, being a space low-band component.

The eighth invention for solving the above-mentioned problem is characterized in that in the above-mentioned seventh invention, The moving image coding apparatus includes a weighter for performing a weighting process for said time high-band signal as compared with said time low-band signal or performing a weighting process for a certain part of said time high-band signal to output it to said time high-band signal inverse-transformer.

The ninth invention for solving the above-mentioned problem is characterized in that in the above-mentioned sixth invention, said reduced-image generator includes: a low-band signal generator for performing a spatial filtering for the time low-band signal and the time high-band signal, thereby to generate a time low-band/space low-band signal and a time high-band/space low-band signal respectively; a motion-information transformer for transforming motion information-according to a transform ratio of a resolution of said spatial filtering in said low-band signal generator; a motion compensator for motion-compensating said time low-band/space low-band signal based upon the motion information transformed by said motion-information transformer, thereby to generate a predicted image; and a time high-band signal inverse-transformer for employing said predicted image and said time high-band/space low-band signal, thereby to generate a reduced-image signal.

The tenth invention for solving the above-mentioned problem is characterized in that in the above-mentioned ninth invention, said moving image coding apparatus includes a weighter for performing a weighting process for said time high-band/space low-band signal or performing a weighting process for a certain part of said time high-band/space low-band signal to output it to said time high-band signal inverse-transformer.

The eleventh invention for solving the above-mentioned problem in one of the above-mentioned sixth to tenth inventions, is characterized in that said high-band signal generator performs a frequency-component extraction by subband-division.

The twelfth invention for solving the above-mentioned problem in one of the above-mentioned sixth to eleventh inventions, is characterized in that said low-band signal generator performs a frequency-component extraction by sub-band-division.

The thirteenth invention for solving the above-mentioned problem in one of the above-mentioned sixth to tenth inventions, is characterized in that: said low-band signal generator generates a reduced-image signal with a first subsampling filter; and said high-band signal generator generates a high-band signal with a second subsampling filter to which said first subsampling filter forms a counterpart.

The fourteenth invention for solving the above-mentioned problem in one of the above-mentioned sixth to thirteenth inventions, is characterized in that said time-directional filtering section includes: a motion estimator for generating motion information for the moving image signal; a first motion compensator for employing said motion information to motion-compensate a reference signal that is contained in said moving image signal, and to generate a predicted signal; a time high-band signal generator for employing a non-reference signal that is contained in said moving image signal, and said predicted signal, thereby to generate a time high-band signal; a second motion compensator for employing said motion information to motion-compensate said time high-band signal, and to generate a motion-compensation time high-band signal that corresponds to said predicted signal; and a time low-band signal generator for generating a time low-band signal from said motion-compensation time high-band signal and said reference signal.

The fifteenth invention for solving the above-mentioned problem in one of the above-mentioned sixth to thirteenth inventions, is characterized in that: said time-directional filtering section includes: a motion estimator for generating motion information for the moving image signal; a motion compensator for employing said motion information to motion-compensate a reference signal that is contained in said moving image signal, and to generate a predicted signal; and a difference-signal generator for generating a difference signal between a non-reference signal, which is contained in said moving image signal, and said predicted signal; and said time-directional filtering section outputs said reference signal as a time low-band signal without transforming it, and outputs said difference signal as a time high-band signal.

The sixteenth invention for solving the above-mentioned problem is characterized in that a moving image coding apparatus comprises a time/space frequency divider for frequency-dividing a moving image signal in a time direction and in a spatial direction, thereby to generate a reduced-image signal having said moving image signal reduced, a time/space high-band signal, and motion information; a reduced-image signal coder for coding said reduced-image signal; a time/space high-band signal coder for coding said time/space high-band signal; a motion-information coder for coding said motion information; and a multiplexer for multiplexing coded data that said reduced-image signal coder and said time/space high-band signal coder output, and a motion-information coded-data that said motion-information coder outputs, thereby to generate a bitstream that becomes an output, characterized in that: said time/space frequency divider comprises: a time/space-division filtering section for dividing the moving image signal into a time low-band signal, a time high-band/space high-band signal that is equivalent to a space-directional high-band of the time high-band signal, and a time high-band reduced-image signal having the moving image signal corresponding to said time high-band signal reduced; and a space-division filtering section for frequency-dividing said time low-band signal in a spatial direction, thereby to generate a time low-band/space low-band signal and a time low-band/space high-band signal; and after said time/space-division filtering section recursively processes said time low-band signal as an input, it outputs said time low-band/space low-band signal and said reduced decoded-image image signal as said time high-band reduced-image signal, and outputs said time high-band/space high-band signal and said time low-band/space high-band signal as said time/space high-band signal.

The seventeenth invention for solving the above-mentioned problem is characterized in that a moving image decoding apparatus comprises a signal-decoding processor for decoding a coded data of a moving image signal for which a hierarchy coding has been performed, thereby to generate hierarchized signals, and a time/space-synthesis filtering section for synthesizing said hierarchized signals, characterized in that after said time/space-synthesis filtering section generates space low-band components by space hierarchizing, out of time high-band components by time hierarchizing, based upon a decoded-image signal, being a decoding result in a certain resolution-hierarchy, it performs a space-directional frequency synthesis and a time-directional frequency synthesis, thereby to generate a decoded-image signal in the resolution-hierarchy of which the resolution is higher by one stage.

The eighteenth invention for solving the above-mentioned problem is characterized in that a moving image decoding apparatus comprises a signal-decoding processor for decoding a coded data, thereby to generate hierarchized signals, and a time/space-synthesis filtering section for synthesizing the hierarchized signals, characterized in that: said time/space-synthesis filtering section includes: a time high-band/space low-band signal reconfigurer for generating, from a time low-band signal and a reduced decoded-image signal, being a synthesis result in a certain resolution-hierarchy, a time high-band/space low-band signal, being a space low-band component of a time high-band signal that forms a counterpart to said time low-band signal; a space-synthesis filtering section for synthesizing a time high-band/space high-band signal, being a space high-band component of said time high-band signal, and said time high-band/space low-band signal, thereby to generate a time high-band signal; and a time-directional inverse-filtering section for generating a decoded-image signal from said time high-band signal, said time low-band signal, and motion information; and said signal-decoding processor decodes said time low-band signal, said reduced decoded-image signal, said time high-band/space high-band signal, and said motion information from said coded data.

The nineteenth invention for solving the above-mentioned problem in the above-mentioned eighteenth inventions, is characterized in that: said time high-band/space low-band signal reconfigurer includes: a motion compensator for motion-compensating said time low-band signal based upon said motion information, thereby to generate a predicted image; a low-band signal generator for generating a space low-band predicted-signal, being a space low-band component of said predicted image; and a time high-band signal generator for generating a time high-band component from said space low-band predicted-signal and the reduced decoded-image signal; and said time high-band/space low-band signal reconfigurer outputs an output of said time high-band signal generator as a time high-band/space low-band signal.

The twenty invention for solving the above-mentioned problem in the above-mentioned nineteenth inventions, is characterized in that: said moving image decoding apparatus comprises an inverse weighter for performing a weighting process of compensating an output of said time high-band signal generator for the weighting performed at the time of coding; and outputting an output of said inverse weighter as a time high-band/space low-band signal.

The twenty-first invention for solving the above-mentioned problem in the above-mentioned eighteenth inventions, is characterized in that: said time high-band/space low-band signal reconfigurer includes: a low-band signal generator for generating a space low-band component in the time low-band signal to output it as a time low-band/space low-band signal; a motion-information transformer for transforming the motion information according to a transform ratio of a resolution of an output image to an input image of said low-band signal generator; a motion compensator for motion-compensating said time low-band/space low-band signal based upon the motion information transformed by said motion-information transformer, thereby to generate a predicted image; and a time high-band signal generator for generating a time high-band component from said predicted image and the reduced decoded-image signal; and said time high-band/space low-band signal reconfigurer outputs an output of said time high-band signal generator as a time high-band/space low-band signal.

The twenty-second invention for solving the above-mentioned problem in the above-mentioned twenty-first inventions, is characterized in that: said moving image decoding apparatus includes an inverse weighter for performing a weighting process of compensating an output of said time high-band signal generator for the weighting performed at the time of coding; and outputting an output of said inverse weighter as a time high-band/space low-band signal.

The twenty-third invention for solving the above-mentioned problem in one of the above-mentioned nineteenth to twenty-second inventions, is characterized in that said low-band signal generator performs a low-band passing process by subband-division.

The twenty-fourth invention for solving the above-mentioned problem in one of the above-mentioned nineteenth to twenty-third inventions, is characterized in that said space-synthesis filtering section performs a subband-synthesis that becomes an inverse transform of said subband-division.

The twenty-fifth invention for solving the above-mentioned problem in one of the above-mentioned nineteenth to twenty-fourth inventions, is characterized in that said low-band signal generator generates a reduced image with a sub-sampling filter.

The twenty-sixth invention for solving the above-mentioned problem in one of the above-mentioned nineteenth to twenty-fifth inventions, is characterized in that said space-synthesis filtering section synthesizes a high-band signal generated in a second subsampling filter to which said subsampling filter forms a counterpart, and a low-band signal generated in said subsampling filter.

The twenty-seventh invention for solving the above-mentioned problem in one of the above-mentioned eighteenth to twenty-sixth inventions, is characterized in that: said time-directional inverse-filtering section includes: a first motion compensator for motion-compensating said time high-band signal based upon said motion information, thereby to generate a motion-compensation time high-band signal; a time low-band signal inverse-transformer for generating a first decoded-image signal from said motion-compensation time high-band signal and said time low-band signal; a second motion compensator for motion-compensating said first decoded-image signal based upon said motion information, thereby to generate a predicted signal; and a time high-band signal inverse-transformer for generating a second decoded-image signal from said predicted signal and said time high-band signal; and said time-directional inverse-filtering section integrates said first decoded image signal and said second decoded image signal, and assumes it to be a decoded image signal that becomes an output.

The twenty-eighth invention for solving the above-mentioned problem in one of the above-mentioned eighteenth to twenty-seventh inventions, is characterized in that after said time-directional inverse-filtering section motion-compensates said time low-band signal, it synthesizes the time high-band signal and said time low-band signal to output it as a decoded-image signal.

The twenty-ninth invention for solving the above-mentioned problem is characterized in that a moving image decoding apparatus comprising: an inverse multiplexer for inverse-multiplexing hierarchized bitstreams, thereby to generate a lowest-order coded-data, a dump coded-data, and a motion-information coded-data; a reduced-image signal decoder for decoding the lowest-order coded-data, thereby to generate a reduced-image signal; a time/space high-band signal decoder for decoding the dump coded data, thereby to generate a time/space high-band signal; a motion-information decoder for decoding said motion-information coded-data, thereby to generate motion information; and a time/space frequency synthesizer for generating a decoded-image signal from said reduced image signal, said time/space high-band signal, and said motion information, characterized in that said: said time/space frequency synthesizer comprises: a space-synthesis filtering section for synthesizing a time low-band/space low-band signal out of said reduced-image signals, and a time low-band/space high-band signal out of said time/space high-band signals, thereby to generate a time low-band signal; and a time/space-synthesis filtering section for, after reconfiguring a time high-band signal corresponding to said time low-band signal from said time low-band signal, said reduced image signal, and said time/space high-band signal, synthesizing it and said time low-band signal, thereby to output a decoded-image signal.

The thirtieth invention for solving the above-mentioned problem is a moving image coding method, characterized in that a time low-band component and a time high-band component, which are obtained by performing time hierarchizing for a moving image signal, are employed to generate a moving image signal, which corresponds to said time high-band component, to perform a reducing process for this generation result, and thereby to generate a reduced-image signal of the moving image.

The thirty-first invention for solving the above-mentioned problem is a moving image coding method characterized in that a reducing process is performed for a time low-band component and a time high-band component, which are obtained by performing time hierarchizing for a moving image signal, to employ this reducing-process result, and thereby to generate a reduced-image signal of the moving image corresponding to said time high-band component.

The thirty-second invention for solving the above-mentioned problem is a moving image coding method comprising a time/space-division filtering step of hierarchizing a moving image signal and a signal-coding processing step of coding said hierarchized signals, characterized in that said time/space-division filtering step is a step of generating a time low-band component that is obtained by performing time hierarchizing for said moving image signal, a space high-band component that is obtained by performing space hierarchizing for a time high-band component that is obtained by performing time hierarchizing for said moving image signal, and a reduced-image signal that is obtained by, after employing said time low-band component and said time high-band component to reconfigure said moving image signal that corresponds to said time high-band component, performing a reducing process for said reconfiguration result.

The thirty-third invention for solving the above-mentioned problem is a moving image coding method comprising a time/space-division filtering step of hierarchizing a moving image signal and a signal-coding processing step of coding said hierarchized signals, characterized in that said time/space-division filtering step is a step of, after performing time hierarchizing for said moving image signal to obtain a time low-band component and a time high-band component, performing space hierarchizing for said time high-band component to obtain a space high-band component, and employing said time low-band component and said time high-band component to reconfigure said moving image signal that corresponds to the time high-band component, generating a reduced-image signal having said reconfiguration result reduction-processed.

The thirty-fourth invention for solving the above-mentioned problem is a moving image coding method comprising a time/space-division filtering step of hierarchizing a moving image signal and a signal-coding processing step of coding said hierarchized signals, characterized in that said time/space-division filtering step is a step of generating a time low-band component that is obtained by performing time hierarchizing for said moving image signal, a space high-band component that is obtained by performing space hierarchizing for a time high-band component that is obtained by performing time hierarchizing for said moving image signal, and a reduced-image signal of the moving image signal corresponding to said time high-band component by performing a reducing process for said time low-band component and said time high-band component to employ this reducing process result.

The thirty-fifth invention for solving the above-mentioned problem is a moving image coding method comprising a time/space-division filtering step of hierarchizing a moving image signal and a signal-coding processing step of coding said hierarchized signals, characterized in that: said time/space-division filtering step includes: a time-directional filtering step of filtering the moving image signal in a time direction, thereby to generate a time low-band signal, a time high-band signal, and motion information signifying motion between said image signals; a reduced-image generating step of employing said time high-band signal and said time low-band signal, thereby to generate a reduced image signal having the moving image signal corresponding to said time high-band signal reduced; and a high-band signal generating step of generating a time high-band/space high-band signal that is equivalent to a space high-band component for said time high-band signal; and said time low-band signal, said reduced decoded-image signal, said time high-band/space high-band signal, and said motion information are coded in said signal-coding processing step after said time/space-division filtering step is taken for said time low-band signal or said reduced image signal, thereby allowing the moving image signal to be hierarchized.

The thirty-sixth invention for solving the above-mentioned problem in the above-mentioned thirty-fifth invention, is characterized in that, said reduced-image generating step includes: a motion compensating step of motion-compensating the time low-band signal based upon the motion information, thereby to generate a predicted image; a time high-band signal inverse-transforming step of generating a moving image signal, which corresponds to said time high-band signal, from said predicted image and the time high-band signal; and a low-band signal generating step of performing a spatial filtering for the moving image signal generated in said time high-band signal inverse-transforming step, thereby to generate a reduced decoded-image signal, being a space low-band component.

The thirty-seventh invention for solving the above-mentioned problem in the above-mentioned thirty-sixth invention, is characterized in that a weighting process is performed for said time high-band signal as compared with said time low-band signal or a weighting process is performed for a certain part of said time high-band signal before taking said time high-band signal inverse-transforming step.

The thirty-eighth invention for solving the above-mentioned problem in the above-mentioned thirty-fifth invention, is characterized in that said reduced-image generating step includes: a low-band signal generating step of performing a spatial filtering for the time low-band signal and the time high-band signal, thereby to generate a time low-band/space low-band signal and a time high-band/space low-band signal respectively; a motion-information transforming step of transforming the motion information according to a transform ratio of a resolution of said spatial filtering in said low-band signal generating step; a motion compensating step of motion-compensating said time low-band/space low-band signal based upon the motion information transformed in said motion-information transforming step, thereby to generate a predicted image; and a time high-band signal inverse-transforming step of employing said predicted image and said time high-band/space low-band signal, thereby to generate a reduced-image signal.

The thirty-ninth invention for solving the above-mentioned problem in the above-mentioned thirty-eighth invention, is characterized in that a weighting process is performed for said time high-band/space low-band signal or a weighting process is performed for a certain part of said time high-band/space low-band signal before taking said time high-band signal inverse-transforming step.

The fortieth invention for solving the above-mentioned problem is characterized in that, in one of the above-mentioned thirty-fifth to thirty-ninth inventions, said high-band signal generating step is a step of performing a frequency-component extraction by subband-division.

The forty-first invention for solving the above-mentioned problem is characterized in that, in one of the above-mentioned thirty-fifth to fortieth inventions, said low-band signal generating step is a step of performing a frequency-component extraction by subband-division.

The forty-second invention for solving the above-mentioned problem is characterized in that, in one of the above-mentioned thirty-fifth to thirty-ninth inventions, said low-band signal generating step is a step of generating the reduced-image signal with a first subsampling filter; and said high-band signal generating step is a step of generating the high-band signal with a second subsampling filter to which said first sub-sampling filter forms a counterpart.

The forty-third invention for solving the above-mentioned problem is characterized in that, in one of the above-mentioned thirty-fifth to forty-second inventions, said time-directional filtering step includes: a motion estimating step of generating motion information for the moving image signal; a first motion compensating step of employing said motion information to motion-compensate a reference signal that is contained in said moving image signal, and to generate a predicted signal; a time high-band signal generating step of employing a non-reference signal that is contained in said moving image signal, and said predicted signal, thereby to generate a time high-band signal; a second motion compensating step of employing said motion information to motion-compensate said time high-band signal, and to generate a motion-compensation time high-band signal that corresponds to said predicted signal; and a time low-band signal generating step of generating a time low-band signal from said motion-compensation time high-band signal and said reference signal.

The forty-fourth invention for solving the above-mentioned problem is characterized in that, in one of the above-mentioned thirty-fifth to forty-second inventions, said time-directional filtering step includes: a motion estimating step of generating motion information for the moving image signal; a motion compensating step of employing said motion information to motion-compensate a reference signal that is contained in said moving image signal, and to generate a predicted signal; and a difference-signal generating step of generating a difference signal between a non-reference signal, which is contained in said moving image signal, and said predicted signal; and said time-direction filtering step is a step of outputting said reference signal as a time low-band signal without transforming it, and of outputting said difference signal as a time high-band signal.

The forty-fifth invention for solving the above-mentioned problem is characterized in that a moving image coding method comprising: a time/space frequency dividing step of frequency-dividing a moving image signal in a time direction and in a spatial direction, thereby to generate a reduced-image signal having said moving image signal reduced, a time/space high-band signal, and motion information; a reduced-image signal coding step of coding said reduced-image signal; a time/space high-band signal coding step of coding said time/space high-band signal; a motion-information coding step of coding said motion information; and a multiplexing step of multiplexing the coded data generated in said reduced-image signal coding step and said time/space high-band signal coding step, and the motion-information coded-data generated in said motion-information coding step, thereby to generate a bitstream that becomes an output, characterized in that: said time/space frequency dividing step comprises: a time/space-division filtering step of dividing the moving image signal into a time low-band signal, a time high-band/space high-band signal that is equivalent to a space-directional high-band of the time high-band signal, and a time high-band reduced-image signal having the moving image signal corresponding to said time high-band signal reduced; and a space-division filtering step of frequency-dividing said time low-band signal in a spatial direction, thereby to generate a time low-band/space low-band signal and a time low-band/space high-band signal; and said time/space frequency dividing step is a step of, after recursively processing said time low-band signal as an input, outputting said time low-band/space low-band signal and said reduced decoded-image signal as said time high-band reduced-image signal, and said time high-band/space high-band signal and said time low-band/space high-band signal as said time/space high-band signal.

The forty-sixth invention for solving the above-mentioned problem is characterized in that a moving image decoding method comprising a signal-decoding processing step of decoding a coded data of a moving image signal for which hierarchy coding has been performed, thereby to generate hierarchized signals, and a time/space-synthesis filtering step of synthesizing said hierarchized signals, characterized in that said time/space-synthesis filtering step is a step of, after generating a space low-band component by space hierarchizing out of time high-band components by time hierarchizing based upon a decoded-image signal, being a decoding result in a certain resolution-hierarchy, performing a space-directional frequency synthesis and a time-directional frequency synthesis, thereby to generate a decoded image signal in the resolution-hierarchy of which the resolution is higher by one stage.

The forty-seventh invention for solving the above-mentioned problem is characterized in that a moving image decoding method comprising a signal-decoding processing step of decoding a coded data, thereby to generate hierarchized signals, and a time/space-synthesis filtering step of synthesizing hierarchized image signals, characterized in that: said time/space-synthesis filtering step includes: a time high-band/space low-band signal reconfiguring step of generating, from a time low-band signal and a reduced decoded-image signal, being a synthesis result in a certain resolution-hierarchy, a time high-band/space low-band signal, being a space high-band component of a time high-band signal that forms a counterpart to said time low-band signal; a space-synthesis filtering step of synthesizing a time high-band/ space high-band signal, being a space high-band component of said time high-band signal, and said time high-band/space low-band signal, thereby to generate a time high-band signal; and a time-directional inverse-filtering step of generating a decoded-image signal from said time high-band signal, said time low-band signal, and motion information; and said signal-decoding processing step is a step of decoding said time low-band signal, said reduced decoded-image signal, said time high-band/space high-band signal, and said motion information from said coded data.

The forty-seventh invention for solving the above-mentioned problem in the above-mentioned forty-seventh invention is characterized in that: said time high-band/space low-band signal reconfiguring step includes: a motion compensating step of motion-compensating said time low-band signal based upon said motion information, thereby to generate a predicted image; a low-band signal generating step of generating a space low-band predicted-signal, being a space low-band component of said predicted image; and a time high-band signal generating step of generating a time high-band component from said space low-band predicted-signal and the reduced decoded-image signal; and said time high-band/space low-band signal reconfiguring step is a step of outputting an output of said time high-band signal generating step as a time high-band/space low-band signal.

The forty-ninth invention for solving the above-mentioned problem in the above-mentioned forty-eight invention is characterized in that a weighting process is performed of compensating the time high-band component generated in said time high-band signal generating step for the weighting performed at the time of coding, and this weighted signal is output as a time high-band/space low-band signal.

The fiftieth invention for solving the above-mentioned problem in the above-mentioned forty-seventh invention is characterized in that: said time high-band/space low-band signal reconfiguring step includes: a low-band signal generating step of generating a space low-band component in the time low-band signal to output it as a time low-band/space low-band signal; a motion-information transforming step of transforming motion information according to a transform ratio of a resolution of an output image to an input image in said low-band signal generating step; a motion compensating step of motion-compensating said time low-band/space low-band signal based upon the motion information transformed in said motion-information transforming step, thereby to generate a predicted image; and a time high-band signal generating step of generating a time high-band component from said predicted image and the reduced decoded-image signal; and said time high-band/space low-band signal reconfiguring step is a step of outputting an output of said time high-band signal generating step as a time high-band/space low-band signal.

The fifty-first invention for solving the above-mentioned problem in the above-mentioned fiftieth invention is characterized in that a weighting process is performed of compensating an output of said time high-band signal generating step for the weighting performed at the time of coding, and this is output as a time high-band/space low-band signal.

The fifty-second invention for solving the above-mentioned problem is characterized in that, in one of the above-mentioned forty-seventh to fifty-first inventions, said low-band signal generating step is a step of performing a low-band passing process by subband-division.

The fifty-third invention for solving the above-mentioned problem is characterized in that, in one of the above-mentioned forty-seventh to fifty-second inventions, said space-synthesis filtering step is a step of performing a subband-synthesis that becomes an inverse transform of said subband-division.

The fifty-fourth invention for solving the above-mentioned problem is characterized in that, in one of the above-mentioned forty-seventh to fifty-third inventions, said low-band signal generating step is a step of generating the reduced image by subsampling filter.

The fifty-fifth invention for solving the above-mentioned problem is characterized in that, in one of the above-mentioned forty-seventh to fifty-fourth inventions, said space-synthesis filtering step is a step of synthesizing the high-band signal generated in a second subsampling filter to which said subsampling filter forms a counterpart, and the low-band signal generated in said subsampling filter.

The fifty-sixth invention solving the above-mentioned problem in one of the above-mentioned forty-seventh to fifty-fifth inventions, is characterized in that: said time-directional inverse-filtering step includes: a first motion compensating step of motion-compensating said time high-band signal based upon said motion information, thereby to generate a motion-compensation time high-band signal; a time low-band signal inverse-transforming step of generating a first decoded-image signal from said motion-compensation time high-band signal and said time low-band signal; a second motion compensating step of motion-compensating said first decoded-image signal based upon said motion information, thereby to generate a predicted signal; and a time high-band signal inverse-transforming step of generating a second decoded image signal from said predicted signal and said time high-band signal; and said time-directional inverse-filtering step is a step of integrating said first decoded-image signal and said second decoded-image signal to assume it to be a decoded image signal that becomes an output.

The fifty-seventh invention solving the above-mentioned problem in one of the above-mentioned forty-seventh to fifty-sixth inventions, is characterized in that said time-directional inverse-filtering step is a step of, after motion-compensating said time low-band signal, synthesizing the time high-band signal and said time low-band signal to output it as a decoded-image signal.

The fifty-eighth invention solving the above-mentioned problem is characterized in that a moving image decoding method comprising: an inverse multiplexing step of inverse-multiplexing hierarchized bitstreams, thereby to generate a lowest-order coded data, a dump coded data, and a motion-information coded data; a reduced-image signal decoding step of decoding the lowest-order coded data, thereby to generate a reduced-image signal; a time/space high-band signal decoding step of decoding the dump coded data, thereby to generate a time/space high-band signal; a motion-information decoding step of decoding said motion-information coded-data, thereby to generate motion information; and a time/space frequency synthesizing step of generating a decoded-image signal from said reduced-image signal, said time/space high-band signal, and said motion information, characterized in that said time/space frequency synthesizing step comprises: a space-synthesis filtering step of synthesizing a time low-band/space low-band signal out of said reduced image signals, and a time low-band/space high-band signal out of said time/space high-band signals, thereby to generate a time low-band signal; and a time/space-synthesis filtering step of, after reconfiguring a time high-band signal corresponding to said time low-band signal from said time low-band signal, said reduced-image signal, and said time/space high-band signal, synthesizing it and said time low-band signal, thereby to output a decoded-image signal.

The fifty-ninth invention solving the above-mentioned problem is characterized in that a controlling program of a moving image coding apparatus, characterized in causing the moving image coding apparatus to function as a time/space-division filtering section for employing a time low-band component and a time high-band component, which are obtained by performing time hierarchizing for a moving image signal, to generate a moving image signal that corresponds to said time high-band component, and to output a reduced-image signal of the moving image having this generation result reduction-processed.

The sixtieth invention solving the above-mentioned problem is characterized in that a controlling program of a moving image coding apparatus, characterized in causing the moving image coding apparatus to function as a time/space-division filtering section for performing a reducing process for a time low-band component and a time high-band component, which are obtained by performing time hierarchizing for a moving image signal, thereby to generate a reduced-image signal of the moving image corresponding to said time high-band component by employing this reducing-process result.

The sixty-first invention solving the above-mentioned problem is characterized in that a controlling program of a moving image coding apparatus comprising a time/space-division filtering section for hierarchizing a moving image signal and a signal-coding processor for coding said hierarchized signals, characterized in causing said time/space-division filtering section to function so as to generate a time low-band component that is obtained by performing time hierarchizing for said moving image signal, a space high-band component that is obtained by performing space hierarchizing for a time high-band component that is obtained by performing time hierarchizing for said moving image signal, and a reduced-image signal that is obtained by, after employing said time low-band component and said time high-band component to reconfigure said moving image signal that corresponds to said time high-band component, performing a reducing process for said reconfiguration result.

The sixty-second invention solving the above-mentioned problem is characterized in that a controlling program of a moving image coding apparatus comprising a time/space-division filtering section for hierarchizing a moving image signal and a signal-coding processor for coding said hierarchized signals, characterized in causing said time/space-division filtering section to function so as to generate a reduced image signal that is obtained by, after performing time hierarchizing for said moving image signal to obtain a time low-band component and a time high-band component, performing space hierarchizing for said time high-band component to obtain a space high-band component, and employing said time low-band component and said time high-band component to reconfigure said moving image signal that corresponds to the time high-band component, performing a reducing process for said reconfiguration result The sixty-third invention solving the above-mentioned problem is characterized in that a controlling program of a moving image coding apparatus comprising a time/space-division filtering section for hierarchizing a moving image signal and a signal-coding processor for coding said hierarchized signals, characterized in causing said time/space-division filtering section to function so as to generate a time low-band component that is obtained by performing time hierarchizing for said moving image signal, a space high-band component that is obtained by performing for space hierarchizing for a time high-band component that is obtained by performing time hierarchizing for said moving image signal, and a reduced image signal of the moving image signal corresponding to said time high-band component by performing a reducing process for said time low-band component and said time high-band component to employ this reducing process result.

The sixty-fourth invention solving the above-mentioned problem is characterized in that a controlling program of a moving image coding apparatus comprising a time/space-division filtering section for hierarchizing a moving image signal and a signal-coding processor for coding said hierarchized signals, characterized in that: said controlling program causes said time/space-division filtering section to function as: a time-directional filtering section for filtering the moving image signal in a time direction, thereby to generate a time low-band signal, a time high-band signal, and motion information signifying motion between said image signals; a reduced-image generator for employing said time high-band signal and said time low-band signal, thereby to generate a reduced image signal having the moving image signal corresponding to said time high-band signal reduced; and a high-band signal generator for generating a time high-band/space high-band signal that is equivalent to a space high-band component for said time high-band signal; and said signal-coding processor codes said time low-band signal, said reduced decoded-image signal, said time high-band/space high-band signal, and said motion information after said time low-band signal or said reduced-image signal is processed by said time/space-division filtering section, thereby allowing the moving image signal to be hierarchized.

The sixty-fifth invention for solving the above-mentioned problem, in above-mentioned sixty-fourth invention, is characterized in causing said reduced-image generator to function as a motion compensator for motion-compensating the time low-band signal based upon the motion information, thereby to generate a predicted image; a time high-band signal inverse-transformer for generating a moving image signal that corresponds to said time high-band signal from said predicted image and the time high-band signal; and a low-band signal generator for performing a spatial filtering for the moving image signal generated in said time high-band signal inverse-transformer, thereby to generate a reduced decoded-image signal, being a space low-band component.

The sixty-sixth invention for solving the above-mentioned problem, in above-mentioned sixty-fifth invention, is characterized in causing the moving image coding apparatus to function as a weighter for performing a weighting process for said time high-band signal as compared with said time low-band signal, or for performing a weighting process for a certain part of said time high-band signal to output it to said time high-band signal inverse-transformer.

The sixty-seventh invention for solving the above-mentioned problem, in above-mentioned sixty-fourth invention, is characterized in causing said reduced-image generator to function as: a low-band signal generator for performing a spatial filtering for the time low-band signal and the time high-band signal, thereby generate a time low-band/space low-band signal and a time high-band/space low-band signal respectively; a motion-information transformer for transforming motion information according to a transform ratio of a resolution of said spatial filtering in said low-band signal generator; a motion compensator for motion-compensating said time low-band/space low-band signal based upon the motion information transformed by said motion-information transformer to generate a predicted image; and a time high-band signal inverse-transformer for employing said predicted image and said time high-band/space low-band signal, thereby to generate a reduced-image signal.

The sixty-eighth invention for solving the above-mentioned problem, in above-mentioned sixty-seventh invention, is characterized in causing said moving image coding apparatus to function as a weighter for performing a weighting process for said time high-band/space low-band signal, or performing a weighting process for a certain part of said time high-band/space low-band signal to output it to said time high-band signal inverse-transformer.

The sixty-ninth invention for solving the above-mentioned problem, in one of the above-mentioned sixty-fourth to sixty-eighth inventions, is characterized in that said high-band signal generator perform a frequency-component extraction by subband-division.

The seventieth invention for solving the above-mentioned problem, in one of the above-mentioned sixty-fourth to sixty-ninth inventions, is characterized in that said low-band signal generator performs a frequency-component extraction by subband-division.

The seventy-first invention for solving the above-mentioned problem, in one of the above-mentioned sixty-fourth to sixty-eighth inventions, is characterized in that: said low-band signal generator generates the reduced-image signal with a first subsampling filter; and said high-band signal generator generates the high-band signal with a second subsampling filter to which said first subsampling filter forms a counterpart.

The seventy-second invention for solving the above-mentioned problem, in one of the above-mentioned sixty-fourth to seventy-first inventions, is characterized in causing said time-directional filtering section to function as: a motion estimator for generating motion information for the moving image signal; a first motion compensator for employing said motion information to motion-compensate a reference signal that is contained in said moving image signal, and to generate a predicted signal; a time high-band signal generator for employing a non-reference signal that is contained in said moving image signal, and said predicted signal, thereby to generate a time high-band signal; a second motion compensator for employing said motion information to motion-compensate said time high-band signal, and to generate a motion-compensation time high-band signal that corresponds to said predicted signal; and a time low-band signal generator for generating a time low-band signal from said motion-compensation time high-band signal and said reference signal.

The seventy-third invention for solving the above-mentioned problem, in one of the above-mentioned sixty-fourth to seventy-first inventions, is characterized in that: said controlling program causes said time-directional filtering section to function as: a motion estimator of generating motion information for the moving image signal; a motion compensator for employing said motion information to motion-compensate a reference signal that is contained in said moving image signal, and to generate a predicted signal; and a difference-signal generator for generating a difference signal between a non-reference signal that is contained in said moving image signal, and said predicted signal; and said time-directional filtering section outputs said reference signal as a time low-band signal without transforming it, and said difference signal as a time high-band signal.

The seventy-fourth invention for solving the above-mentioned problem is characterized in that a controlling program of a moving image coding apparatus comprising: a time/space frequency divider for frequency-dividing a moving image signal in a time direction and in a spatial direction, thereby to generate a reduced-image signal having said moving image signal reduced, a time/space high-band signal, and motion information; a reduced-image signal coder for coding said reduced-image signal; a time/space high-band signal coder for coding said time/space high-band signal; a motion-information coder for coding said motion information; and a multiplexer for multiplexing coded data that said reduced-image coder and said time/space high-band signal coder output, and a motion-information coded data that said motion-information coder outputs, thereby to generate a bitstream that becomes an output, characterized in that: said controlling program causes said time/space-frequency divider to function as: a time/space-division filtering section for dividing the moving image signal into a time low-band signal, a time high-band/space high-band signal that is equivalent to a space-directional high-band of the time high-band signal, and a time high-band reduced-image signal having the moving image signal corresponding to said time high-band signal reduced; and a space-division filtering section for frequency-dividing said time low-band signal in a spatial direction, thereby to generate a time low-band/space low-band signal and a time low-band/space high-band signal; and after said time/space-division filtering section processes said time low-band signal as an input recursively, it outputs said time low-band/space low-band signal and said reduced decoded-image signal as said time high-band reduced-image signal, and said time high-band/space high-band signal and said time low-band/space high-band signal as said time/space high-band signal respectively.

The seventy-fifth invention for solving the above-mentioned problem is characterized in that a controlling program of a moving image decoding apparatus comprising a signal-decoding processor for decoding coded data of a moving image signal for which hierarchy coding has been performed, thereby to generate hierarchized signals, and a time/space-synthesis filtering section for synthesizing said hierarchized signals, characterized in causing said time/space-synthesis filtering section to function so as to perform a space-directional frequency synthesis and a time-direction frequency synthesis, thereby to generate a decoded image signal in a resolution-hierarchy of which the resolution is higher by one stage after generating a space low-band component by space hierarchizing, out of time high-band components by time hierarchizing, based upon a decoded-image signal, being a decoding result in a certain resolution-hierarchy.

The seventy-sixth invention for solving the above-mentioned problem is characterized in that a controlling program of a moving image decoding apparatus comprising a signal-decoding processor for decoding coded data, thereby to generate hierarchized signals, and a time/space-synthesis filtering section for synthesizing hierarchized image signals, characterized in that: said controlling program causes said time/space-synthesis filtering section to function as: a time high-band/space low-band signal reconfigurer for generating, from a time low-band signal and a reduced decoded-image signal, being a synthesis result in a certain resolution-hierarchy, a time high-band/space low-band signal, being a space high-band component of a time high-band signal that forms a counterpart to said time low-band signal; a space-synthesis filtering section for synthesizing a time high-band/space high-band signal, being a space high-band component of said time high-band signal, and said time high-band/space low-band signal, thereby to generate a time high-band signal; and a time-directional inverse-filtering section for generating a decoded-image signal from said time high-band signal, said time low-band signal, and motion information; and said signal-decoding processor decodes said time low-band signal, said reduced decoded-image signal, said time high-band/space high-band signal, and said motion information from said coded data.

The seventy-seventh invention for solving the above-mentioned problem is characterized in that, in the above-mentioned seventy-sixth invention: said controlling program causes said time high-band/space low-band signal reconfigurer to function as: a motion compensator for motion-compensating said time low-band signal based upon said motion information, thereby to generate a predicted image; a low-band signal generator for generating a space low-band predicted-signal, being a space low-band component of said predicted image; and a time high-band signal generator for generating a time high-band component from said space low-band predicted-signal and the reduced decoded-image signal; and said time high-band/space low-band signal reconfigurer outputs an output of said time high-band signal generator as a time high-band/space low-band signal.

The seventy-eighth invention for solving the above-mentioned problem is characterized in that, in the above-mentioned seventy-seventh invention: said controlling program causes said moving image coding apparatus to function as an inverse weighter for performing a weighting process of compensating an output of said time high-band signal generator for the weighting performed at the time of coding; and said moving image coding apparatus outputs an output of said inverse weighter as a time high-band/space low-band signal.

The seventy-ninth invention for solving the above-mentioned problem is characterized in that, in the above-mentioned seventy-sixth invention: said controlling program causes said time high-band/space low-band signal reconfigurer to function as: a low-band signal generator for generating a space low-band component in the time low-band signal to output it as a time low-band/space low-band signal; a motion-information transformer for transforming motion information according to a transform ratio of a resolution of an output image to an input image of said low-band signal generator; a motion compensator for motion-compensating said time low-band/space low-band signal based upon the motion information transformed by said motion-information transformer, thereby to generate a predicted image; and a time high-band signal generator for generating a time high-band component from said predicted image and the reduced decoded-image signal; and said time high-band/space low-band signal reconfigurer outputs an output of said time high-band signal generator as a time high-band/space low-band signal.

The eighty invention for solving the above-mentioned problem is characterized in that, in the above-mentioned seventy-ninth invention: said controlling program causes said moving image coding apparatus to function as an inverse weighter for performing a weighting process of compensating an output of said time high-band signal generator for the weighting performed at the time of coding; and said moving image decoding apparatus outputs an output of said inverse weighter as a time high-band/space low-band signal.

The eighty-first invention for solving the above-mentioned problem, in the above-mentioned seventy-seventh invention, is characterized in that said low-band signal generator performs a low-band passing process by subband-division.

The eighty-second invention for solving the above-mentioned problem, in one of the above-mentioned seventy-seventh to eighty-first inventions, is characterized in that said space-synthesis filtering section performs a subband-synthesis that becomes an inverse transform of said subband-division.

The eighty-third invention for solving the above-mentioned problem, in one of the above-mentioned seventy-seventh to eighty-second inventions, is characterized in that said low-band signal generator generates the reduced image by a subsampling filter.

The eighty-fourth invention for solving the above-mentioned problem, in one of the above-mentioned seventy-seventh to eighty-third inventions, is characterized in that said space-synthesis filtering section synthesizes a high-band signal generated in a second subsampling filter to which said subsampling filter forms a counterpart, and a low-band signal generated by said subsampling filter.

The eighty-fourth invention for solving the above-mentioned problem, in one of the above-mentioned seventy-seventh to eighty-fourth, is characterized in that: said controlling program causes said time-directional inverse-filtering section to function as: a first motion compensator for motion-compensating said time high-band signal based upon said motion information, thereby to generate a motion-compensation time high-band signal; a time low-band signal inverse-transformer for generating a first decoded-image signal from said motion-compensation time high-band signal and said time low-band signal; a second motion compensator for motion-compensating said first decoded-image signal based upon said motion information, thereby to generate a predicted signal; and a time high-band signal inverse-transformer for generating a second decoded-image signal from said predicted signal and said time high-band signal; and said time-directional inverse-filtering section integrates said first decoded image signal and said second decoded image signal to assume it to be a decoded image signal that becomes an output.

The eighty-fourth invention for solving the above-mentioned problem, in one of the above-mentioned seventy-seventh to eighty-fifth, is characterized in that after said time-directional inverse-filtering section motion-compensates said time low-band signal, it synthesizes the high-band signal and said time low-band signal to output it as a decoded image signal.

The eighty-seventh invention for solving the above-mentioned problem is characterized in that a controlling program of a moving image decoding apparatus comprising: an inverse multiplexer for inverse-multiplexing hierarchized bit-streams, thereby to generate a lowest-order coded data, a dump coded data, and a motion-information coded data; a reduced-image signal decoder for decoding the lowest-order coded data, thereby to generate a reduced-image signal, a time/space high-band signal decoder for decoding the dump coded data, thereby to generate a time/space high-band signal; a motion-information decoder for decoding said motion-information coded-data, thereby to generate motion information; and a time/space frequency synthesizer for generating a decoded-image signal from said reduced image signal, said time/space high-band signal, and said motion information, characterized in causing said time/space frequency synthesizer to function as: a space-synthesis filtering section for synthesizing a time low-band/space low-band signal out of said reduced-image signals, and a time low-band/space high-band out of said time/space high-band signals, thereby to generate a time low-band signal; and a time/space-synthesis filtering section for, after reconfiguring a time high-band signal corresponding to said time low-band signal from said time low-band signal, said reduced-image signal, and said time/space high-band signal, synthesizing it and said time low-band signal, thereby to output a decoded-image signal.

An outline of the time/space-division filtering in the moving image coding that is characteristic of the present invention will be explained by employing FIG. 25.

In the time/space-division filtering, at first, the time hierarchizing is performed for a moving image signal 10 in a certain resolution-hierarchy, which is divided into a time low-band signal 11 and a time high-band signal 12.

Next, the time low-band signal 11 and the time high-band signal 12 are employed, thereby to generate a moving image signal 21 having the moving image signal corresponding to the time high-band signal 12 reconfigured. A reduced-image signal 14 having the moving image signal 21 reduction-processed is generated.

In addition hereto, the high-band generating process by the space hierarchizing is performed for the time high-band signal 12, thereby to generate a time high-band/space high-band signal 13.

Thereafter, the time low-band signal 11, the reduced-image signal 14, and the time high-band/space high-band signal 13 are output as a division result. The time/space-division filtering is recursively performed for the time low-band signal 11, which is regarded as the moving image signal of which the time-resolution is lower by one stage, and the reduced-image signal 14, which is regarded as the moving image signal of which the spatial resolution is lower by one stage, thereby to hierarchize the moving image signal in a multi-stage.

Next, the moving image decoding in accordance with the present invention will be explained.

The moving image decoding in accordance with the present invention includes a signal decoding process for decoding a coded data of the moving image signal for which the hierarchy coding has been made, thereby to generate hierarchized signals, and a time/space-synthesis filtering for synthesizing the hierarchized signals.

An outline of the time/space-synthesis filtering will be explained by employing FIG. 26.

The signal that becomes an object of synthesis in the time/space-synthesis filtering is a decoded-image signal 15, a time low-band signal 16, and a time high-band/space high-band signal 18. Herein, the decoded-image signal 15 corresponds to the foregoing reduced-image signal 14.

At first, the decoded-image signal 15, being a low-band component in a certain spatial resolution, and the time low-band signal 16, being a low-band component in a time-resolution are employed, thereby to reconfigure a time high-band/space low-band signal 17, being a space low-band component of a time high-band signal 12 that corresponds to the time low-band signal 16.

The hierarchy synthesizing process in the spatial direction is performed for the time high-band/space low-band signal 17 and the time high-band/space high-band signal 18, thereby to obtain a time high-band signal 19. Thereafter, the hierarchy synthesizing process in the time direction is performed for the time high-band signal 19 and the time low-band signal 16, thereby to generate a decoded-image signal 20 of which the resolution-hierarchy is higher by one stage.

The time/space-synthesis filtering is recursively performed for the decoded-image signal 20, which is regarded as the time low-band signal 16 or the decoded-image signal 15, thereby to realize the multi-staged hierarchy synthesis.

Next, a second time/space-division filtering in a second moving image coding of the present invention will be explained.

In the foregoing time/space-division filtering, after employing the time low-band component and the time high-band component to reconfigure the moving image signal that corresponds to the time high-band component, the reducing process is performed for this reconfiguration result, thereby to generate the reduced-image signal of the moving image. However, in the method other than this method, it is possible to generate the reduced-image signal of the moving image.

Thereupon, an outline of the second time/space-division filtering in the moving image coding that is characteristic of the present invention will be explained by employing FIG. 43.

In the time/space-division filtering, at first, the time hierarchizing is performed for the moving image signal 10 in a certain resolution-hierarchy, which is divided into a time low-band signal 11 and a time high-band signal 12. The process up to this is identical to that of the foregoing time/space-division filtering.

Next, by performing a low-band generating process for the time low-band signal 11, a time low-band/space low-band signal 22 is generated.

On the other hand, by performing a low-band generating process for the time high-band signal 12, a time high-band/space low-band signal 23 is generated, and by performing a high-band generating process for the time high-band signal 12, a time high-band/space high-band signal 13 is generated. And, by performing a time-hierarchy synthesis for the time low-band/space low-band signal 22 and the time high-band/space low-band signal 23, a reduced-image signal 14 is generated.

Thereafter, the time low-band signal 11, the reduced-image signal 14, and the time high-band/space high-band signal 13 are output as a division result. The time/space-division filtering is recursively performed for the time low-band signal 11, which is regarded as the moving image signal of which the time-resolution is lower by one stage, and the reduced-image signal 14, which is regarded as the moving image signal of which the spatial resolution is lower by one stage, thereby to hierarchize the moving image signal in a multi-stage. Additionally, the decoding is similar to the decoding method shown in FIG. 26.

Effects of the Invention

In accordance with the present invention, the time/space high-band signal in a case of having performed hierarchy coding, which is identical to that of the three dimensional wavelet coding technique that is the prior art, has the result coded of the time-directional filtering in the reduced-image signal instead of the time high-band/space low-band signal.

That is, the time/space high-band signal is coded at a high efficiency similarly to the prior art, and in addition hereto, the reduced-image signal is coded independently of the time/space high-band signal. This allows the mismatch of the motion compensation and the overhead of the motion information, which have been not solved in the prior art, to be lifted up, and the coding efficiency of the reduced-image signal to be enhanced remarkably.

Further, in accordance with the present invention, it can be realized that, in the hierarchied decoded-data, the decoded signals in all hierarchies have the image quality identical to that of the decoded image in a case of having been coded in a single hierarchy Further, the present invention makes it possible to decide the parameter and processing module that impose restrictions in the application, for example, the delay and the operational quantity in the data coded in a resolution that becomes an input, independently of that of the code data in a reduced resolution. That is, it is possible to realize the hierarchy coding that enables simultaneous delivery to a plurality of terminals having different delivery conditions without lowering the coding efficiency.

Further, upon performing a weighting process for the time high-band/space low-band signal just before reconfiguring it in performing a time/space-synthesis filtering in the decoding process, thereby to equalize the weighting coefficient at this time to the weighting coefficient in generating the reduced-image signal in the coding process, it follows that no distortion, which is superposed at the time of coding the reduced-image signal, propagates while augmenting even after the space-directional synthesis filtering, which enables deterioration of the decoded image to be reduced as a result.

Yet further, performing a filtering for a purpose of reduction in noise or the like as a process prior to coding of the reduced-image signal, and as a process prior to decoding enables an influence of the coding distortion in the decoded reduced-image signal upon the decoded image signal having a larger resolution to be reduced.

BRIEF DESCRIPTION OF THE DRAWINGS

FIG. 11 is a block diagram illustrating a configuration of the reduced-image signal decoder 151.

FIG. 12 is a block diagram illustrating a configuration of the time/space high-band signal decoder 152.

DESCRIPTION OF NUMERALS

Figure 1:
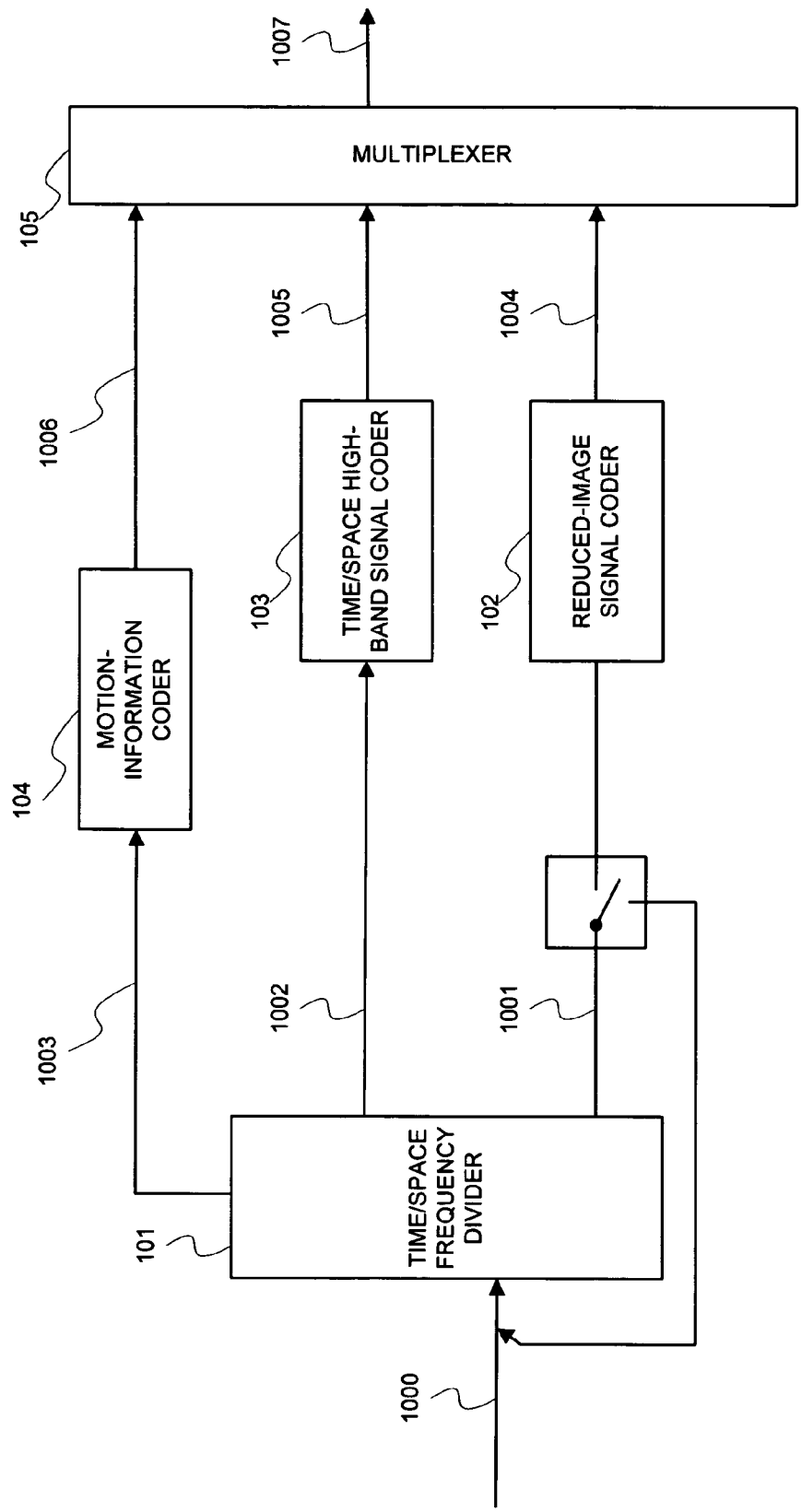
FIG. 1 is a block diagram illustrating a configuration of the moving image coding apparatus of the embodiment 1 of the present invention.

101 time/space frequency divider
102 reduced-image signal coder
103 time/space high-band signal coder
104 motion-information coder
105 multiplexer
150 inverse multiplexer
151 reduced-image signal decoder
152 time/space high-band signal decoder
153 motion-information decoder
154 time/space frequency synthesizer

BEST MODE FOR CARRYING OUT THE INVENTION

The configuration of the time/space-two-division filtering section for realizing the time/space-two-division filtering in the moving image coding that is characteristic of the present invention will be explained.

Figure 4:
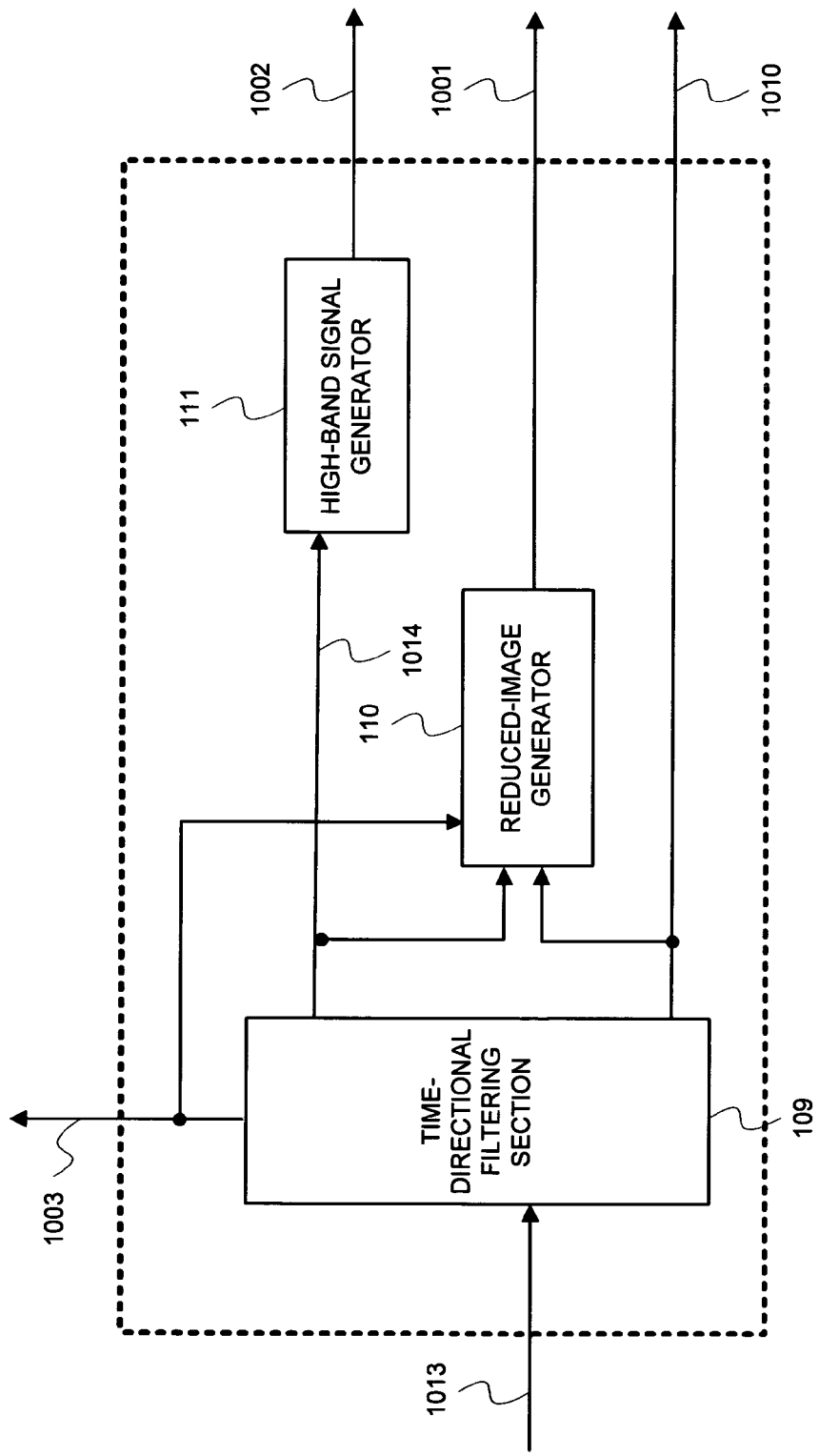
FIG. 4 is a block diagram illustrating a configuration of the time/space-two-division filtering section 107.

The time/space-two-division filtering section is configured of a time-directional filtering section 109, a reduced-image generator 110, and a high-band signal generator 111 as shown in FIG. 4. Herein, it is assumed that an input image signal 1000, a reduced-image signal 1001, and a time low-band signal 1010 that become an input into a time/space-two-division filtering section 107, respectively, are called a division-object signal 1013 as a whole. Additionally, the input image signal 1000 corresponds to the moving image signal 10 in FIG. 25, the reduced-image signal 1001 to the reduced-image signal 14 in FIG. 25, and the time low-band signal 1010 to the time low-band signal 11 in FIG. 25, respectively. In addition hereto, a time high-band/space high-band signal 1002 corresponds to the time high-band/space high-band signal 13 in FIG. 25.

Figure 28:
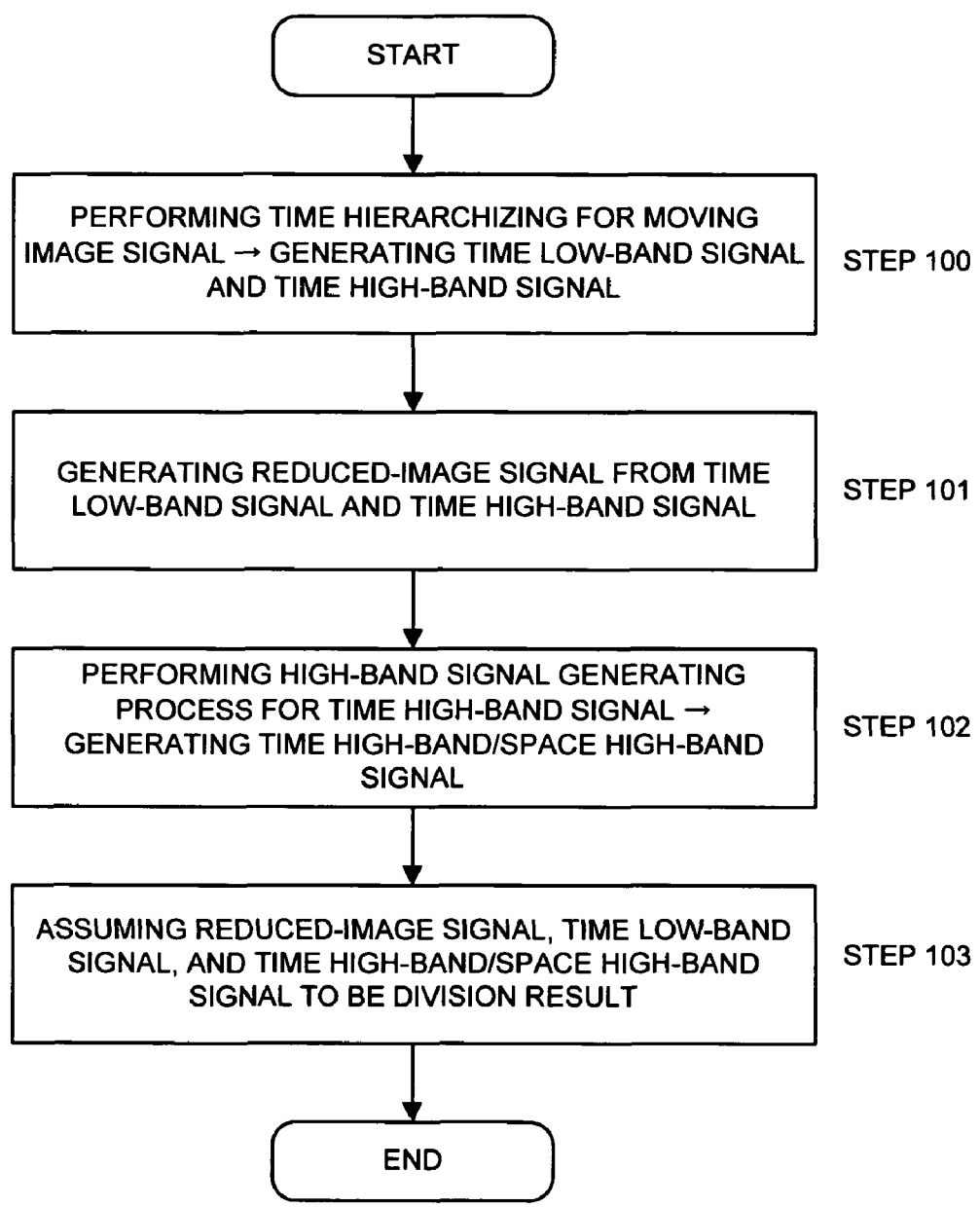
FIG. 28 is a flowchart illustrating a process of the time/space-two-division filtering.

The process of the time/space-two-division filtering in such a configuration will be explained by employing a flowchart of FIG. 28.

The division-object signal 1013 is divided into a time low-band signal 1010 and a time high-band signal 1014 with time hierarchizing by a time-direction filtering section 109, and simultaneously therewith, motion information 1003 employed for the motion compensation is output (Step 100). Further, a reduced-image generator 110 generates a reduced-image signal 1001 based upon the time low-band signal 1010, the time high-band signal 1014 and the motion information 1003 (Step 101).

On the other hand, a high-band signal generator 111 performs a high-band signal generating process based upon the time high-band signal 1014, and generates a time high-band/space high-band signal 1002 (Step 102).

And, the reduced-image signal 1001, the time low-band signal 1010, and the time high-band/space high-band signal 1002 are output as a division result (Step 103).

Next, the configuration of the time/space-synthesis filtering section for realizing the time/space-synthesis filtering in the moving image decoding that is characteristic of the present invention will be explained.

Figure 14:
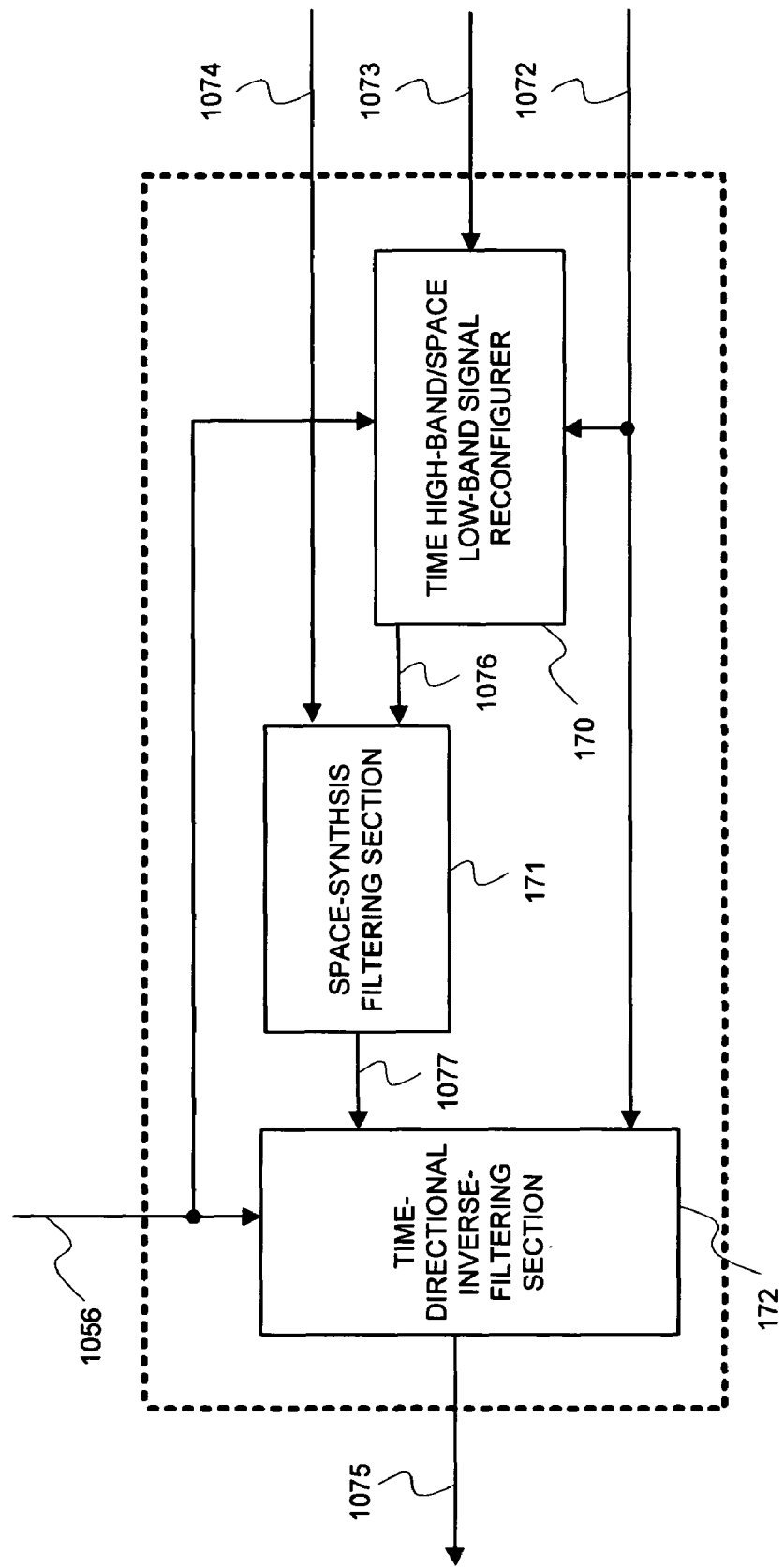
FIG. 14 is a block diagram illustrating a configuration of the time/space-synthesis filtering section 168.

The time/space-synthesis filtering section is configured of a time high-band/space low-band signal reconfigurer 170, a space-synthesis filtering section 171, and a time-directional inverse-filtering section 172 as shown in FIG. 14. Herein, a reduced-image signal 1073 of FIG. 14 corresponds to the reduced-image signal 15 in FIG. 26, a time low-band signal 1072 to the time low-band signal 16 in FIG. 26, a time/space high-band signal 1074 to the time high-band/space high-band signal 18 in FIG. 26, a time high-band/space low-band signal 1076 to the time high-band/space low-band signal 17 in FIG. 26, a time high-band signal 1077 to the time high-band signal 19 in FIG. 26, and a decoded-image signal 1075 to the decoded-image signal 20 in FIG. 26, respectively.

Figure 37:
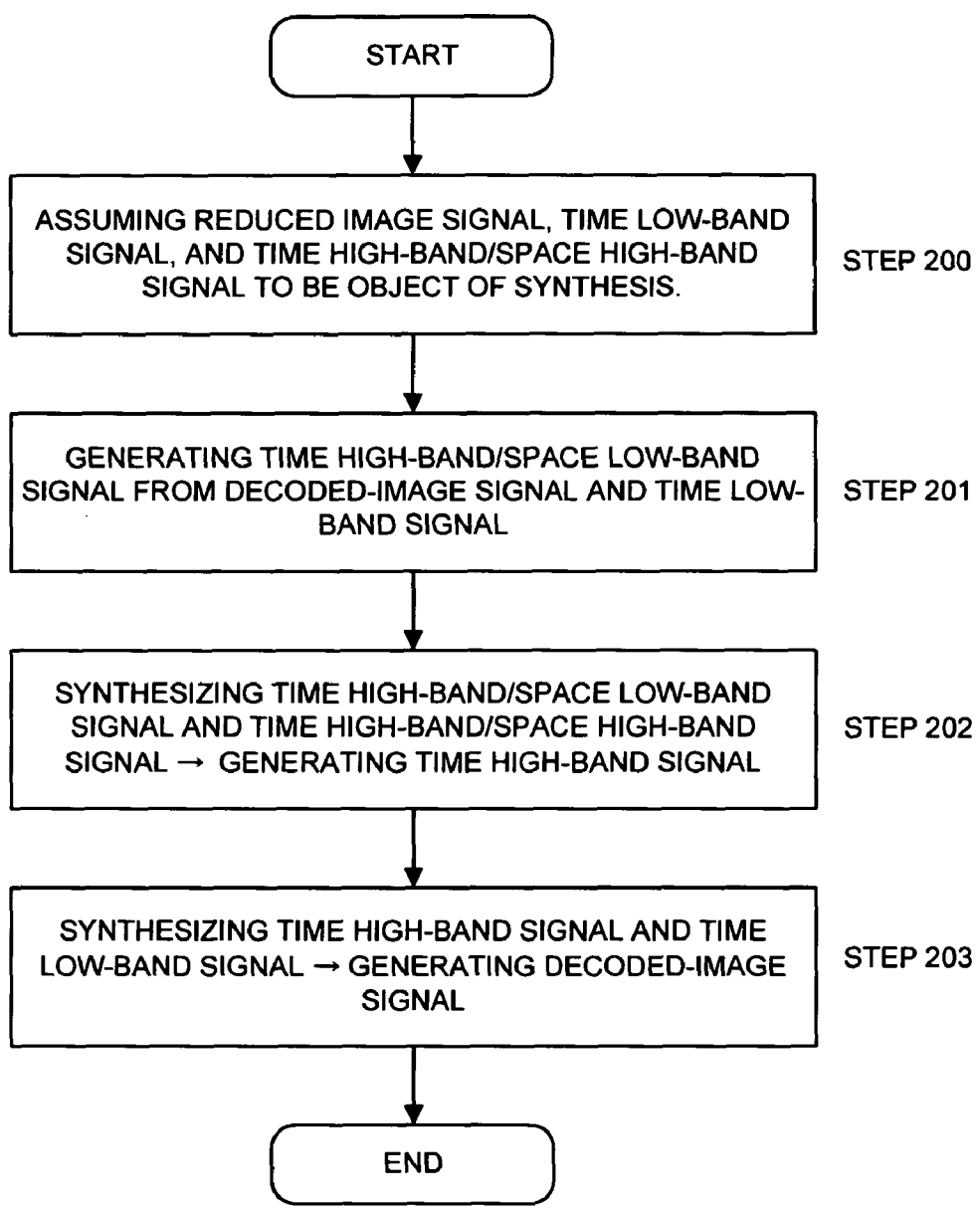
FIG. 37 is a flowchart illustrating a process of the time/space-synthesis filtering.

The process of the time/space-synthesis filtering in such a configuration will be explained by employing a flowchart of FIG. 37.

A reduced-image signal 1073, a time low-band signal 1072, and a time/space high-band signal 1074 are assumed to be an object of synthesis respectively (step 200), and a time high-band/space low-band signal reconfigurer 170 reconfigures a time high-band/space low-band signal 1076 based upon the time low-band signal 1072, the reduced-image signal 1073 and motion information 1056 (Step 201).

Continuously, a space-synthesis filtering section 171 synthesizes the time high-band/space low-band signal 1076 and the time/space high-band signal 1074, and generates a time high-band signal 1077 (Step 202).

And, a time-directional inverse-filtering section 172 performs an inverse transform of the time-direction filtering in the time-directional filtering section 109 in FIG. 4 for the time high-band signal 1077 and the time low-band signal 1072 based upon the motion information 1056, thereby to generate a decoded-image signal 1075 (Step 203).

Additionally, the time high-band/space low-band signal reconfigurer 170 is realized in a manner of corresponding to the reduced-image generator 110 of FIG. 4.

Next, the configuration of the second time/space-two-division filtering section in the moving image coding that is characteristic of the present invention will be explained.

In the foregoing embodiment, after the reduced-image generator 110 employs the time low-band component and the time high-band component to reconfigure the moving image signal that corresponds to the time high-band component, it generates the reduced-image signal of the moving image by performing a reducing process for this reconfiguration result. However, in the method other than this method, it is possible to generate the reduced-image signal of the moving image. Thereupon, a configuration of the second reduced-image generator 110 different from that of the foregoing embodiment will be explained by employing FIG. 7. Additionally, the other configuration is similar to that of the foregoing embodiment, so detailed explanation is omitted.

A low-band signal generator 123 and a low-band signal generator 124 generate a time low-band/space low-band signal 1023 and a time high-band/space low-band signal 1024 that become the low-band signal of a time low-band signal 1010 and a time high-band signal 1014, respectively.

A motion-information transformer 125 generates motion information 1025 having motion information 1003 reduced responding to a ratio of the resolution by the low-band signal generation. A motion compensator 126 motion-compensates the time low-band/space low-band signal 1023 based upon the motion information 1025, and generates a predicted signal 1026. A time high-band signal inverse-transformer 127 performs an inverse transform of the high-band signal generation filtering process in a time high-band signal generator 114 for the time high-band/space low-band signal 1024 and the predicted signal 1026, and generates a reduced-image signal 1001.

Figure 43:
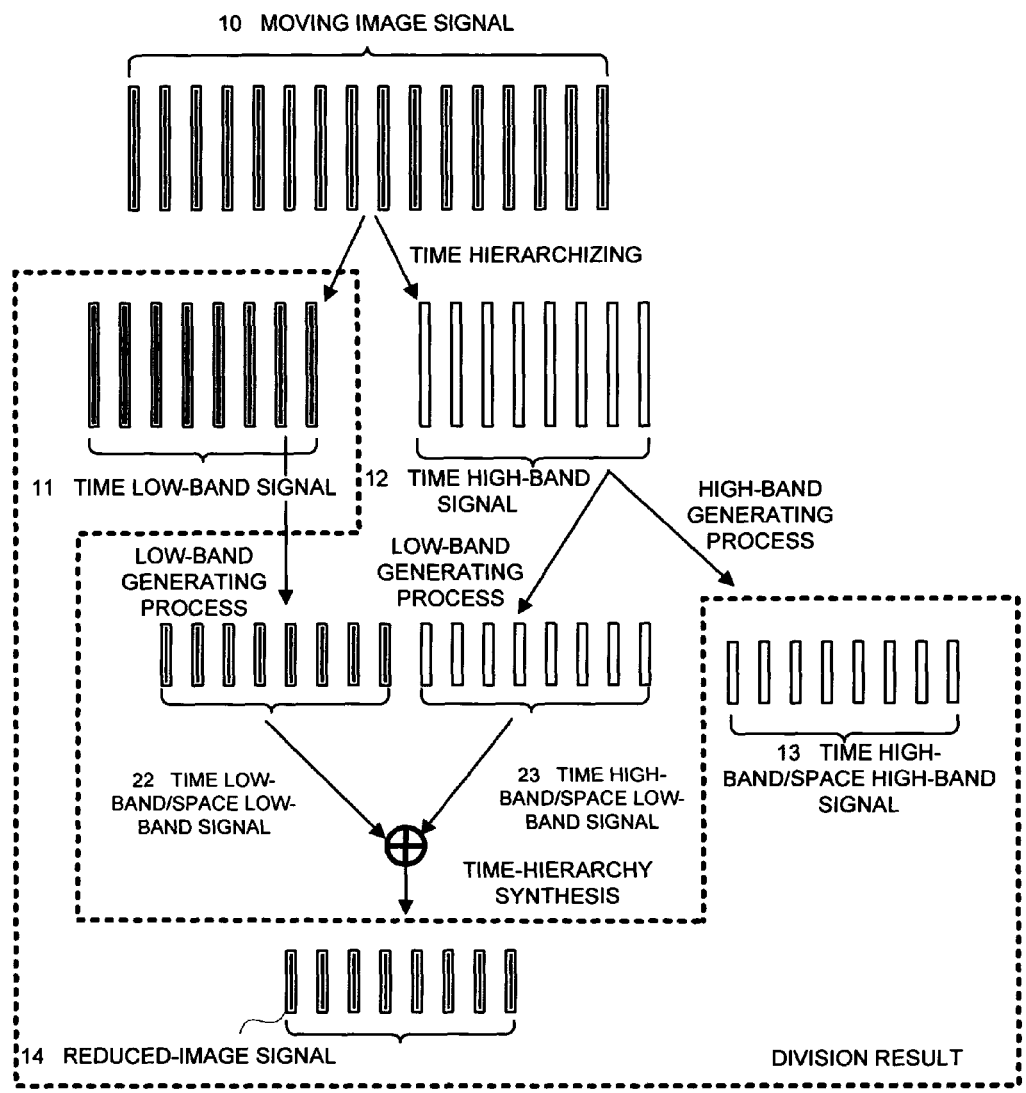
FIG. 43 is a view for explaining an outline of the time/space-division filtering in the moving image coding that signifies another characteristic of the present invention.

Herein, a time low-band signal 1010 corresponds to the time low-band signal 11 in FIG. 43, a time high-band signal 1014 to the time high-band signal 12 in FIG. 43, a time low-band/space low-band signal 1023 to the time low-band/space low-band signal 22 in FIG. 43, and a time high-band/space low-band signal 1024 to the time high-band/space low-band signal 23 in FIG. 43, respectively. Additionally, the predicted signal 1026 is a signal that is used at the time of the time-hierarchy synthesis in FIG. 43.

Next, the time high-band/space low-band signal reconfigurer 170 of the decoding apparatus that corresponds to the foregoing reduced-image generator 110 will be explained. Additionally, only the portion different from the foregoing time high-band/space low-band signal reconfigurer 170 will be explained.

Figure 16:
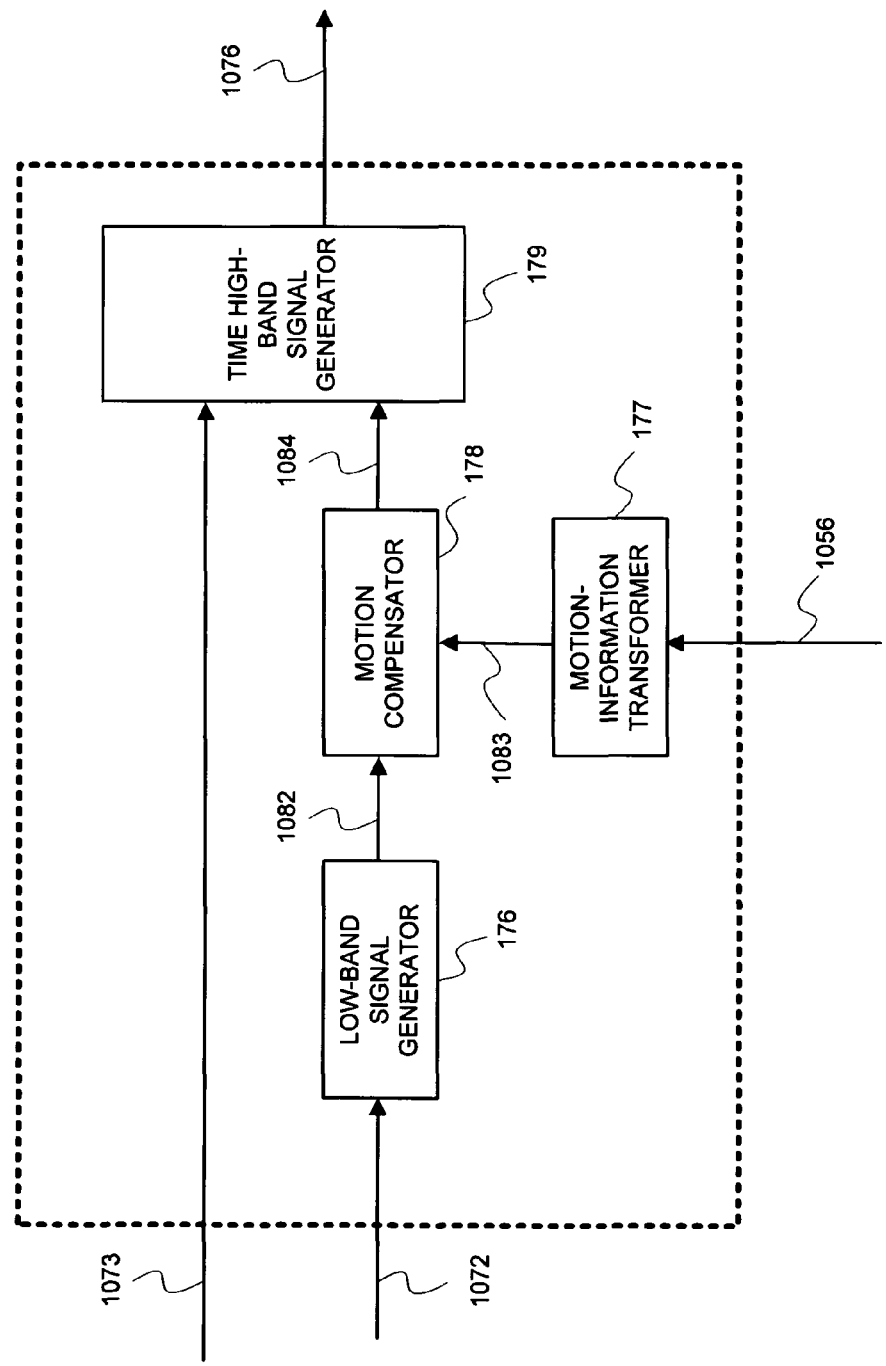
FIG. 16 is a configuration view of the time high-band/space low-band signal reconfigurer 170 that corresponds to the second reduced-image generator 110 shown in FIG. 7.

In FIG. 16, a low-band signal generator 176 generates a time low-band/space low-band signal 1082 that is the space low-band component of a time low-band signal 1072. A motion-information transformer 177 generates motion information 1083 having motion information 1056 reduced responding to a ratio of the resolution by the low-band signal generation. A motion compensator 178 performs a motion compensating process for the time low-band/space low-band signal 1082 based upon the motion information 1083, and generates a predicted signal 1084. A time high-band signal generator 179 performs a high-band signal generation filtering process for a reduced-image signal 1073 and the predicted signal 1084 similarly to the time high-band signal generator 114 in FIG. 5, and outputs a time high-band/space low-band signal 1076.

Hereinafter, a specific embodiment of the moving image coding apparatus and the moving image decoding apparatus employing the time/space-two-division filtering and the time/space-synthesis filtering that are a characteristic of the present invention will be explained.

Embodiment 1

The time/space-two-division filtering, its procedure of recursive execution, and a method of realizing the signal coding process in the moving image coding apparatus in the embodiment 1 of the present invention will be explained by employing FIG. 1 to FIG. 9.

FIG. 1 is a block diagram illustrating a configuration of the moving image coding apparatus of the embodiment 1 of the present invention. In FIG. 1, the moving image coding apparatus is configured of a time/space frequency divider 101, a reduced-image signal coder 102, a time/space high-band signal coder 103, a motion-information coder 104, and a multiplexer 105. A flow of the process of the coding apparatus as the embodiment 1 will be explained by employing FIG. 1.

At first, the time/space frequency divider 101 assumes an input image signal 1000 to be an input, and generates a reduced-image signal 1001 having each frame configuring an input image signal 1000 reduced, a time/space high-band signal 1002 having a time-directional correlation removed further from the time high-band signal having a correlation with the reduced-image signal 1001 removed from the input image signal 1000, and motion information 1003.

The reduced-image signal 1001 is recursively input into the time/space frequency divider 101, or is output to the reduced-image signal coder 102. The number of times of the recursive operation of the time/space frequency divider 101 is decided by the hierarchy number of the spatial scalability based upon the technology of the present invention. For example, upon assuming the hierarchy number of the spatial scalability to be three, the number of times of the recursive operation to the time/space frequency divider 101 is two. The reduced-image signal 1001, the time high-band/space high-band signal 1002, and the motion information 1003 are generated at each operation.

Figure 2:
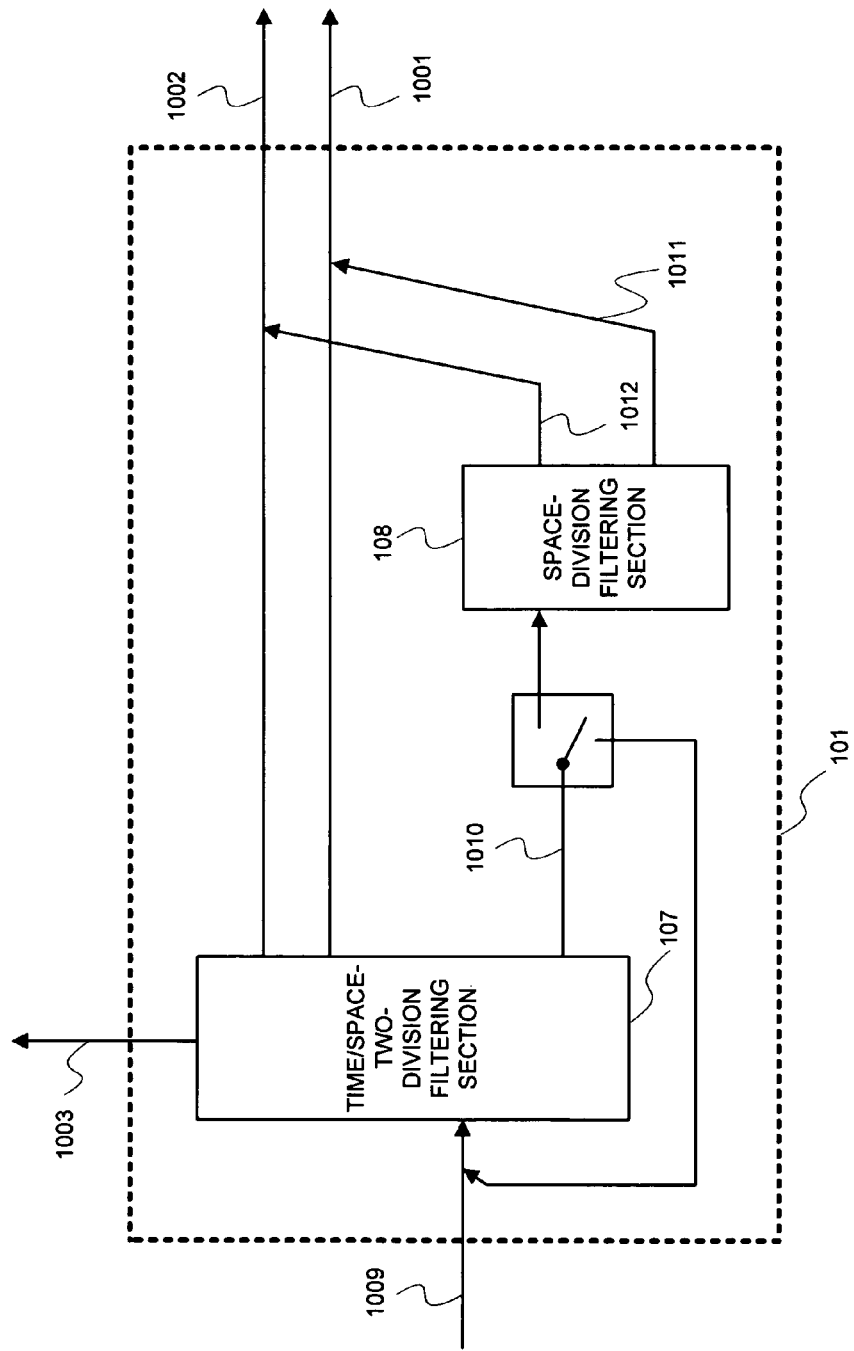
FIG. 2 is a block diagram illustrating a configuration of the time/space frequency divider 101.

FIG. 2 is a block diagram illustrating a configuration of the time/space frequency divider 101. A flow of the process of the time/space frequency divider 101 will be explained by employing FIG. 2.

An input image signal 1000 and a reduced-image signal 1001, being an output of the time/space frequency divider 101 are called a process-object signal 1009 as a whole. From the process-object signals 1009 that are comprised of N (N is the power of 2) sheets of continuous frames, a time/space-two-division filtering section 107 generates a time/space high-band signal 1002 and the reduced-image signal 1001 equivalent to N/2 sheets of frames and a time low-band signal 1010 equivalent to N/2 sheets of frames. The time/space-two-division filtering is performed over again for the time low-band signal 1010, which is regards as the process-object signal that is an input, out of them. This repeating process is performed until the number of the frames configuring the time low-band signal 1010 becomes one. Thereafter, the time low-band signal 1010 is frequency-divided in the spatial direction by a space-division filtering section 108, and a time low-band/space low-band signal 1011 and a time low-band/space high-band signal 1012 are generated. The time low-band/space low-band signal 1011 is output as a reduced-image signal 1001 and the time low-band/space high-band signal 1012 as a time/space high-band signal 1002.

In addition to the subband-division filter that is typified by the wavelet transform, an arbitrary filter for allowing the resolution to be reduced is employed for the low-band generating process that is performed in the space-division filtering section 108. With the former, the subband-division filter that corresponds to the low-band generating process is employed for the high-band generating process. With the latter, a difference signal having the already-upsampled reduced-signal subtracted from the signal that becomes an input is employed.

Figure 3:
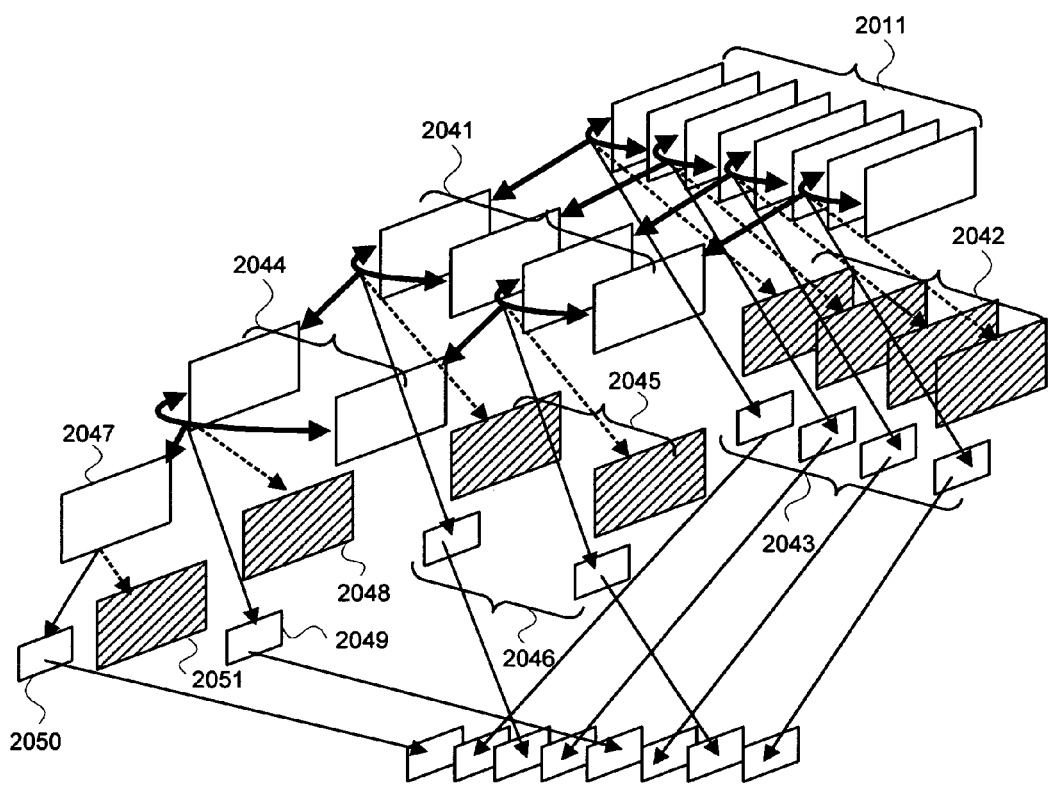
FIG. 3 is a conceptual view illustrating the subband division in the time direction and in the spatial direction in the time/space frequency divider 101.

FIG. 3 is a conceptual view illustrating the subband-division in the time direction and in the spatial direction in the time/space frequency divider 101.

An input image signal 2011, for which the time/space-two division filtering is performed once by a time/space-two-division filtering section 107, is divided into a time low-band signal 2041, a time/space high-band signal 2042, and a reduced-image signal 2043. The time low-band signal 2041, for which the time/space-two division filtering is performed once by the time/space two-division filtering section 107, is divided into a time low-band signal 2044, a time/space high-band signal 2045, and a reduced-image signal 2046. The time low-band signal 2044 is divided into a time low-band signal 2047, a time/space high-band signal 2048, and a reduced-image signal 2049 with the one-time time/space-two-division filtering. The time low-band signal 2047 is divided into a space low-band signal 2050 and a space high-band signal 2051 by a space-division filtering section 108. The time/space high-band signals 2042, 2045, and 2048, and the space high-band signal 2051 are a time/space high-band signal 1002 that is an output of the time/space frequency divider 101, respectively, and the reduced image signals 2043, 2046, and 2049, and the space low-band signal 2050 are a reduced-image signal 1001 that is an output of the time/space frequency divider 101, respectively.

FIG. 4 is a block diagram illustrating a configuration of the time/space-two-division filtering section 107. A flow of the process of the time/space-two-division filtering section 107 will be explained by employing FIG. 4.

It is assumed that an input image signal 1000, a reduced-image signal 1001, and a time low-band signal 1010 that become an input into the time/space-two-division filtering section 107 respectively are called a division-object signal 1013 as a whole. A time-directional filtering section 109 divides the division-object signal 1013 into a time low-band signal 1010 and a time high-band signal 1014, and simultaneously therewith, outputs motion information 1003 employed for the motion compensation. A reduced-image generator 110 generates a reduced-image signal 1001 from the time low-band signal 1010, the time high-band signal 1014, and the motion information 1003. A high-band signal generator 111 generates a time high-band/space high-band signal 1002 with the time high-band signal 1014 assumed to be an input. The high-band division in the high-band signal generator 111 is identical to the high-band generating process in the space-division filtering section shown in FIG. 2. Additionally, the time/space-two-division filtering section 107 shown in FIG. 4 is one example of the circuit configuration for realizing the time/space-division filtering shown in FIG. 25 that is characteristic of the present invention. The moving image signal 10, the time low-band signal 11, the time high-band signal 12, the time high-band/space high-band signal 13, and the reduced-image signal 14 in FIG. 25 can be caused to correspond to the division-object signal 1013, the time low-band signal 1010, the time high-band signal 1014, the time high-band/space high-band signal 1002, and the reduced-image signal 1001 of FIG. 4, respectively.

Figure 5:
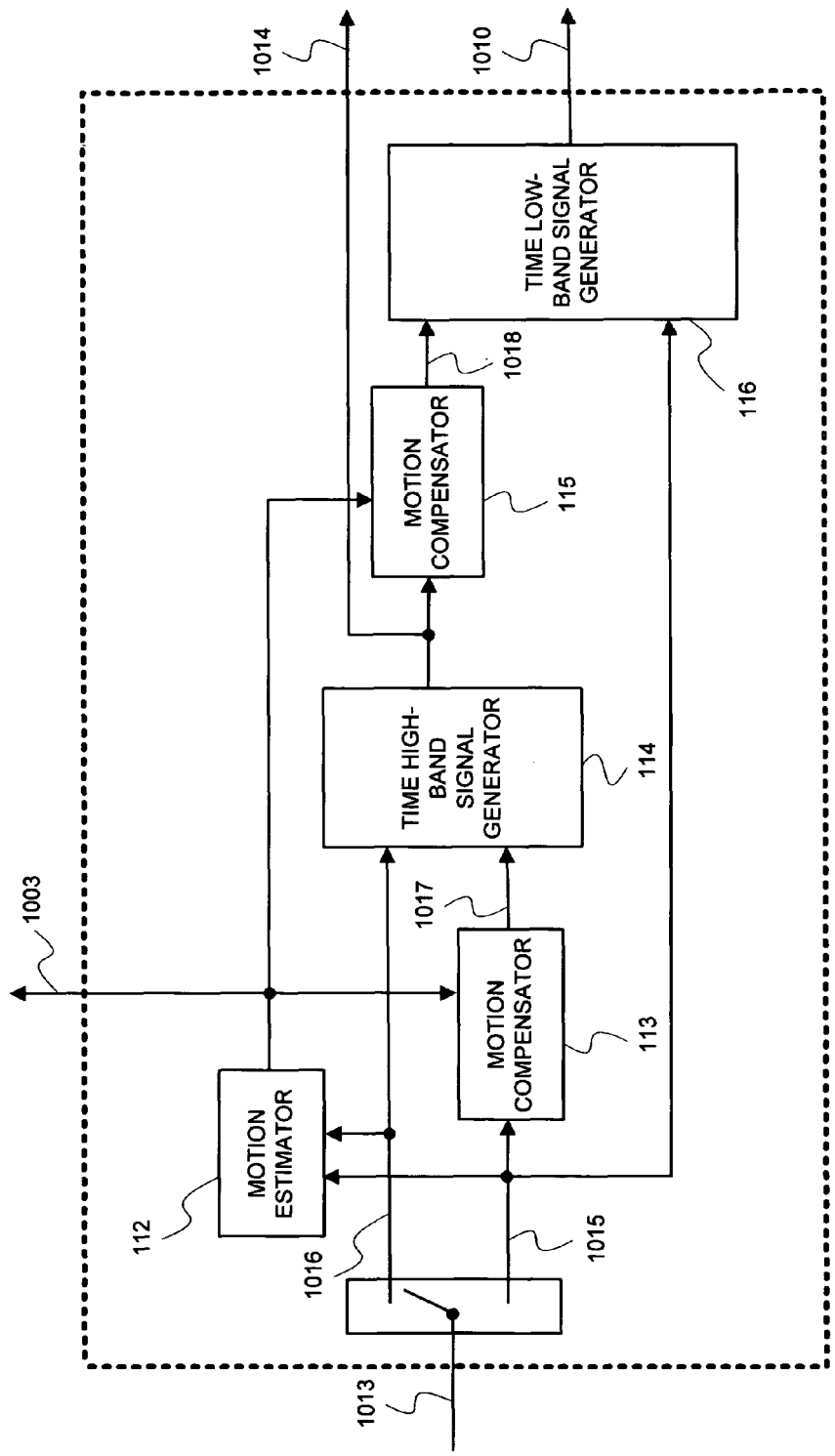
FIG. 5 is a block diagram illustrating a configuration of the time-directional filtering section 109.

FIG. 5 is a block diagram illustrating a configuration of the time-directional filtering section 109. A flow of the process of the time-directional filtering will be explained by employing FIG. 5.

A division-object signal 1013 is classified into a division-object signal 1015, which is transformed into the time low-band signal, and a division-object signal 1016, which is transformed into the time high-band signal, in the time-directional filtering. A motion estimator 112 generates motion information 1003 that specifies the motion compensation of the division-object signal 1015 and the division-object signal 1016.

A motion compensator 113 performs a motion-compensation prediction with the division-object signal 1015 assumed to be a reference signal, and generates a predicted signal 1017 for the division-object signal 1016. A time high-band signal generator 114 performs a high-band signal generating filtering process for the division-object signal 1016 and the predicted signal 1017 pixel by pixel, and generates a time high-band signal 1014.

A motion compensator 115 performs a motion compensating process for the time high-band signal 1014 based upon the motion information 1003, and generates a motion-compensation time high-band signal 1018 caused to correspond to each pixel on the division-object signal 1015.

A time low-band signal generator 116 performs a low-band signal generating filtering process for the division-object signal 1015 and the motion-compensation time high-band signal 1018 pixel by pixel, and generates a time low-band signal 1010. A Harr wavelet transform or a five-three-tap wavelet transform is employed as the high-band signal generation filtering process and the low-band signal generation filtering process. Alternately, a difference generating process is employed as the high-band signal generation filtering process, and the conventional intra-frame prediction coding process for allowing the division-object signal to be output without transform is employed as the low-band signal generation filtering process.

Figure 6:
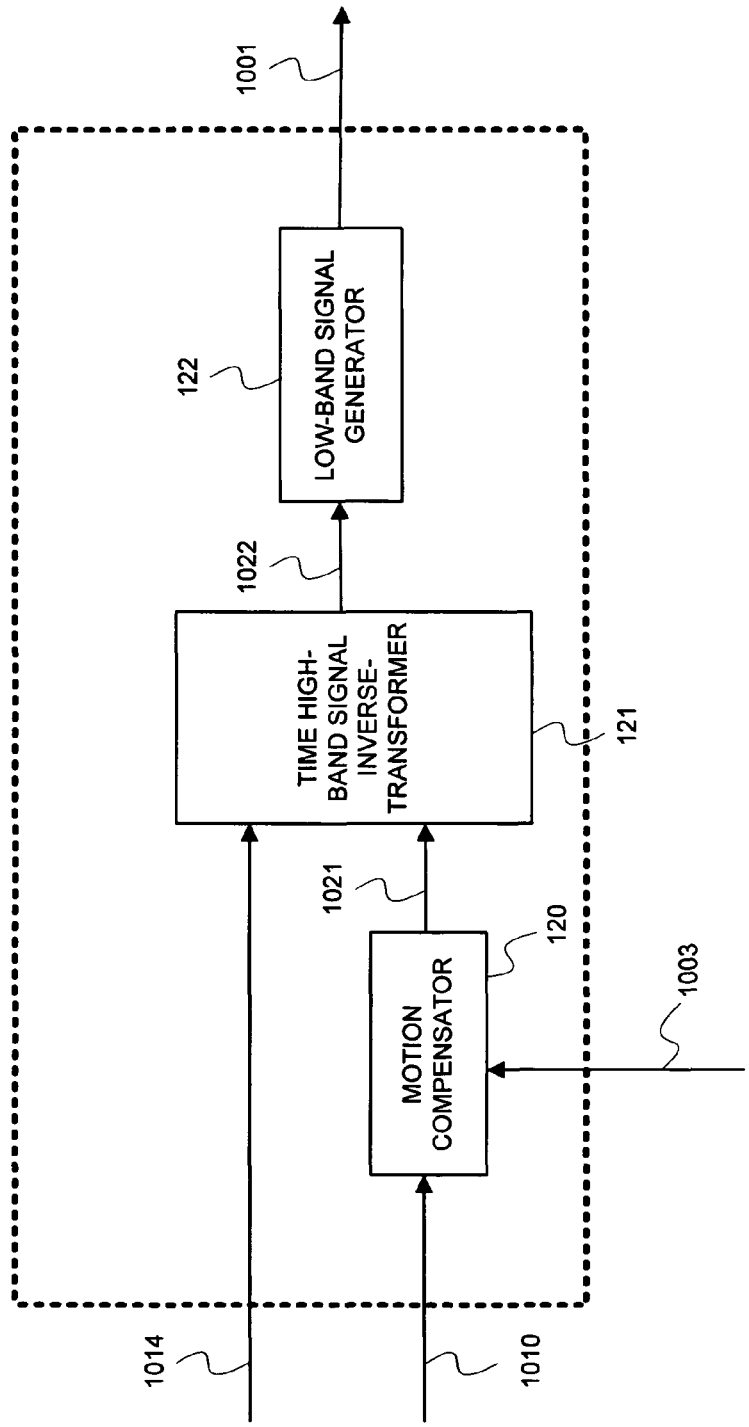
FIG. 6 is a block diagram illustrating a configuration of the reduced-image generator 110.

FIG. 6 is a block diagram illustrating a configuration of the reduced-image generator 110. A flow of the process of the reduced-image generator 110 will be explained by employing FIG. 6.

A motion compensator 120 performs a motion compensating process identical to that of the motion compensator 113 in FIG. 5 for a time low-band signal 1010, and generates a predicted signal 1021.

A time high-band signal inverse-transformer 121 generates a moving image signal 1022 from a time high-band signal 1014 and the predicted signal 1021. The process in the time high-band signal inverse-transformer 121 is an inverse transform of the high-band signal generation filtering process in the time high-band signal generator 114 in FIG. 5. In a case where the division-object signal 1015 and the time low-band signal 1010 in FIG. 5 are not identical to each other, the moving image signal 1022 is not identical to the division-object signal 1016 in FIG. 5. A low-band signal generator 122 downsamples the moving image signal 1022, and generates a reduced-image signal 1001.

Above, explanation of the time/space frequency divider 101 in FIG. 2 is finished, and further, a flow of the coding process as the present invention will be continuously explained by employing FIG. 1.

A motion-information coder 104 codes motion information 1003 generated by the time/space frequency divider 101. As explained in FIG. 4 and FIG. 5, the motion information 1003 specifies the motion compensation for the image signal having a different resolution, i.e. an input image signal 1000 or a reduced-image signal 1001.

A motion-information coder 104 employs, in coding the motion information having a different resolution, a correlativeness between pieces of the motion information of the blocks that neighbor each other in the spatial direction, or employs a correlativeness between pieces of the motion information in the different resolutions, thereby to reduce redundancy of information.

The reduced-image signal 1001 and a time/space high-band signal 1002 generated by the time/space frequency divider 101 are coded by texture-signal coders 102 and 103, respectively.

A motion-information coded-data 1006 generated by the motion-information coder 104, and texture signal coded-data 1004 and 1005 generated by the texture signal coders 102 and 103 respectively, which are multiplexed by a multiplexer 105 respectively, are output as a coded data 1007.

Figure 8:
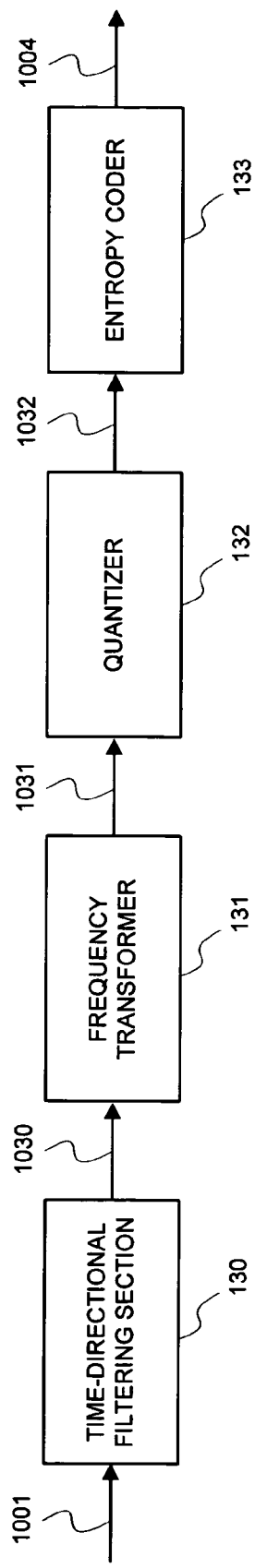
FIG. 8 is a block diagram illustrating a configuration of the reduced-image signal coder 102.

FIG. 8 is a block diagram illustrating a configuration of the reduced-image signal coder 102. A flow of the process of the reduced-image signal coder will be explained by employing FIG. 8. A reduced-image signal 1001 is transformed into a texture signal 1030 having time-directional redundancy removed by a time-directional filtering section 130. The frequency transform in the time direction that accompanies the motion compensation as shown in FIG. 5, or the intra-motion-compensation-frame prediction coding is employed as the time-directional filtering.

The texture signal 1030 is transformed by a frequency transformer 131, and a frequency transform coefficient 1031 is generated. As the process in the frequency transformer 131 is listed the transforming process in the block unit that is typified by the discrete cosine transform, or the subband dividing process that is typified by the wavelet transform. The frequency transform coefficient 1031 is quantized by a quantizer 132, and a quantized-transform coefficient 1032 is generated. As the process in the quantizer 132 is listed the hierarchy-quantization for quantizing an error with the frequency transform coefficient, which becomes an input after having been quantized in a certain quantizing step, in a finer quantizing step, or the bitplane coding for binarizing each frequency transform coefficient to sequentially output them in the order of the high-ranked value to the low-ranked value in addition to the quantization based upon a single quantizing step. The quantized transform coefficient 1032 is entropy-coded by an entropy coder 133, and a reduced-image signal coded-data 1004 is generated. As the entropy coding is employed the arithmetic coding in addition to the variable length coding (VLC) for coding according to a pre-decided Huffman table. Additionally, it does not matter that the time-directional filtering section 130 is omitted. Further, it does not matter that the frequency transformer 131 and the quantizer 132 are omitted.

Figure 9:
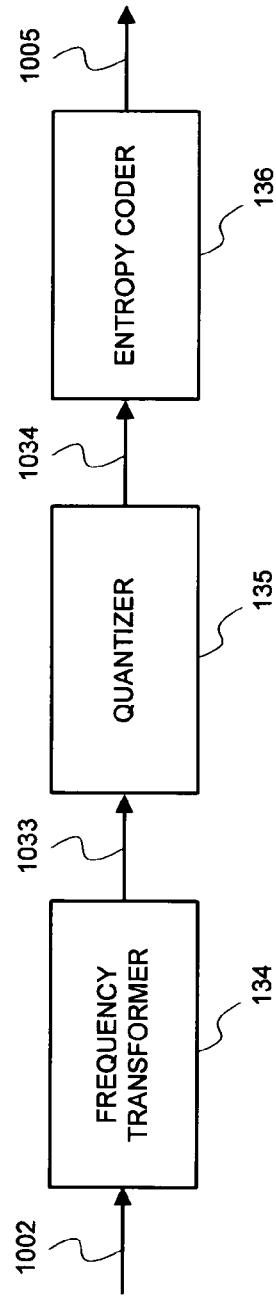
FIG. 9 is a block diagram illustrating a configuration of the time/space high-band signal coder 103.

FIG. 9 is a block diagram illustrating a configuration of the time/space high-band signal coder 103. A time/space high-band signal 1002 is transformed by a frequency transformer 134, and a frequency transform coefficient 1033 is generated. The frequency transform coefficient 1033 is quantized by a quantizer 135, and a quantization transform coefficient 1034 is generated. The quantization transform coefficient 1034 is entropy-coded by an entropy coder 136, and a reduced-image signal coded-data 1005 is generated. Additionally, it does no matter that the frequency transformer 134 and the quantizer 135 are omitted.

Further, for the frequency transformer 134, the quantizer 135, and the entropy coder 136 in FIG. 9 may be employed ones different from the frequency transformer 131, the quantizer 132, and the entropy coder 133 in FIG. 8, respectively. That is, it does not matter that the discrete cosine transform is employed for the frequency transform, and the non-scalable coding technique, in which the quantization is performed based upon a single quantizing step, is employed for the quantizer together with the reduced-image coder 102 and the time/space high-band signal coder 103 respectively. Alternatively, it does not matter that the discrete cosine transform is employed for the frequency transform and the scalable coding technique for quantizing based upon a single quantizing step is employed for the quantizer in the reduced-image signal coder 102 respectively, and it does not matter that the wavelet transform is employed for the frequency transform and the scalable coding technique for allowing the bitplane coding to be performed is employed for the quantizer in the time/space high-band signal coder 103 respectively.

Next, the moving image decoding apparatus of the moving-image coded as mentioned above will be explained.

The time/space-synthesis filtering, its procedure of recursive execution, and the method of realizing the signal decoding process in the moving image decoding apparatus that is the embodiment 1 of the present invention will be explained by employing FIG. 10 to FIG. 17.

Figure 10:
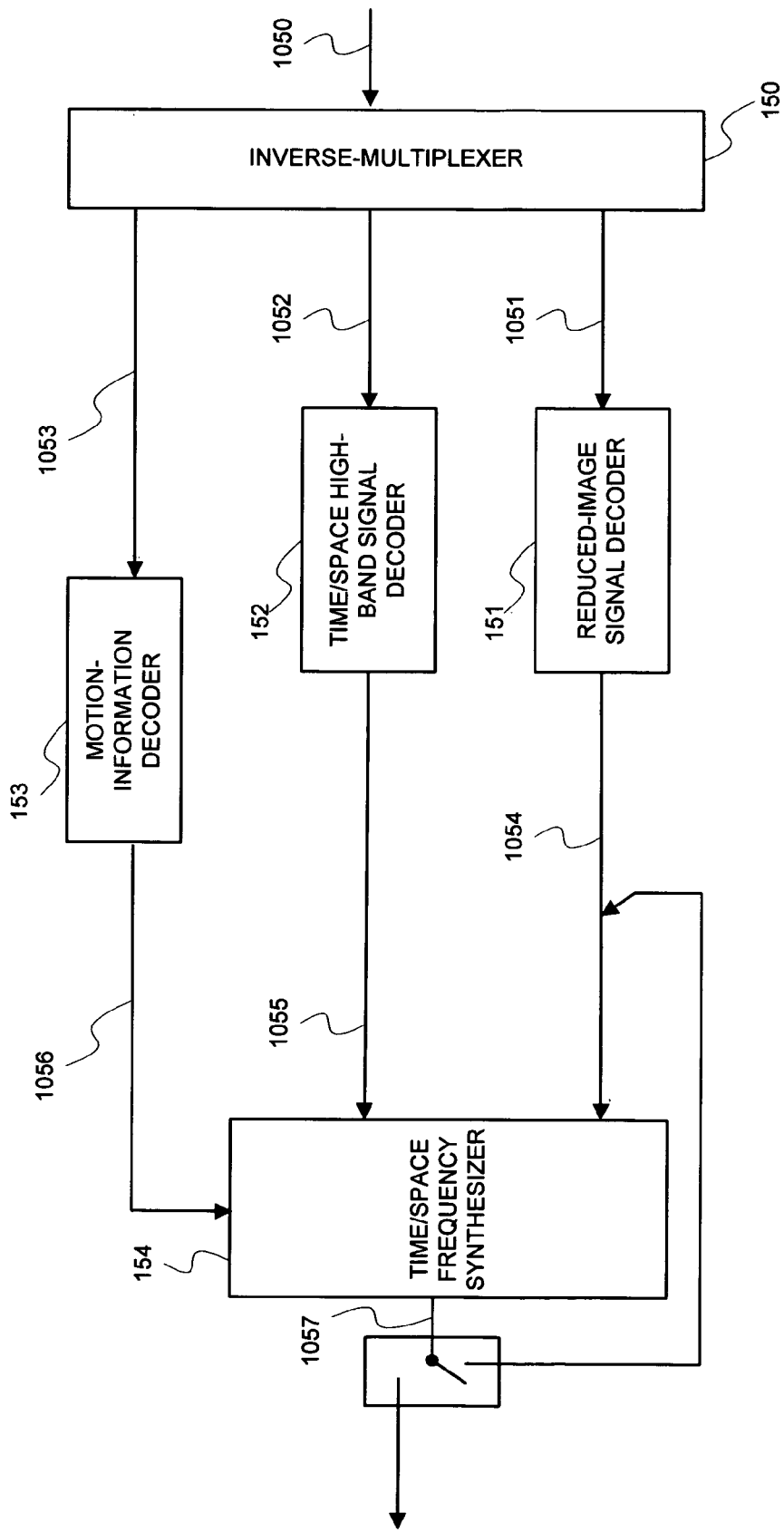
FIG. 10 is a block diagram illustrating a configuration of the moving image decoding apparatus of the embodiment 1 of the present invention.

FIG. 10 is a block diagram illustrating a configuration of the moving image decoding apparatus of the embodiment 1 of the present invention. In FIG. 10, the moving image decoding apparatus is configured of an inverse multiplexer 150, a reduced-image signal decoder 151, a time/space high-band signal decoder 152, a motion-information decoder 153, and a time/space frequency synthesizer 154. A flow of the process of the decoding apparatus of the embodiment 1 will be explained by employing FIG. 10.

At first, the inverse multiplexer 150 divides a coded data 1050 into a low-band signal coded-data 1051, a high-band signal coded-data 1052, and a motion-information coded-data 1053.

The reduced-image signal decoder 151 and the time/space high-band signal decoder 152 decode the low-band signal coded-data 1051 and the high-band signal coded-data 1052, and obtain a reduced image signal 1054 and a time/space high-band signal 1055, respectively.

The motion information decoder 153 decodes the motion information coded-data 1053, and obtains motion information 1056.

The time/space frequency synthesizer 154 performs a combination of the time-directional inverse-filtering that accompanies the motion compensation to be specified by motion information 1056, and the space-directional frequency synthesis for the reduced image signal 1054 and the time/space high-band signal 1055, and generates a decoded-image signal 1057. Alternatively, the time/space frequency synthesizer 154 recursively performs a time/space frequency synthesis for the decoded-image signal 1057, which is regarded as the reduced-image signal, and the time/space high-band signal 1055 that corresponds hereto, thereby to generate the coded-image signal 1057 having a higher resolution.

FIG. 11 is a block diagram of a configuration of the reduced-image signal decoder 151.

A reduced-image signal coded-data 1051 is decoded into a quantized-transform coefficient 1060 by an entropy decoder 160.

The quantized transform coefficient 1060 is inverse-quantized by an inverse-quantizer 161, and a frequency inverse-transformer 162 performs a frequency inverse-transform for a frequency transform coefficient 1061, being an output, thereby to generate a texture signal 1063.

A time-directional inverse-filtering section 163 performs an inverse transform of the time-directional filtering in the time-directional filtering section 130 shown in FIG. 8, and generates a reduced-image signal 1054.

The entropy decoder 160, the inverse quantizer 161, the frequency inverse-transformer 162, and the time-directional inverse-filtering section 163 correspond to the entropy coder 133, the quantizer 132, the frequency transformer 131, and the time-directional filtering section 130 in FIG. 8, respectively.

In a case where the reduced image coder 102 omits any of the quantizer 132, the frequency transformer 131, and the time-directional filtering section 130, the inverse-quantizer 161, the frequency inverse-transformer 162, and the time-directional inverse-filtering 163 of FIG. 11 as well are omitted similarly.

FIG. 12 is a block diagram illustrating a configuration of the time/space high-band signal decoder 152.

A time/space high-band signal coded-data 1052 is decoded into a quantized-transform coefficient 1063 by an entropy decoder 164. The quantized-transform coefficient 1063 is inverse-quantized by an inverse-quantizer 165, and a frequency inverse-transformer 166 performs a frequency inverse-transform for a frequency transform coefficient 1064, being an output, thereby to generate a time/space high-band signal 1055. The entropy decoder 164, the inverse quantizer 165, and the frequency inverse-transformer 166 correspond to the entropy coder 136, the quantizer 135, and the frequency transformer 134 in FIG. 9, respectively.

In a case where the reduced-image coder 102 omits any of the quantizer 135 and the frequency transformer 134, the inverse-quantizer 165 and the frequency inverse-transformer 166 of FIG. 12 as well are omitted similarly.

Figure 13:
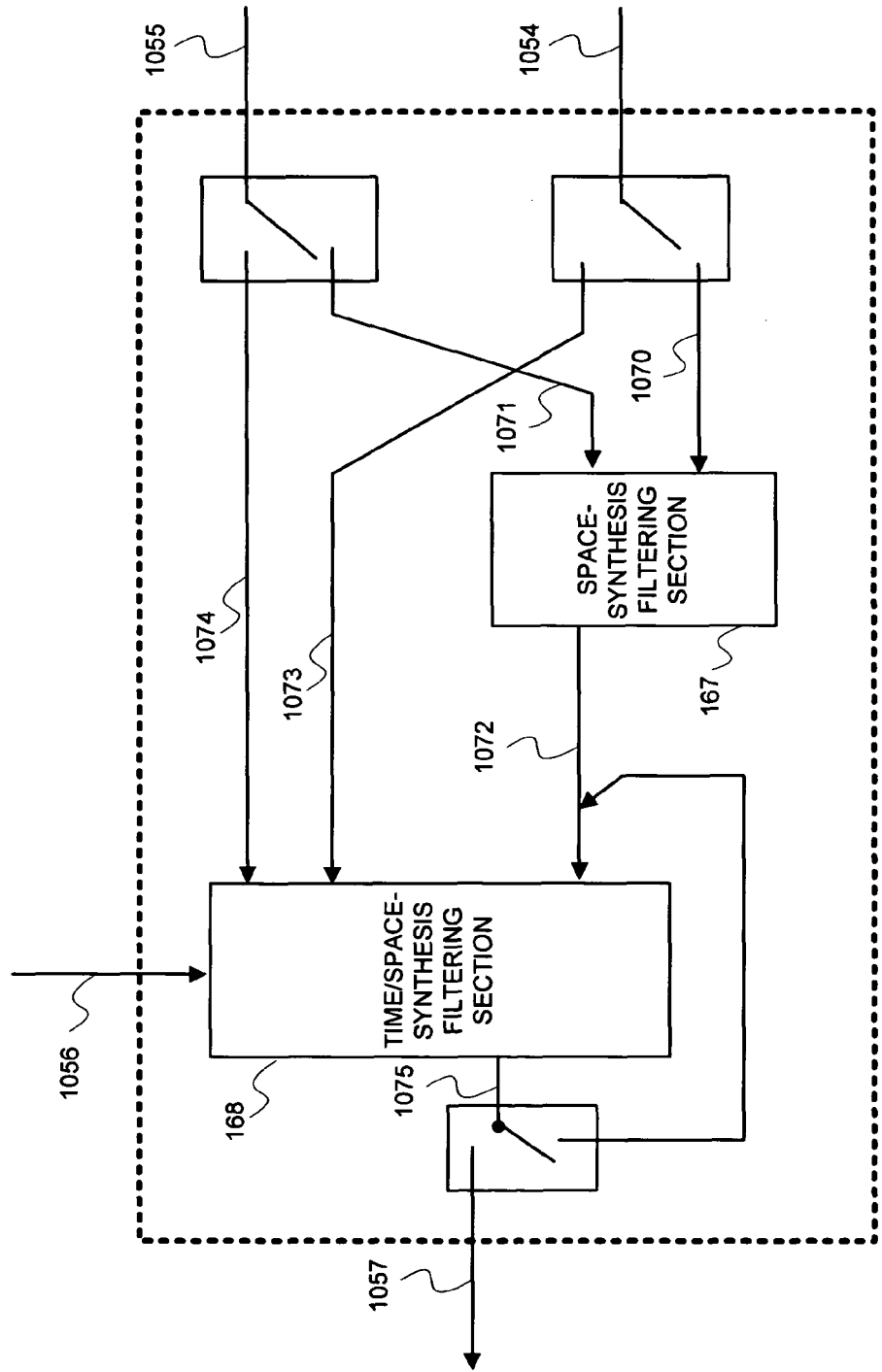
FIG. 13 is a block diagram illustrating a configuration of the time/space frequency synthesizer 154.

FIG. 13 is a block diagram illustrating a configuration of the time/space frequency synthesizer 154. A flow of the process of the time/space frequency synthesis will be explained by employing FIG. 13.

A space-synthesis filtering section 167 performs a space-synthesis filtering for one frame of signals out of continuous N frames of reduced-image signals 1054, and one frame of signals out of time/space high-band signals 1055 each having the lowest frequency band in the time direction, which are regarded as a time low-band/space low-band signal 1070 and a time low-band/space high-band signal 1071, respectively.

A time low-band signal 1072 that is an output of the space-synthesis filtering section 167, and a reduced-image signal 1073 corresponding to the time high-band signal and a time/space high-band signal 1074 that form a counterpart hereto are synthesized with the time/space-synthesis filtering in a time/space-synthesis filtering section 168, which accompanies the motion compensation based upon motion information 1056, and two frames of decoded-image signals 1075 are obtained. The time/space-synthesis filtering section 168 recursively performs a time/space-synthesis filtering for this decoded-image signal, which is regarded as the time low-band signal 1072, and the reduced image signal 1073 and the time/space high-band signal 1074 that form a counterpart hereto.

The above process is repeated until continuous N sheets of decoded-image signals 1057 are obtained. Additionally, the space-synthesis filtering of the space-synthesis filtering section 167 is equivalent to an inverse transform of the space-division filtering of the space-division filtering section 108 in FIG. 2.

FIG. 14 is a block diagram illustrating a configuration of the time/space-synthesis filtering section 168. A flow of the process of the time/space-synthesis filtering will be explained by employing FIG. 14.

A time high-band/space low-band signal reconfigurer 170 reconfigures a time high-band/space low-band signal 1076 from the time low-band signal 1072, the reduced image signal 1073, and the motion information 1056.

A space-synthesis filtering section 171 synthesizes the time high-band/space low-band signal 1076 and the time/space high-band signal 1074, thereby to generate a time high-band signal 1077.

A time-directional inverse-filtering section 172 performs an inverse transform of the time-directional filtering in the time-directional filtering section 109 in FIG. 4 for the time high-band signal 1077 and the time low-band signal 1072 based upon the motion information 1056, thereby to generate a decoded-image signal 1075.

Figure 26:
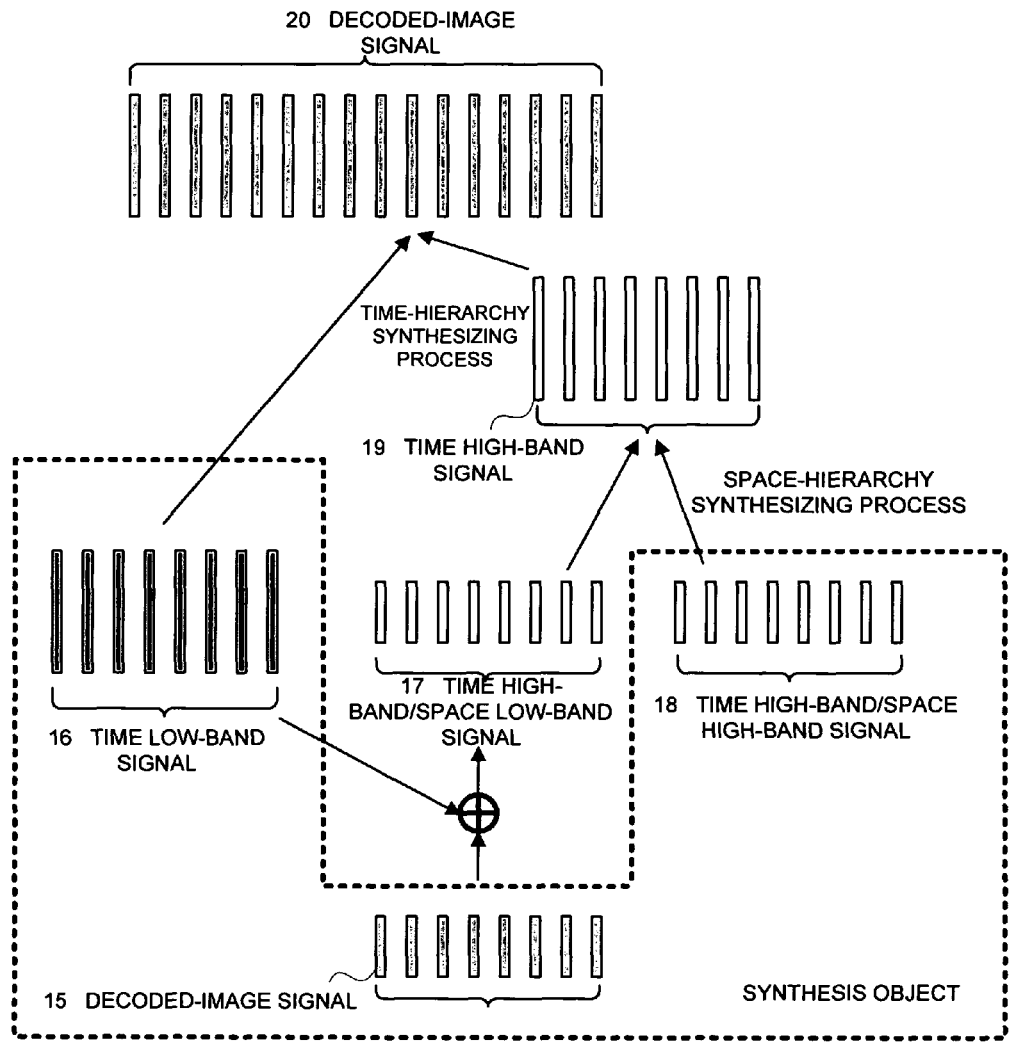
FIG. 26 is a view for explaining an outline of the time/space-synthesis filtering that is characteristic of the present invention.

Additionally, the time/space-synthesis filtering section 168 shown in FIG. 14 is one example of the circuit configuration for realizing the time/space-synthesis filtering shown in FIG. 26 that is characteristic of the present invention. The decoded-image signal 15, the time low-pass signal 16, time high-band/space low-band signal 17, the time high-band/space high-band signal 18, the time high-band signal 19, and the decoded-image signal 20 in FIG. 26 can be caused to correspond to the reduced-image signal 1073, the time low-band signal 1072, the time high-band/space low-band signal 1076, the time/space high-band signal 1074, the time high-band signal 1077 and the decoded-image signal 1075 in FIG. 14, respectively The time high-band/space low-band signal reconfigurer 170 is realized in a manner of corresponding to the reduced-image generator 110 of FIG. 4.

Figure 15:
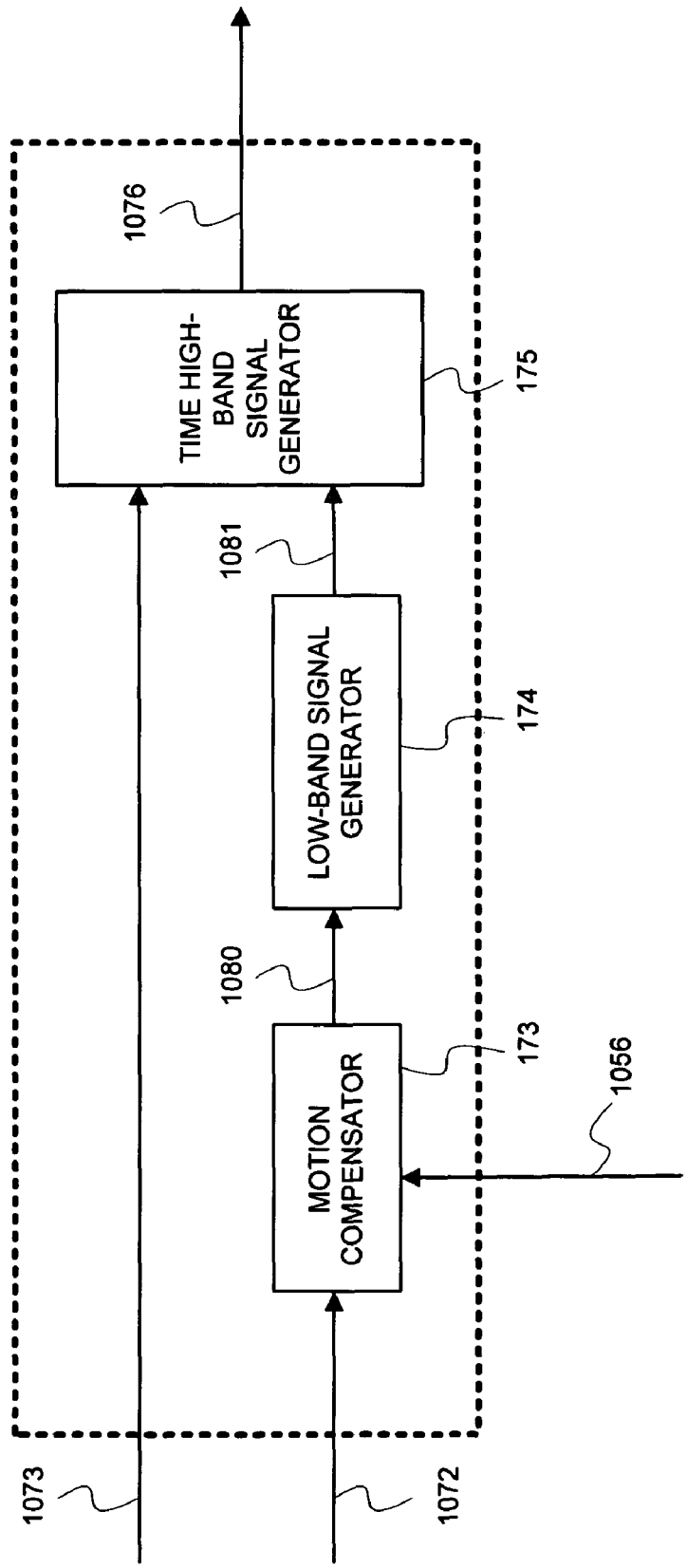
FIG. 15 is a view illustrating a configuration of the time high-band/space low-band signal reconfigurer 170 that corresponds to the reduced-image generator shown in FIG. 6.

FIG. 15 is a block diagram illustrating a configuration of the time high-band/space low-band signal reconfigurer 170 that corresponds to the reduced-image generator shown in FIG. 6. A flow of the process of the time high-band/space low-band signal reconfigurer 170 will be explained according to FIG. 15.

A motion compensator 173 performs a motion compensating process for a time low-band signal 1072 based upon motion information 1056, thereby to generate a predicted signal 1080. A low-band signal generator 174 generates a space low-band predicted-signal 1081, being the space low-band component of the predicted signal 1080. A time high-band signal generator 175 performs a transform inverse to the transform in the time high-band signal inverse-transformer 121 in FIG. 6 for a reduced-image signal 1073 and the space low-band predicted-signal 1081, thereby to generate a time high-band/space low-band signal 1076 that becomes an output.

Figure 17:
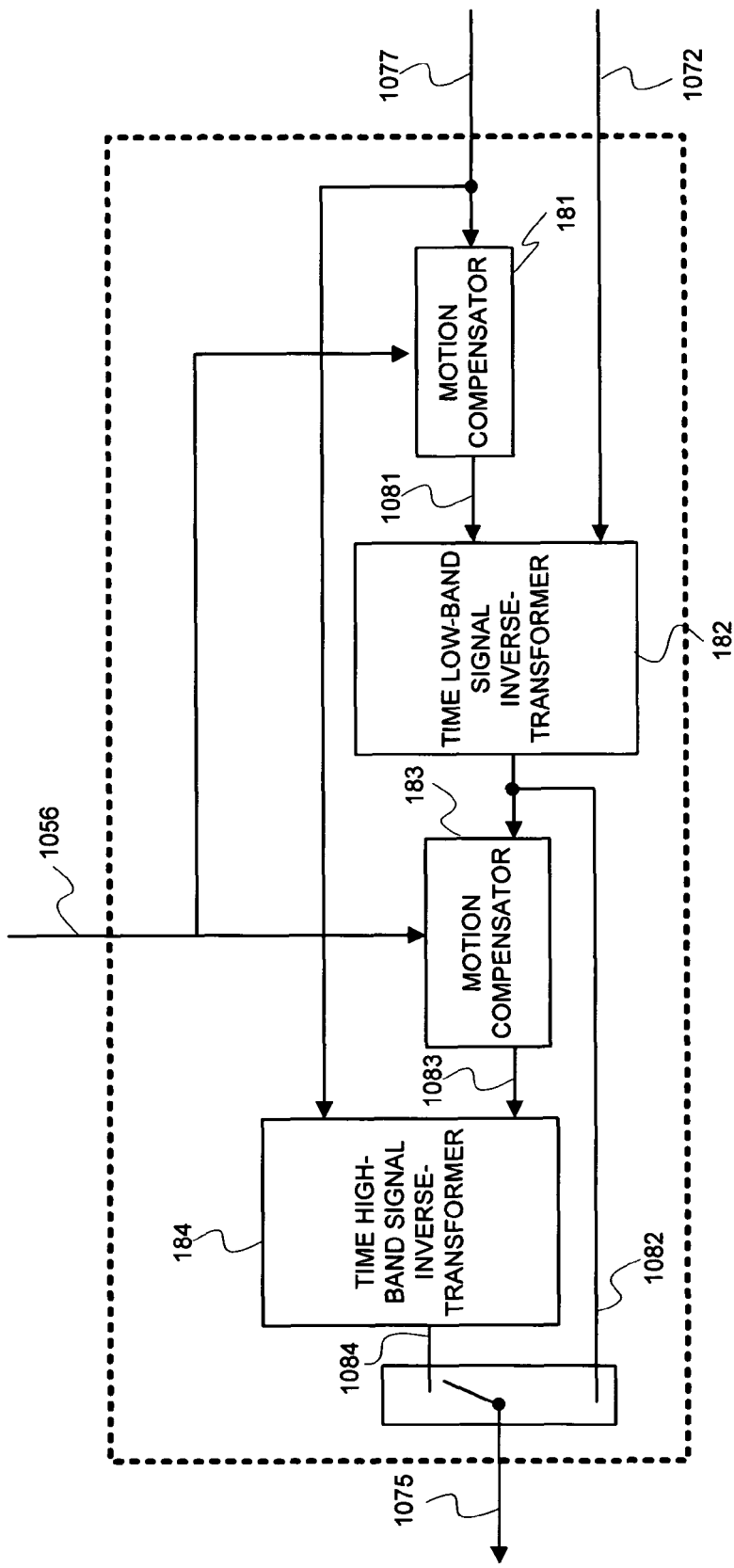
FIG. 17 is a block diagram illustrating a configuration of the time-directional inverse-filtering.
Figure 18:
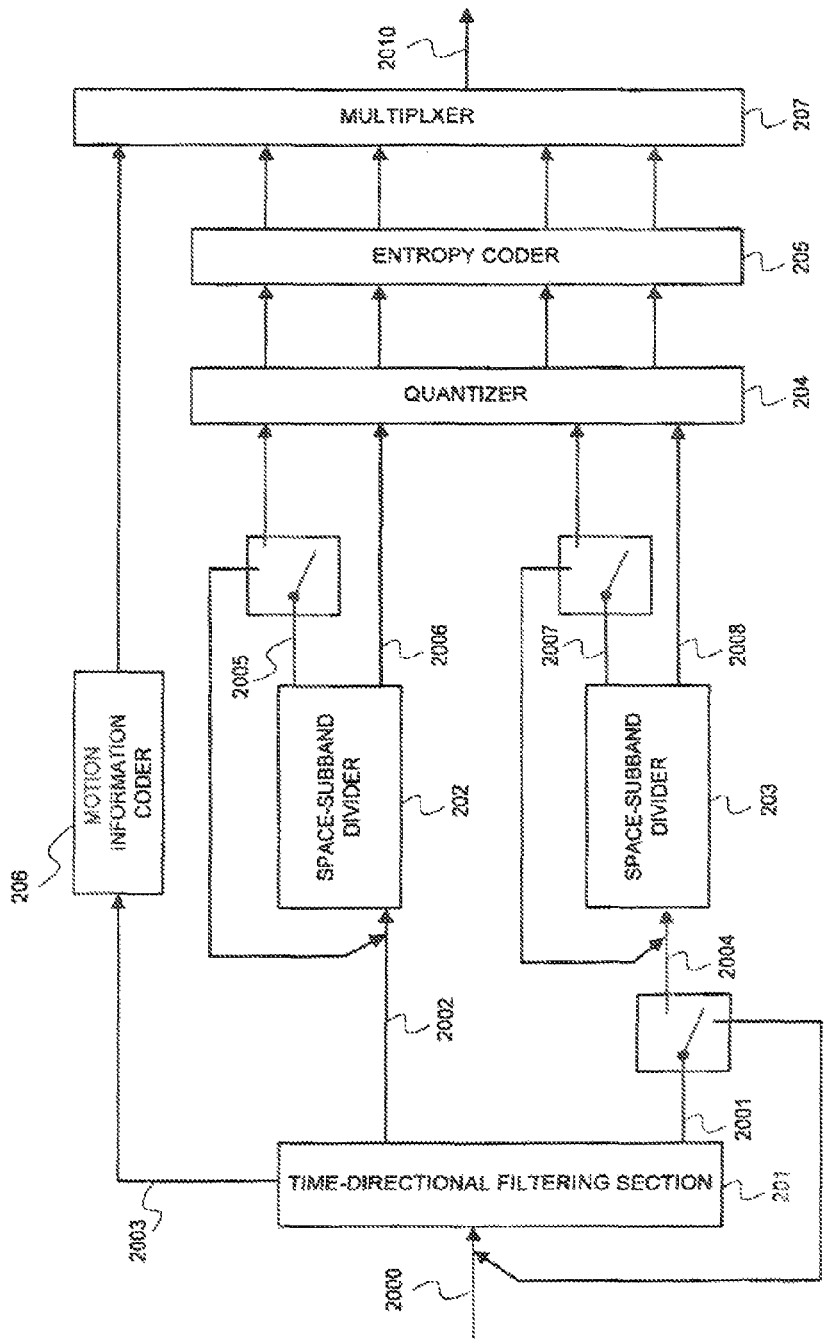
FIG. 18 is a view for explaining the prior art.
Figure 19:
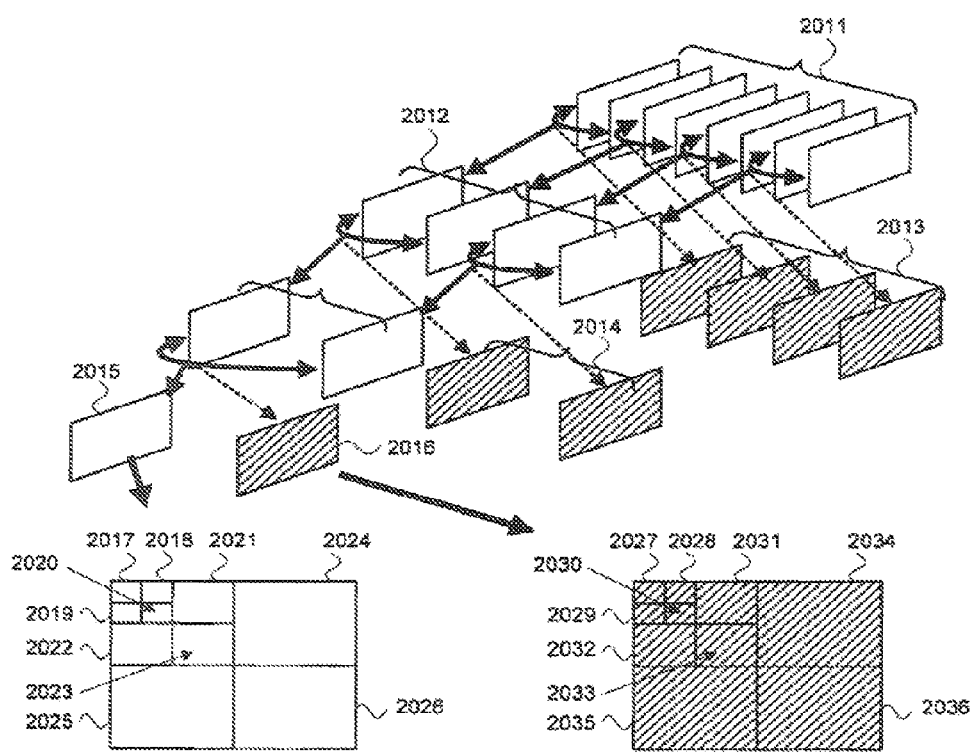
FIG. 19 is a view for explaining the prior art.

FIG. 17 is a block diagram illustrating a configuration of the time-direction inverse-filtering section 172. A flow of the process of the time-directional inverse-filtering section 172 will be explained by employing FIG. 17.

A motion compensator 181 performs a motion compensating process for a time high-band signal 1077 based upon motion information 1056, thereby to generate a motion-compensation time high-band signal 1081.

A time low-band signal inverse-transformer 182 performs an inverse transform of the low-band signal generation filtering process for a time low-band signal 1072 and the motion-compensation time high-band signal 1081 pixel by pixel, thereby to generate a decoded-image signal 1082.

A motion compensator 183 performs a motion-compensation prediction with the decoded-image signal 1082 assumed to be a reference signal, thereby to generate a predicted signal 1083.

A time high-band signal inverse-transformer 184 performs an inverse transform of the high-band signal generation filtering process for the time high-band signal 1077 and the predicted signal 1083 pixel by pixel, thereby to generate a decoded-image signal 1084. The signal having the decoded-image signals 1082 and 1084 arranged in the order of the displaying time is a decoded-image signal 1075, which becomes an output.

Above, explanation of the moving image coding apparatus and the moving image decoding apparatus of the embodiment 1 of the present invention is finished.

Figure 20:
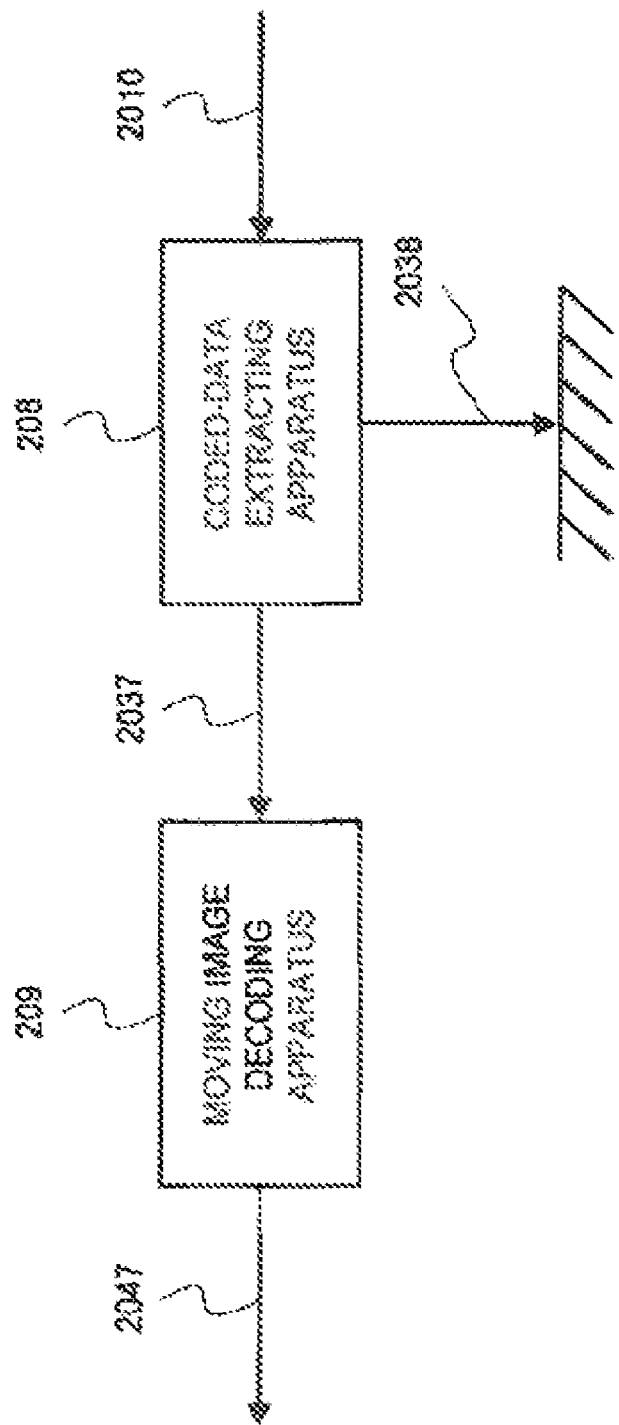
FIG. 20 is a view for explaining the prior art.
Figure 21:
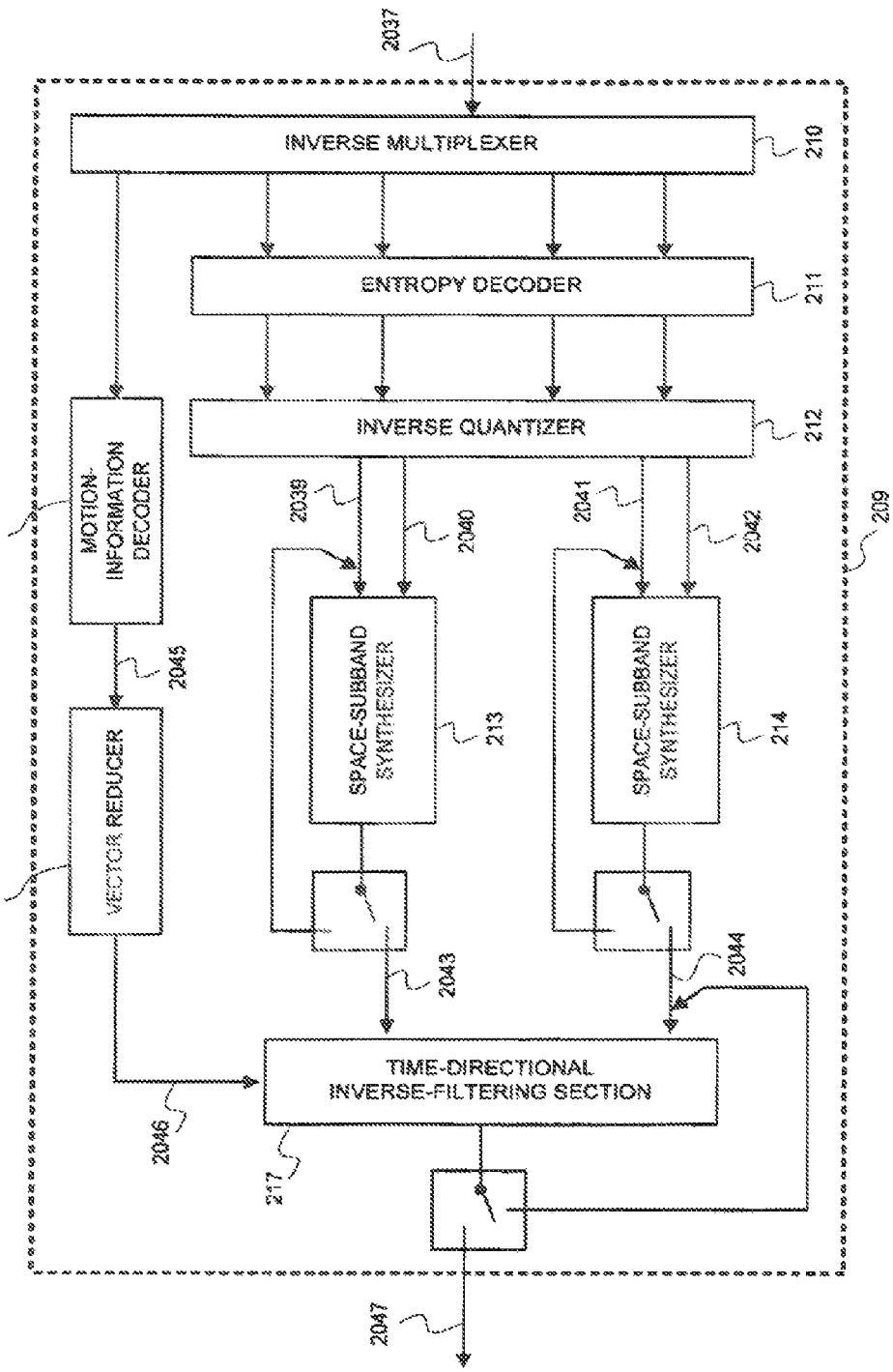
FIG. 21 is a view for explaining the prior art.
Figure 22:
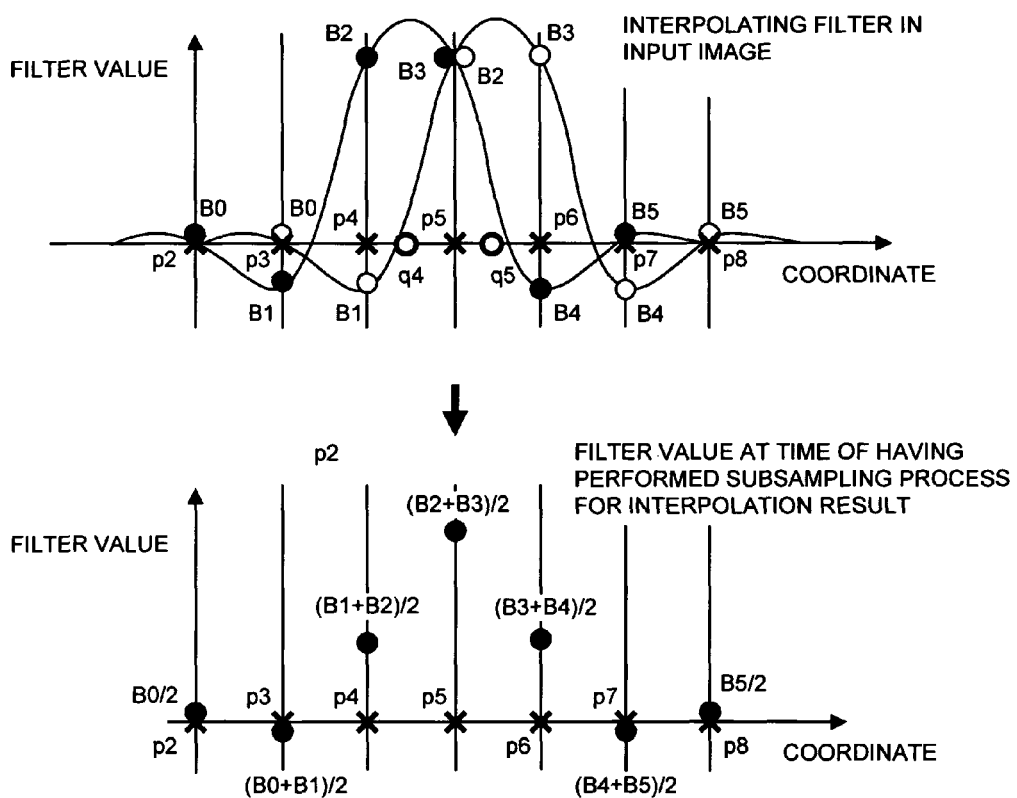
FIG. 22 is a conceptual view illustrating the one-directional pixel array and the filter coefficient by which each pixel is multiplied in order to explain that the interpolating process of the motion compensation and the subsampling process are not commutable with each other.
Figure 23:
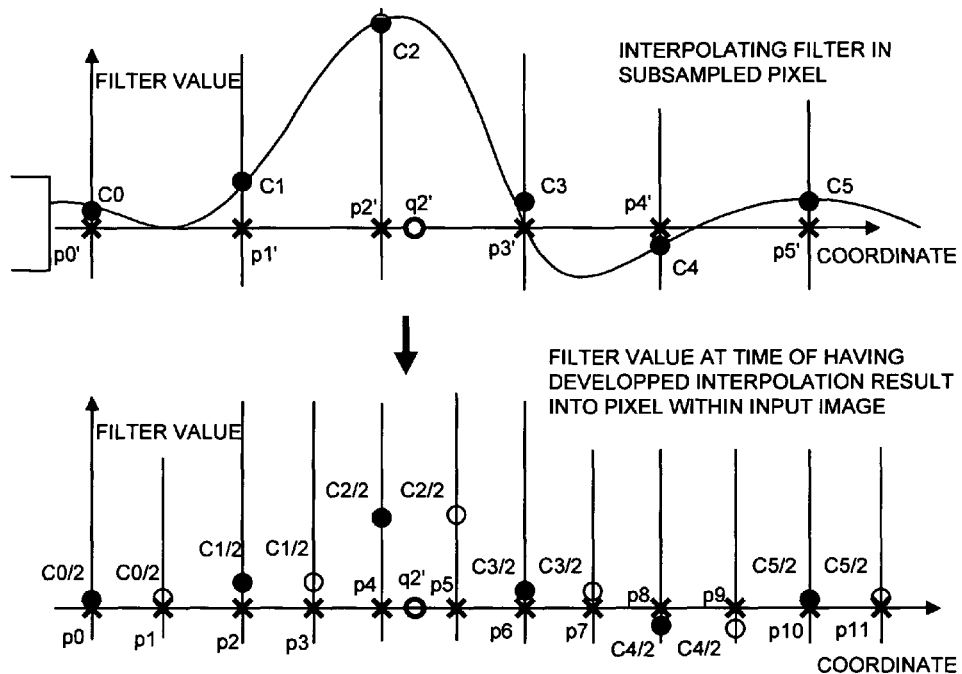
FIG. 23 is a conceptual view illustrating the one-directional pixel array and the filter coefficient by which each pixel is multiplied in order to explain that the interpolating process of the motion compensation and the subsampling process are not commutable with each other.
Figure 24:
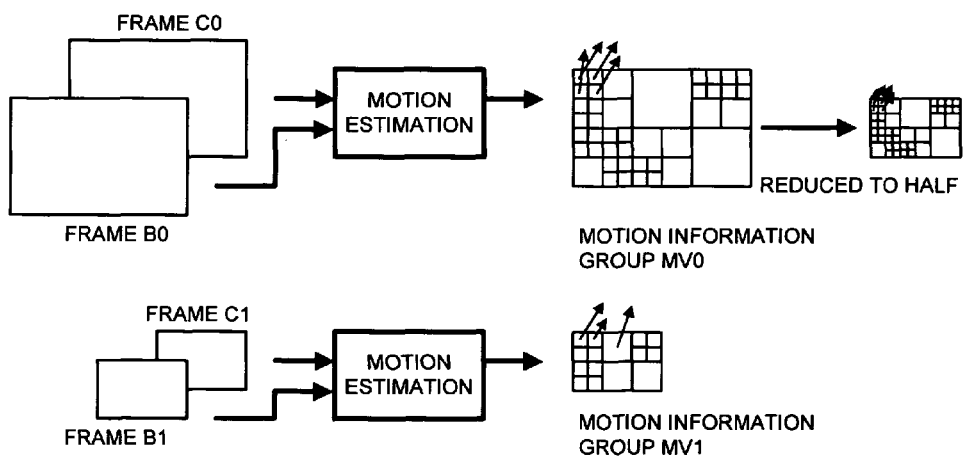
FIG. 24 is a conceptual view for explaining the overhead of the motion information.

The moving image decoding apparatus shown in the embodiment decodes the coded-data generated by the moving image coding apparatus, and reconfigures the input image signal. Further, as shown in FIG. 20, it is also possible that after a coded-data extracting apparatus 208 removes one part of the coded data of the time/space high-band signal out of the coded data, a moving image decoding apparatus 209 decodes the remaining coded data. In this case, the image signal, which has the spatial resolution and the frame rate based upon the reduced-image signal coded-data and the time/space high-band signal coded-data that are contained in the remaining coded data, is decoded. Alternatively, in a case where no time/space high-band signal coded-data is contained at all in the remaining coded data, the moving image decoding apparatus outputs a result obtained by decoding the reduced-image coded-data.

Additionally, the present invention is characterized in that in the hierarchy-coding having scalability in the spatial direction, the space high-band component is generated by performing a space-directional frequency division after performing the time-directional filtering, and with the space low-band component, the reduced image is filtered in the time direction. The reduced-image generation is performed in consideration of the time-directional filtering of the original resolution, whereby no distortion such as the MC mismatch of the prior art occurs as a matter of principle. As explained in FIG. 8 and FIG. 9, the present invention is also applicable for the case of employing the different frequency transform or the entropy coding at the time of coding the reduced-image signal and the time/space high-band signal.

Further, in the present invention, as shown in FIG. 2 and FIG. 3, N sheets of the image signals are divided into N/2 sheets of the time low-band signals and N/2 sheets of the time high-band signals with the one-time time-directional filtering, and the time-directional filtering is recursively performed for the time low-band signal; however the present invention is also applicable for the time-directional filtering based upon the other referential relation. For example, it is applicable for the case where N sheets of the image signals is divided into N/3 sheets of the time low-band signals and 2N/3 sheets of the time high-band signals with the one-time time-directional filtering.

Embodiment 2

In the foregoing embodiment 1, after the reduced-image generator 110 employs the time low-band component and the time high-band component and reconfigures the moving image signal that corresponds to the time high-band component, it performs a reducing process for this reconfiguration result, thereby to generate the reduced-image signal of the moving image. However, in the method other than this method, it is possible to generate the reduced image signal of the moving image. Thereupon, in the embodiment 2, a configuration of the second reduced-image generator 110 different from that of the embodiment 1 will be explained. Additionally, the configuration other than it is similar to that of the embodiment 1, so detailed explanation is omitted.

Figure 7:
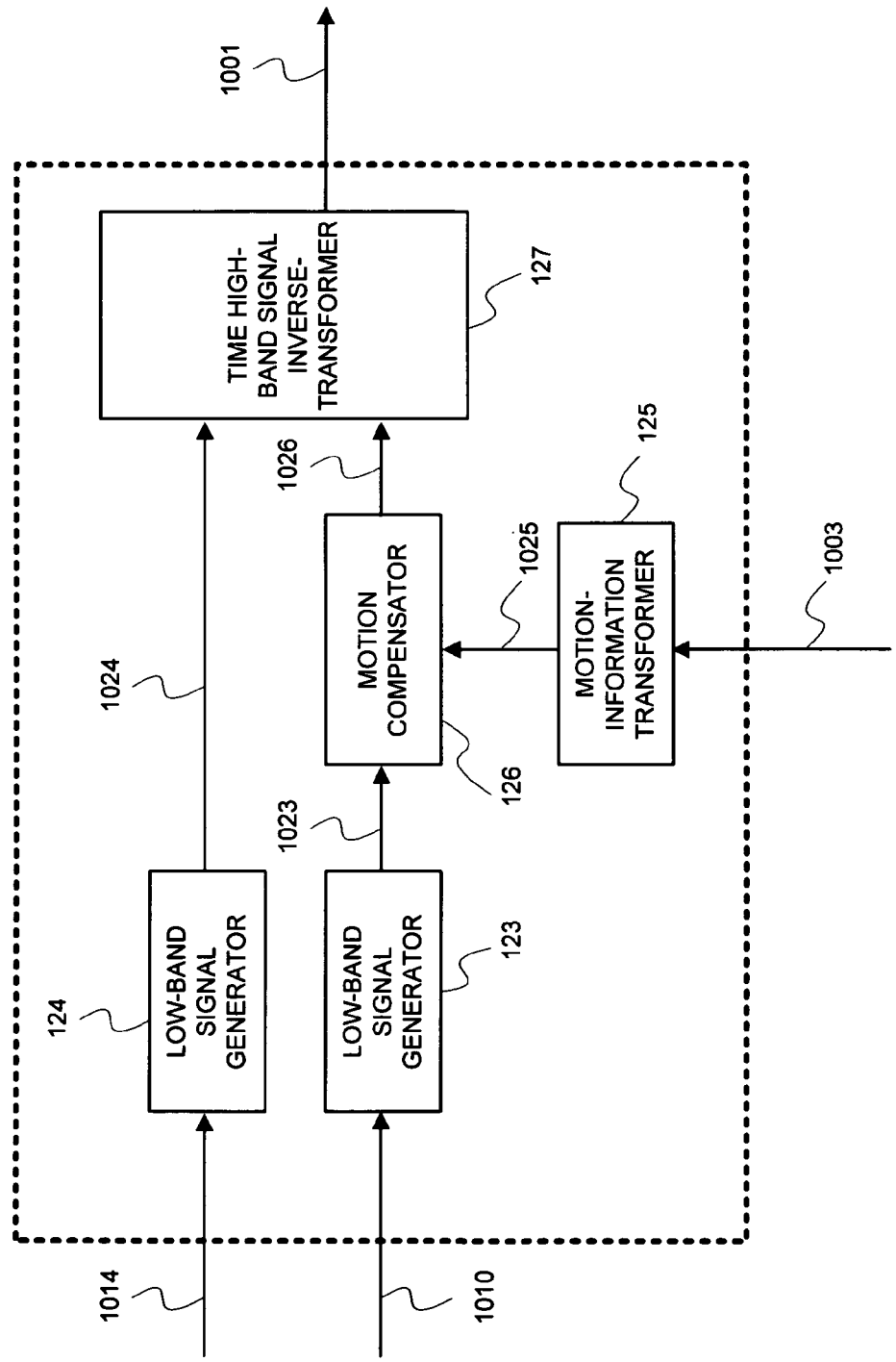
FIG. 7 is a block diagram illustrating a configuration of the second reduced-image generator 110 in the embodiment 2.

FIG. 7 is a block diagram illustrating a configuration of the second reduced-image generator 110 in the embodiment 2. A flow of the process of the reduced-image generator 110 shown in FIG. 7 will be explained.

A low-band signal generator 123 and a low-band signal generator 124 generate a time low-band/space low-band signal 1023 and a time high-band/space low-band signal 1024 that become the low-band signal of a time low-band signal 1010 and a time high-band signal 1014, respectively.

A motion-information transformer 125 generates reduced-motion information 1025 having motion information 1003 reduced responding to a ratio of the resolution by the low-band signal generation.

A motion compensator 126 performs a motion compensating process for a time low-band/space low-band signal 1023 based upon the motion information 1025, thereby to generate a predicted signal 1026.

A time high-band signal inverse-transformer 127 performs an inverse transform of the high-band signal generation filtering process in the time high-band signal generator 114 in FIG. 5 for a time high-band/space low-band signal 1024 and the predicted signal 1026, thereby to generate a reduced-image signal 1001.

Next, the time high-band/space low-band signal reconfigurer 170 of the decoding apparatus that corresponds to the foregoing reduced-image generator 110 will be explained.

FIG. 16 illustrates a configuration of the time high-band/space low-band signal reconfigurer 170 that corresponds to the second reduced-image generator 110 shown in FIG. 7.

In FIG. 16, a low-band signal generator 176 generates a time low-band/space low-band signal 1082 that is the space low-band component of a time low-band signal 1072.

A motion-information transformer 177 generates reduced motion information 1083 having motion information 1056 reduced responding to a ratio of the resolution by the low-band signal generation.

A motion compensator 178 performs a motion compensating process for a time low-band/space low-band signal 1082 based upon the motion information 1083, thereby to generate a predicted signal 1084.

A time high-band signal generator 179 performs the high-band signal generation filtering process identical to that of the time high-band signal generator 114 in FIG. 5 for a reduced-image signal 1073 and the predicted signal 1084, thereby to output a time high-band/space low-band signal 1076.

Embodiment 3

The embodiment 3 of the present invention will be explained.

In the foregoing embodiment 1 and the embodiment 2, there is the case where the coding distortion based upon the weighting at the time of generating the reduced-image signal augments, depending upon the image. Hereinafter, a specific example is listed for explanation.

The characteristic of the present invention lies in a point of reconfiguring the time high-band/space low-band signal 17 from the reduced image signal 15 on the reduced resolution as shown in FIG. 26, and the predicted image signal that is obtained from the time low-band component 16 with the motion compensation and the reducing process.

Figure 25:
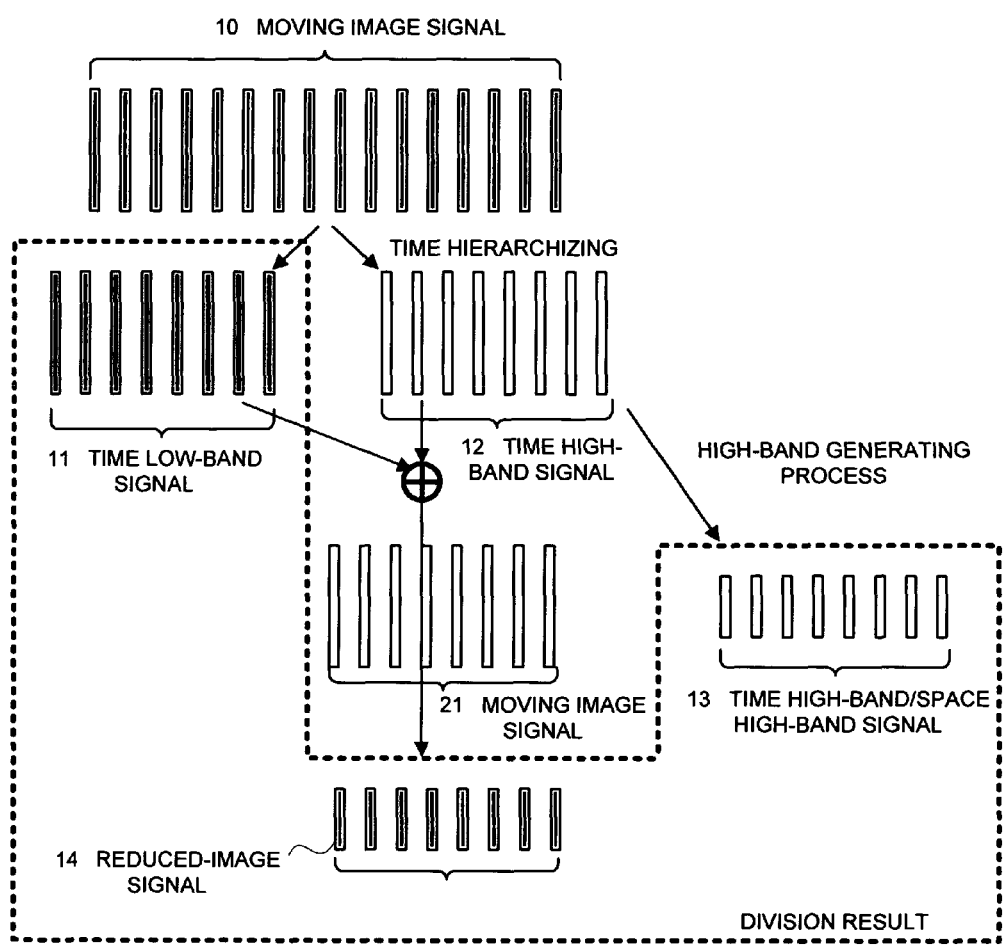
FIG. 25 is a view for explaining an outline of the time/space-division filtering in the moving image coding that is characteristic of the present invention.

The reduced image signal 15 is the signal having the reduced-image signal 14, which is obtained by performing the reducing process shown in FIG. 25 for the moving image signal 21, reconfigured, and the time low-band component 16 is the component having the time low-band component 11 in FIG. 25 reconfigured. There is the case where the distortion due to quantization occurs in these signals at the time of decoding.

Figure 27:
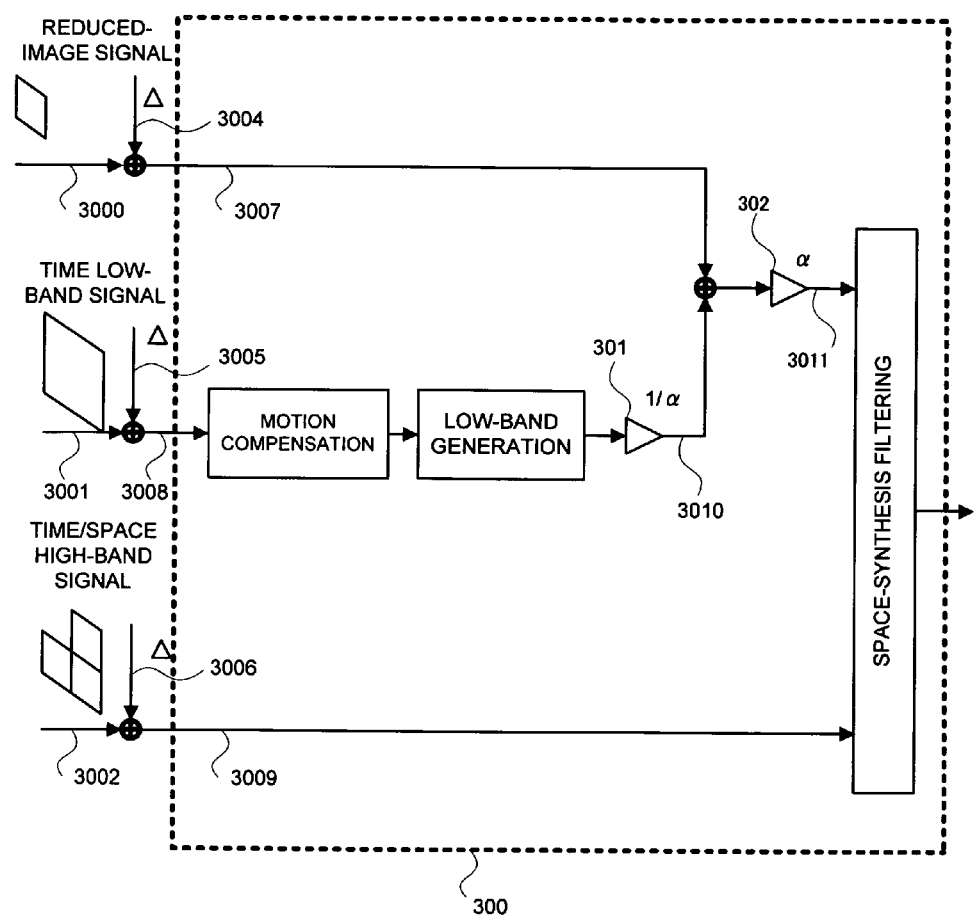
FIG. 27 is a conceptual view for explaining how the quantizing distortion superposed upon respective signals exerts an influence upon the coded image.

FIG. 27 is a conceptual view for explaining how the quantizing distortion superposed upon respective signals exerts an influence upon the decoded image.

It is assumed that a reduced-image signal 3000, a time low-band signal 3001 and a time/space high-band signal 3002 upon which distortion quantity 3004, 3005, and 3006 based upon a quantizing step A are superposed respectively, have been reconfigured as a reduced decoded-image signal 3007, a time low-band signal 3008 and a time/space high-band signal 3009 in the moving image decoding apparatus 300, respectively. Herein, it is assumed that the weighting of $1/\alpha$ has been performed for a purpose of a normalizing process etc. just before the low-band signal generating process in generating the reduced-image signal 3000. In FIG. 27, after the processes of the motion compensation and the low-band signal generation are performed for the time low-band signal 3008, a weighting process of $1/\alpha$ 301 is performed and a predicted-image signal 3010 is obtained on the reduced resolution. In order to reconfigure a time high-band/space low-band signal 3011, it is necessary to perform a weighting of $\alpha$ with a weighting process 301 after performing an inverse transform of the time-directional filtering for the reduced decoded-image signal 3007 and the predicted image signal 3010. The amount of the distortion that is contained in the time high-band/space low-band signal 3011 due to this weighting becomes one having the quantizing step multiplied Δ by α.

Thereupon, in the embodiment 3, the moving image coding apparatus configured so as to prevent the foregoing coding distortion will be explained by employing the accompanied drawings.

At first, the embodiment of the configuration that corresponds to the moving image coding apparatus and the moving image decoding apparatus of the embodiment 1 will be explained.

Figure 29:
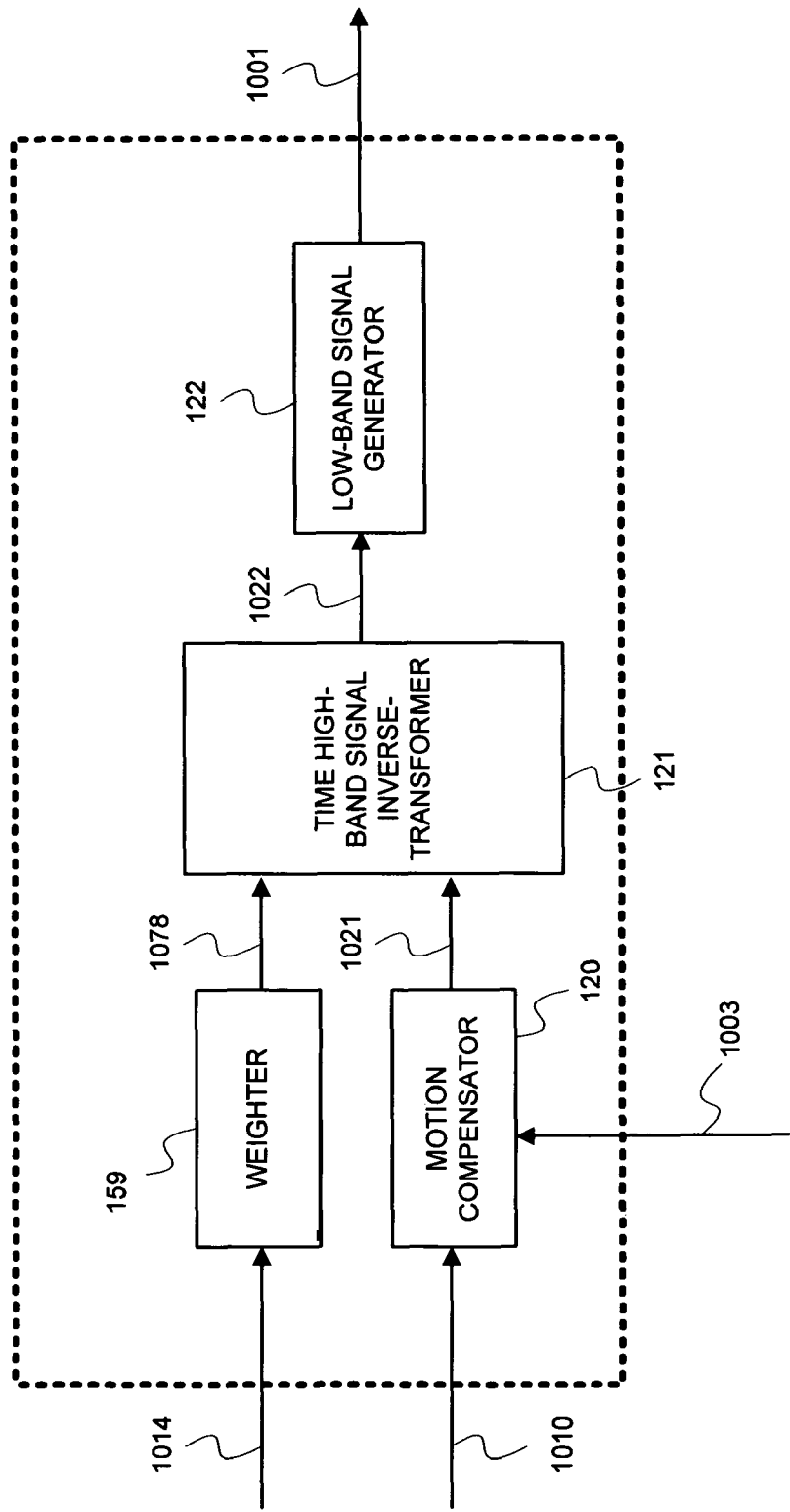
FIG. 29 is a block diagram illustrating a configuration of the reduced-image generator in the embodiment 3.

The moving image coding apparatus of the embodiment 3 has the configuration identical to that of the embodiment 1 except that the reduced-image generator shown in FIG. 4 differs. FIG. 29 is a block diagram illustrating a configuration of the reduced-image generator in the embodiment 3. The reduced-image generator shown in FIG. 29 differs in a point that after a time high-band signal 1014 is weighted by a weighter 159, its output 1078 is input into a time high-band signal inverse-transformer 121 as compared with the reduced-image generator shown in FIG. 6.

This weighter 159 multiplies the signal that becomes an input by a reciprocal number of the weighting that is contained in the low-band signal generating process. Further, the weighter 159 adjusts the weighting responding to the time high-band signal 1014 for each pixel or for each block as a unit of the motion compensation. In a case of weighting all pixels evenly, a reduced-image signal 1001, which becomes an output for the pixel having a large power of the time high-band signal 1014, deteriorates remarkably. For this, the weighting is reduced only for the pixel having a large power of the time high-band signal 1014. The information for determining reduction of the weighting on the coding side and the information on the decoding side have to coincide with each other. As the method for this end is considered the method of coding a threshold based upon a pre-decided threshold as additional information, the method of coding the determination information pixel by pixel or block by block, or the like.

Figure 30:
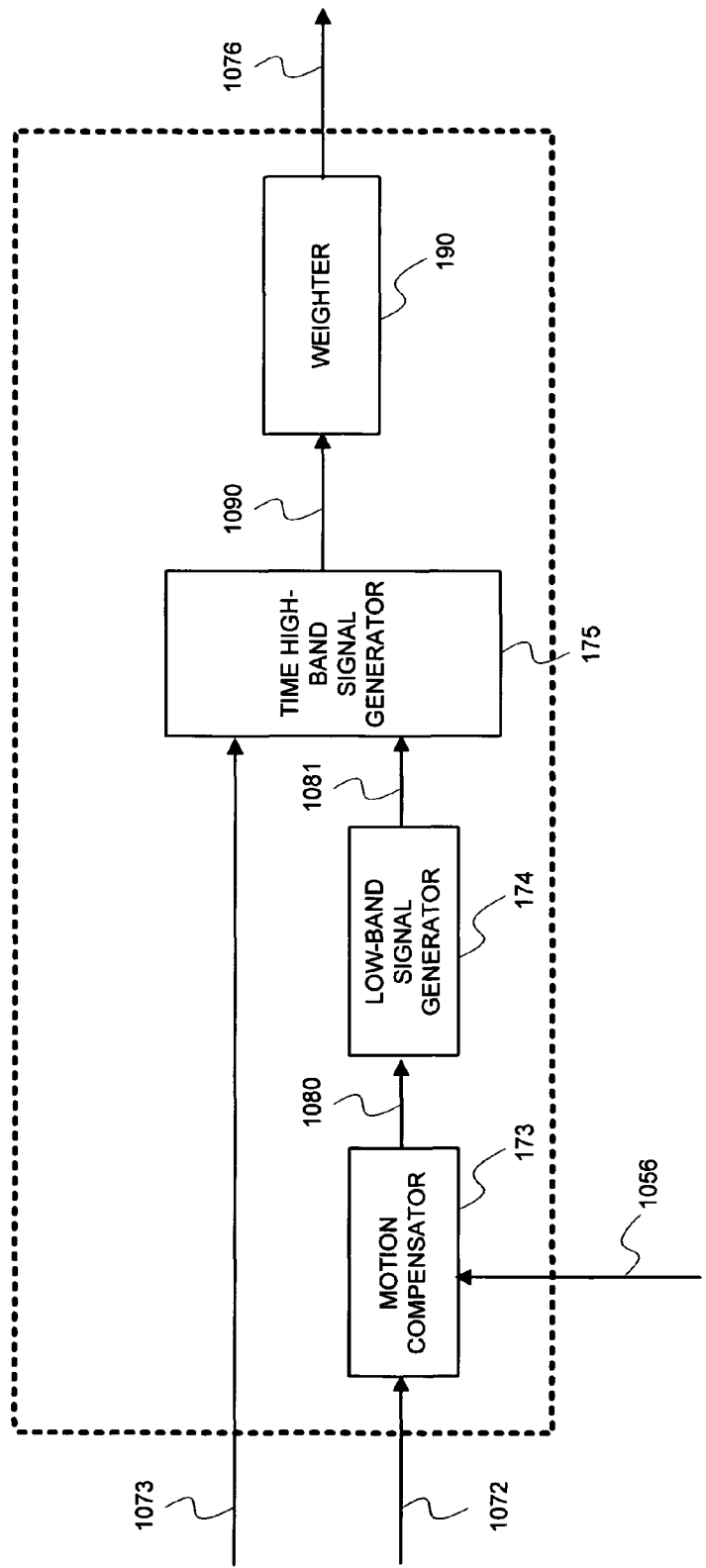
FIG. 30 is a block diagram illustrating a configuration of the time high-band/space low-band signal reconfigurer in the moving image decoding apparatus in the embodiment 3.

Continuously, the moving image decoding apparatus that decodes the moving image coded in the foregoing moving image coding apparatus will be explained by employing FIG. 30.

The moving image decoding apparatus of the embodiment 3 has the configuration identical to that of the moving image decoding apparatus of the embodiment 1 except that the time high-band/space low-band signal reconfigurer 170 of the embodiment 1 differs. FIG. 30 is a block diagram illustrating a configuration of the time high-band/space low-band signal reconfigurer in the moving image decoding apparatus in the embodiment 3. The time high-band/space low-band signal reconfigurer shown in FIG. 30 differs in a point that after an output 1090 of a time high-band signal generator 175 is weighted by a weighter 190, it is output as a time high-band signal 1076 as compared with the time high-band/space low-band signal reconfigurer shown in FIG. 15. The reciprocal number of the weighting coefficient in the weighter 159 in FIG. 29 is used as the weighting coefficient in the weighter 190.

Figure 31:
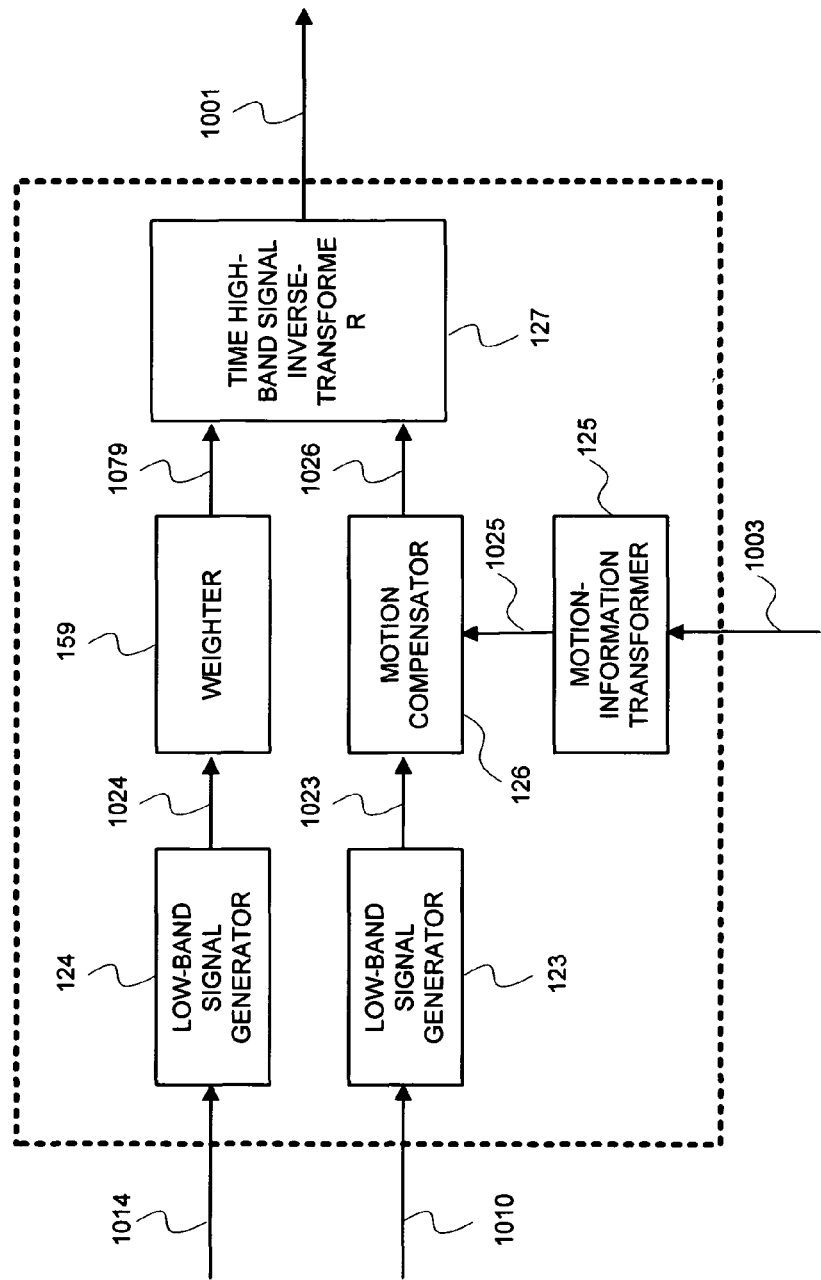
FIG. 31 is a block diagram illustrating a configuration of the second reduced-image generator that is obtained by adding a weighter to the second reduced-image generator explained in the embodiment 2.

Next, the embodiment of the configuration that corresponds to the moving image coding apparatus and the moving image decoding apparatus of the embodiment 2 will be explained. FIG. 31 is a block diagram illustrating a configuration of the second reduced-image generator that is obtained by adding the weighter to the second reduced-image generator explained in the embodiment 2.

The second reduced-image generator shown in FIG. 31 differs in a point that a weighter 159 is added similarly to FIG. 29 as compared with the reduced-image generator shown in FIG. 7. This weighter 159 performs a weighting process for a time high-band/space low-band 1024, being an output of a low-band signal generator 124, and outputs a time high-band/space low-band signal 1079, being a result, to a time high-band signal inverse-transformer 127. The weighting process equivalent to that of weighter 159 in FIG. 29 is performed in the weighter 159.

Figure 32:
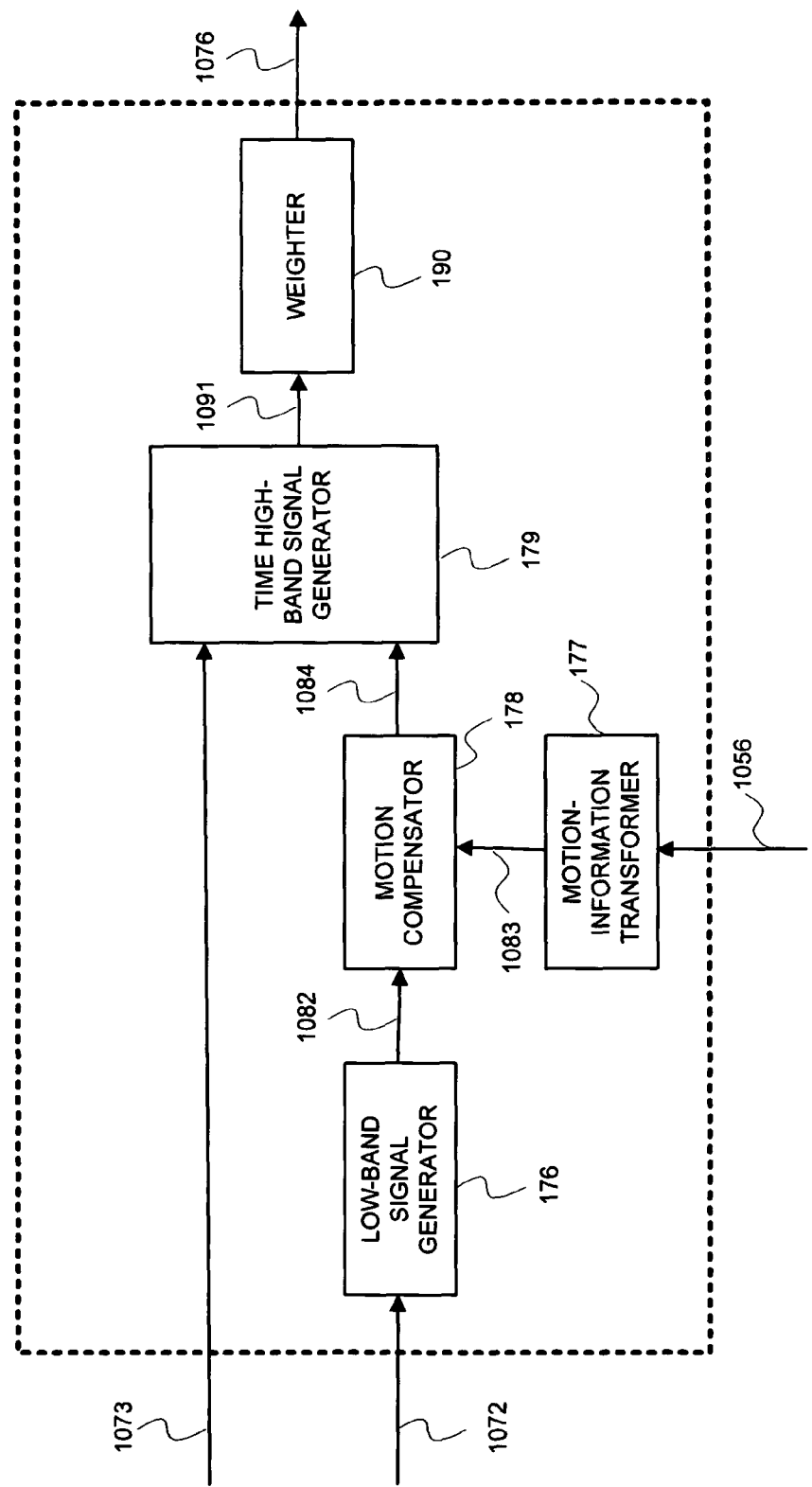
FIG. 32 is a block diagram illustrating a configuration of the second time high-band/space low-band signal reconfigurer that corresponds to the moving image decoding apparatus of the embodiment 2.

Further, FIG. 32 is a block diagram illustrating a configuration of a second time high-band/space low-band signal reconfigurer that corresponds to the moving image decoding apparatus of the embodiment 2. The time high-band/space low-band signal reconfigurer shown in FIG. 32 differs in a point that a weighter 190 is added similarly to FIG. 30 as compared with the time high-band/space low-band signal reconfigurer shown in FIG. 16. After an output 1091 of a time high-band signal generator 179 is weighted by the weighter 190, it is output as a time high-band signal 1076. The reciprocal number of the weighting coefficient in the weighter 159 in FIG. 31 is used as the weighting coefficient in the weighter 190.

In accordance with the embodiment 3, in the decoding process, the weighting process is performed just before reconfiguring the time high-band/space low-band signal at the moment of the time/space-synthesis filtering. This weighting process solves the problem that in the embodiments 1 and 2, the weighting in synthesizing the time high-band signal by the space-directional synthesis filtering at the time of decoding causes the coding distortion of the reduced-image signal to be emphatically propagated in the time high-band signal. This enables deterioration in the decoded image to be reduced.

Embodiment 4

The embodiment 4 of the present invention will be explained.

In the foregoing first and second embodiments, there is the case where the coding distortion of the reduced-image signal is propagated in the decoded image having a larger resolution, depending upon the image. For example, in the moving image coding apparatus having the configuration as shown in FIG. 1, optimizing an allocation of code quantity to the reduced-image signal coded-data 1004 and the time/space high-band signal coded data 1005 enables the image quality of the decoded image to be regulated to some extent.

However, it is impossible that the coding distortion such as the block distortion and the deringing, which occur in the decoded reduced-image signal, is reduced completely with the time/space high-band signal.

Thereupon, the moving image coding apparatus and the moving image decoding apparatus of the embodiment 4 for solving the foregoing problem will be explained.

At first, the moving image coding apparatus and the moving image decoding apparatus of the embodiment 4 that correspond to the moving image coding apparatus and the moving image decoding apparatus of the embodiment 1 will be explained.

The moving image coding apparatus of the embodiment 4 has the configuration identical to that of the moving image coding apparatus of the embodiment 1 except that the reduced-image generator shown in FIG. 4 differs.

Figure 33:
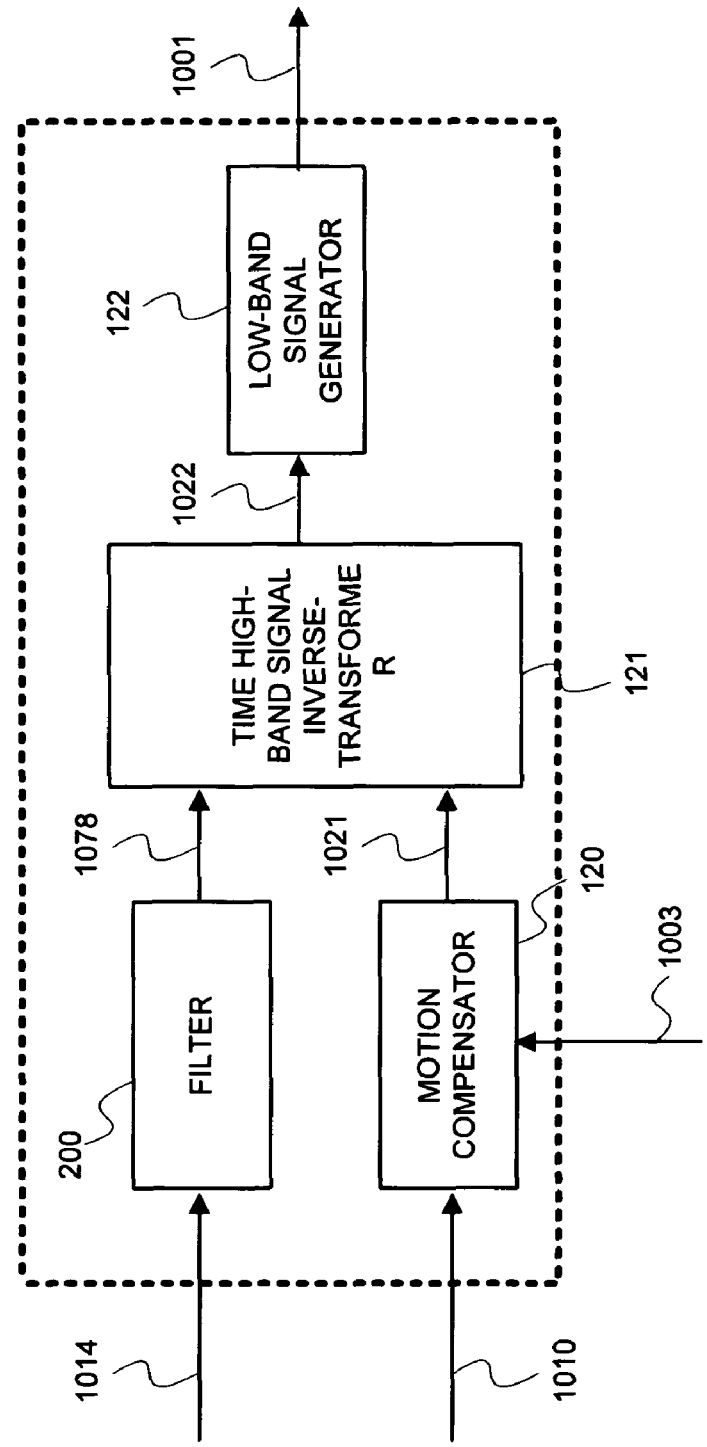
FIG. 33 is a block diagram illustrating a configuration of the reduced-image generator in the embodiment 4.

FIG. 33 is a block diagram illustrating a configuration of the reduced-image generator in the embodiment 4. The reduced-image generator shown in FIG. 33 differs in a point that after a time high-band signal 1014 is processed by a filter 200, its output 1078 is input into a time high-band signal inverse-transformer 121 as compared with the reduced-image generator shown in FIG. 6. The filter 200 performs a smoothing or a noise removal for the signal that becomes an input.

Continuously, the moving image decoding apparatus that decodes the moving image coded in the foregoing moving image coding apparatus will be explained.

The moving image decoding apparatus of the embodiment 4 has the configuration identical to that of the moving image decoding apparatus of the embodiment 1 except that the time high-band/space low-band signal reconfigurer shown in FIG. 15 differs.

Figure 34:
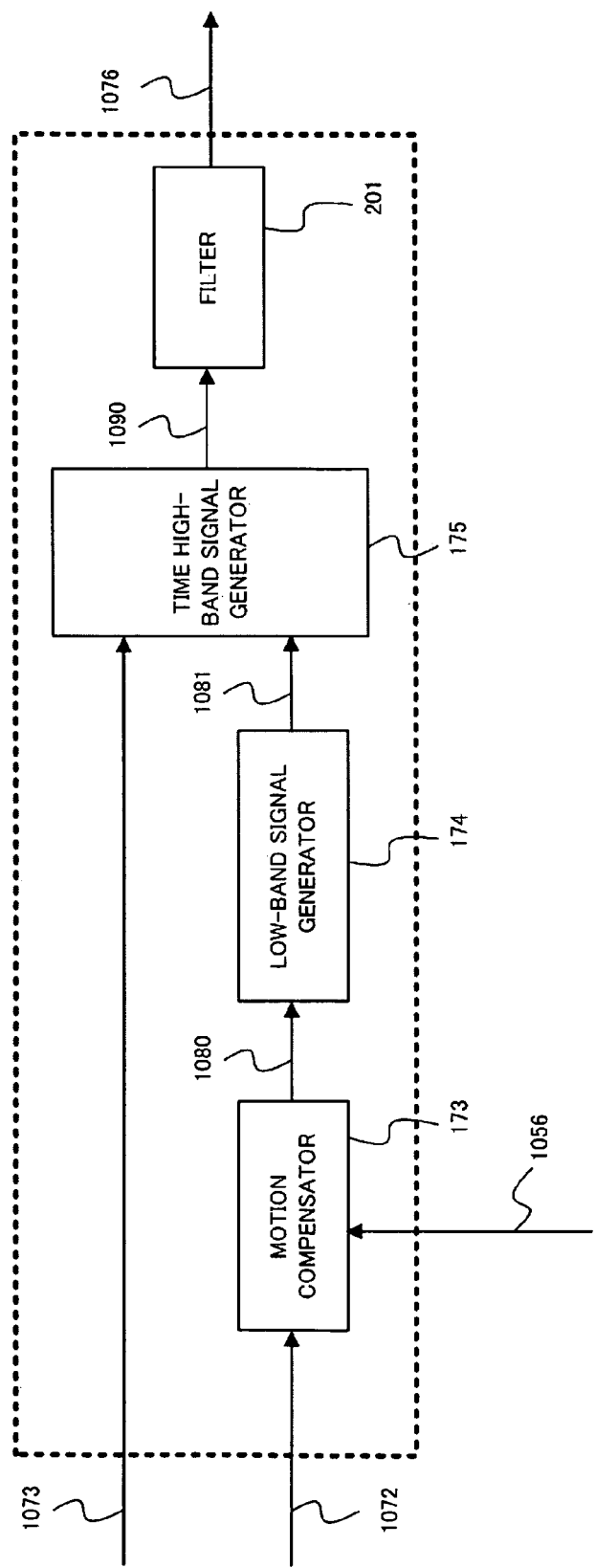
FIG. 34 is a block diagram illustrating a configuration of the time high-band/space low-band signal reconfigurer in the embodiment 4.

FIG. 34 is a block diagram illustrating a configuration of the time high-band/space low-band signal reconfigurer in the embodiment 4. The time high-band/space low-band signal reconfigurer shown in FIG. 34 differs in a point that after an output 1090 of the time high-band signal generator is processed by a filter 201, it is output as a time high-band signal 1076 as compared with the time high-band/space low-band signal reconfigurer shown in FIG. 15. The distortion or the noise in the reduced decoded-image signal, for example, the deringing and the block distortion, is reduced in the filter 201.

Next, the moving image coding apparatus and the moving image decoding apparatus of the embodiment 4 that corresponds to the moving image coding apparatus and the moving image decoding apparatus of the embodiment 2 will be explained.

Figure 35:
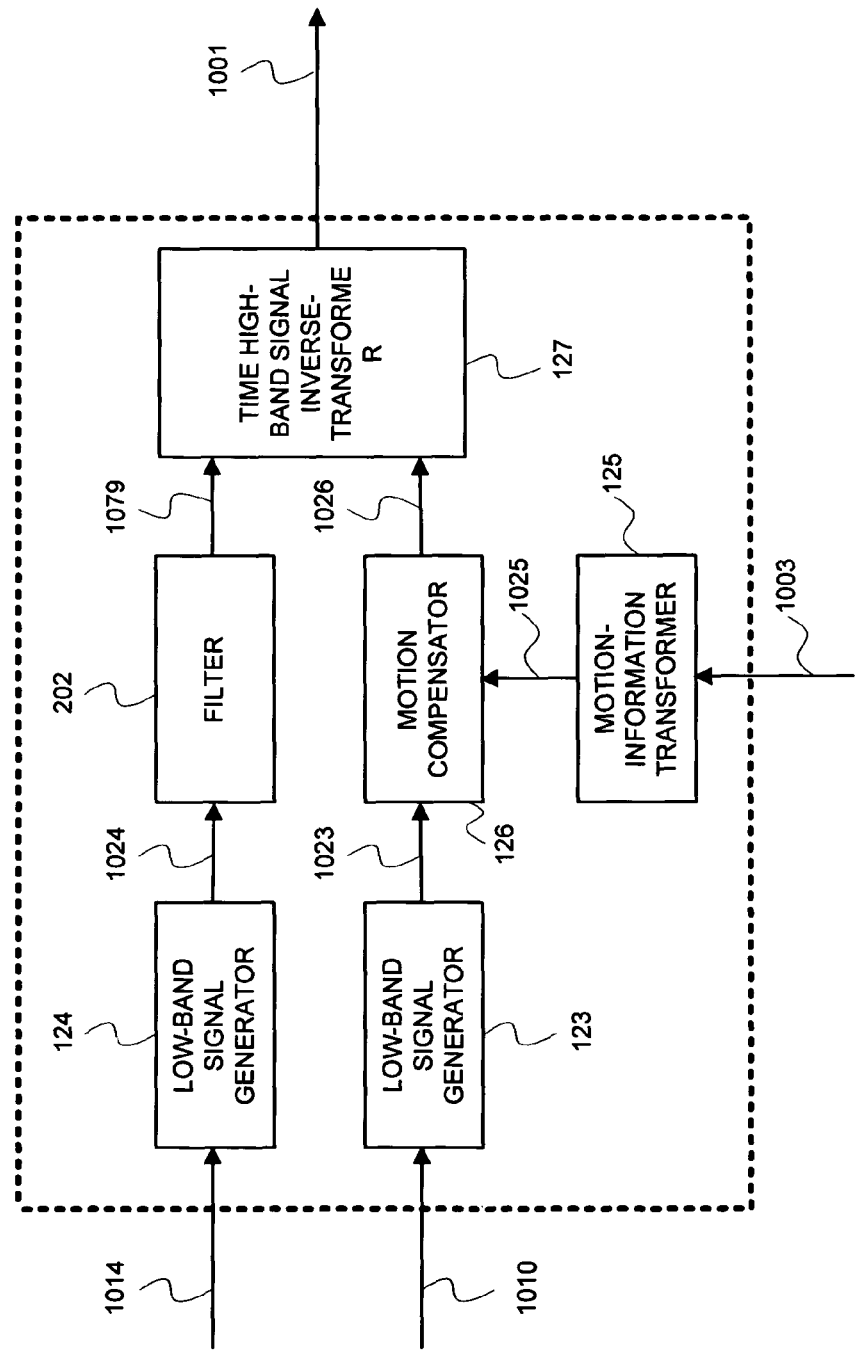
FIG. 35 is a block diagram illustrating a configuration of the second reduced-image generator in the embodiment 4.

FIG. 35 is a block diagram illustrating a configuration of the second reduced-image generator in the embodiment 4. The reduced-image generator shown in FIG. 35 differs in a point that a filter 202 is added as compared with the reduced-image generator shown in FIG. 7. The filter 202 performs the process similar to that of the filter 200 in FIG. 33 for a time high-band/space low-band signal 1024, being an output of a low-band signal generator 124, and outputs a time high-band/space low-band signal 1079, being a result, to a time high-band signal inverse-transformer 127.

Continuously, the moving image decoding apparatus that decodes the moving image coded in the foregoing moving image coding apparatus will be explained.

The moving image decoding apparatus of the embodiment 4 has the configuration identical to that of the moving image decoding apparatus of the embodiment 2 except that the time high-band/space low-band signal reconfigurer shown in FIG. 16 differs.

Figure 36:
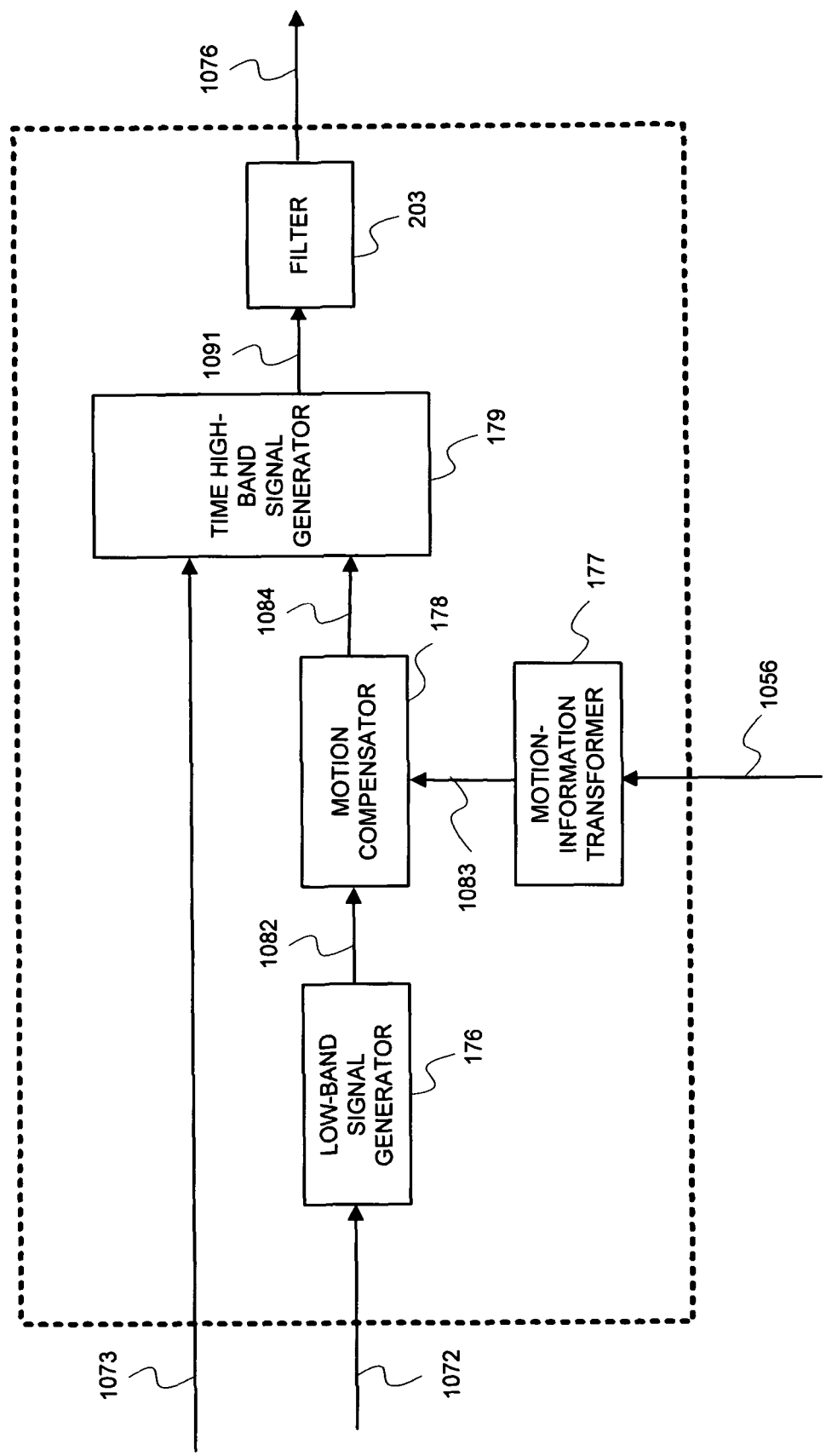
FIG. 36 is a block diagram illustrating a configuration of the second time high-band/space low-band signal reconfigurer in the embodiment 4.

FIG. 36 is a block diagram illustrating a configuration of the second time high-band/space low-band signal reconfigurer in the embodiment 4. The time high-band/space low-band signal reconfigurer shown in FIG. 36 differs in a point that a filter 203 is added as compared with the time high-band/space low-band signal reconfigurer shown in FIG. 16. After an output 1091 of a time high-band signal generator 179 is processed by the filter 203, it is output as a time high-band signal 1076. The process similar to that of the filter 201 in FIG. 34 is performed in the filter 203.

According to the embodiment 4, the filtering for the noise reduction etc. is performed as a process prior to coding the reduced-image signal, and a process prior to decoding. This enables an influence of the coding distortion in the decoded reduced-image signal upon the decoded-image signal having a larger resolution to be reduced.

Embodiment 5

In the hierarchy coding of the moving image signal, concentration of a power upon the low-band signal is necessary for coding at high efficiency when the image signal is frequency-divided. When the similar frequency division is performed in the reduced-image generator in the present invention, there is the case where it becomes difficult to code the reduced-image signal itself because fineness of the reduced-image signal is enhanced. Conversely, there exists the problem that the coding efficiency of the entirety of the signal declines in the low-band signal generation filtering having fineness of the reduced-image signal adequately regulated. In the embodiment 5, the embodiment for solving this problem will be described.

Figure 38:
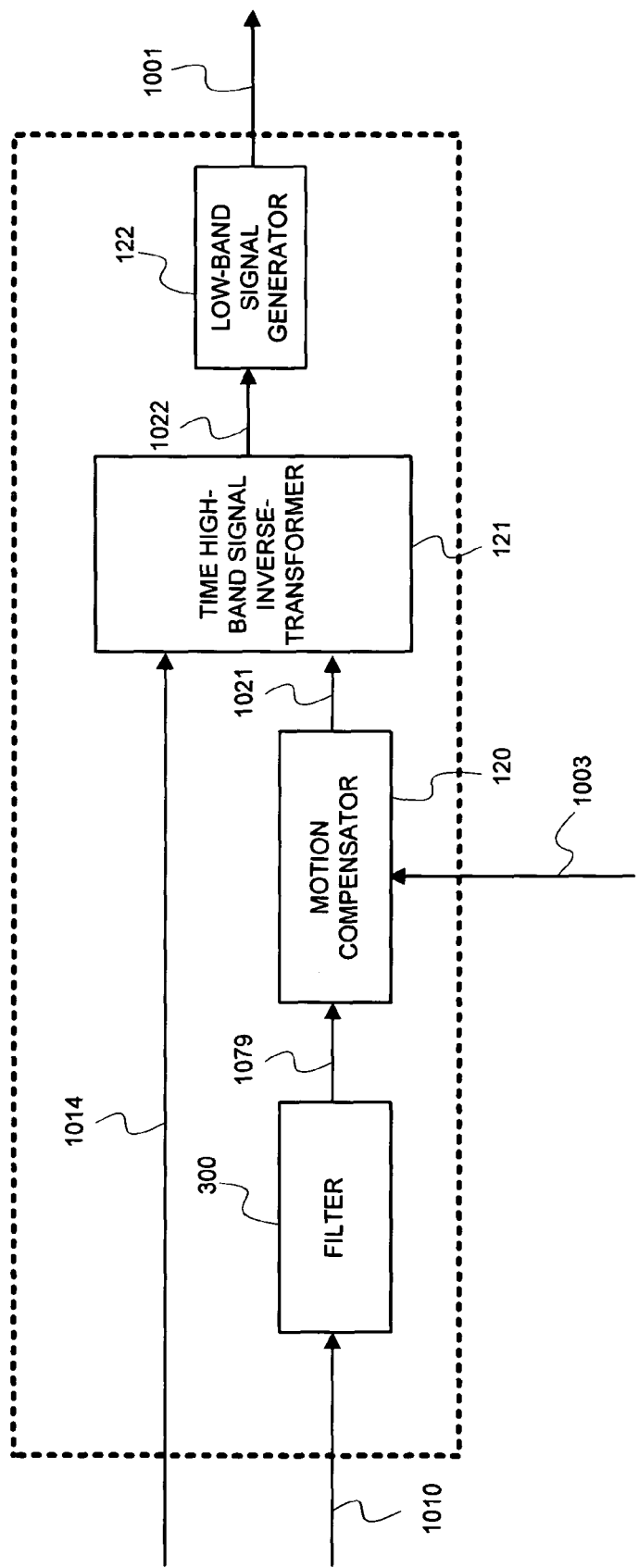
FIG. 38 is a block diagram illustrating a configuration of the moving image coding apparatus of the embodiment 5.

The moving image coding apparatus of the embodiment 5 will be explained by employing FIG. 38. The moving image coding apparatus of the embodiment 5 has the configuration identical to that of the moving image coding apparatus of the embodiment 1 except that the reduced-image generator shown in FIG. 4 differs. FIG. 38 is a block diagram illustrating a configuration of the reduced-image generator of the embodiment 5.

The reduced-image generator shown in FIG. 38 differs in a point that after a time low-band signal 1010 is processed by a filter 300, its output 1079 is input into a motion compensator 120 as compared with the reduced-image generator shown in FIG. 6. The filter 300 performs a smoothing, a gradation or the like for the signal that becomes an input.

Figure 39:
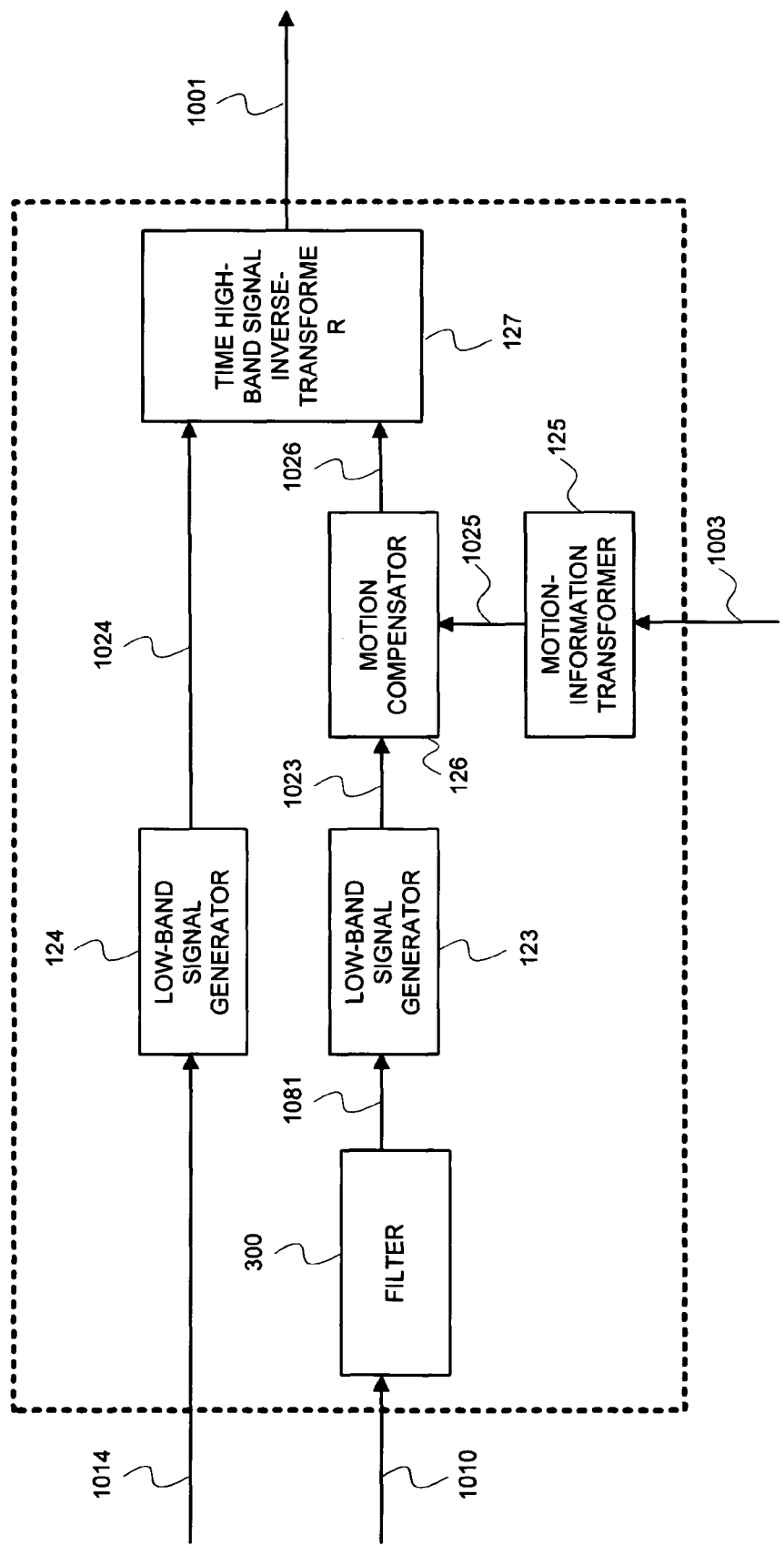
FIG. 39 is a block diagram illustrating a configuration of the second reduced-image generator in the embodiment 5.

FIG. 39 is a block diagram illustrating a configuration of the second reduced-image generator in the embodiment 5. The reduced-image generator shown in FIG. 39 differs in a point that a filter 300 is added similarly to FIG. 38 as compared with the reduced-image generator shown in FIG. 7. After a time low-band signal 1010 is processed by the filter 300, its output 1079 is input into a motion compensator 120. The filter 300 performs the process similar to that of the filter 300 in FIG. 38.

Figure 40:
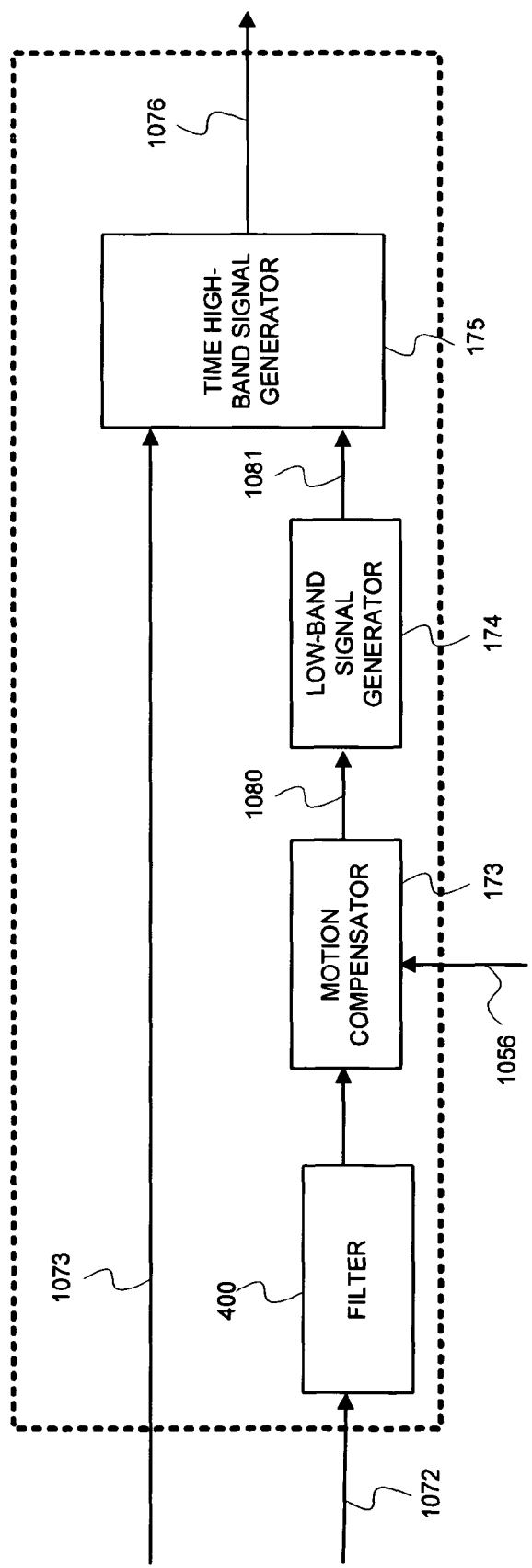
FIG. 40 is a block diagram illustrating a configuration of the time high-band/space low-band signal reconfigurer in the embodiment 5.

Next, the moving image decoding apparatus for the foregoing moving image coding apparatus will be explained by employing FIG. 40 and FIG. 41.

The moving image decoding apparatus of the embodiment 5 has the configuration identical to that of the moving image decoding apparatus of the embodiment 1 except that the time high-band/space low-band signal reconfigurer shown in FIG. 14 differs. FIG. 40 is a block diagram illustrating a configuration of the time high-band/space low-band signal reconfigurer in the embodiment 5. The time high-band/space low-band signal reconfigurer shown in FIG. 40 differs in a point that after a time low-band signal 1072 is processed by a filter 400, it is input into a motion compensator 173 as compared with the time high-band/space low-band signal reconfigurer in FIG. 15. The process similar to that of the filter 300 in FIG. 38 is performed in the filter 400.

Figure 41:
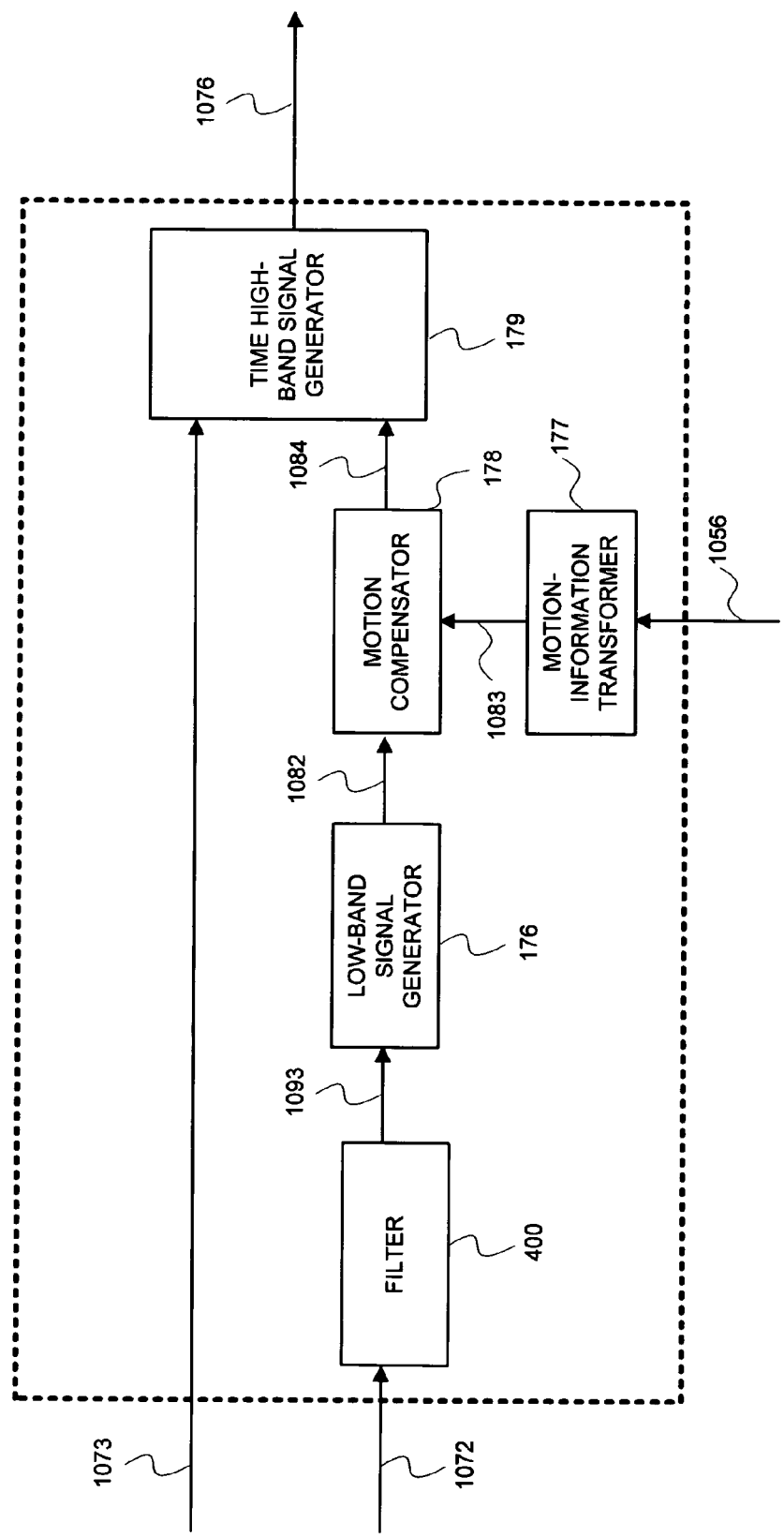
FIG. 41 is a block diagram illustrating a configuration of the second time high-band/space low-band signal reconfigurer in the embodiment 5.

FIG. 41 is a block diagram illustrating a configuration of the second time high-band/space low-band signal reconfigurer in the embodiment 5. The time high-band/space low-band signal reconfigurer shown in FIG. 41 differs in a point that a filter 400 is added similarly to FIG. 40 as compared with the time high-band/space low-band signal reconfigurer in FIG. 16. After a time low-band signal 1072 is processed by the filter 400, it is input into a motion compensator 173. The process similar to that of the filter 300 in FIG. 39 is performed in the filter 400.

Such a configuration allows the filtering such as the smoothing to be performed for the time low-band signal in generating the reduced-image signal. This makes it possible to easily code the reduced-image signal itself without changing the time/space high-band signal. The identical filtering is performed for the time low-band signal as well in the time high-band/space low-band signal reconfigurer at the time of decoding. For this, there is no possibility that the precision of the time high-band/space low-band signal that is generated declines.

Embodiment 6

The embodiment 6 of the present invention will be explained.

The moving image coding apparatus and the moving image decoding apparatus in accordance with the present invention also can be configured with hardware as apparent from the above explanation; however it also can be realized with a computer program.

Figure 42:
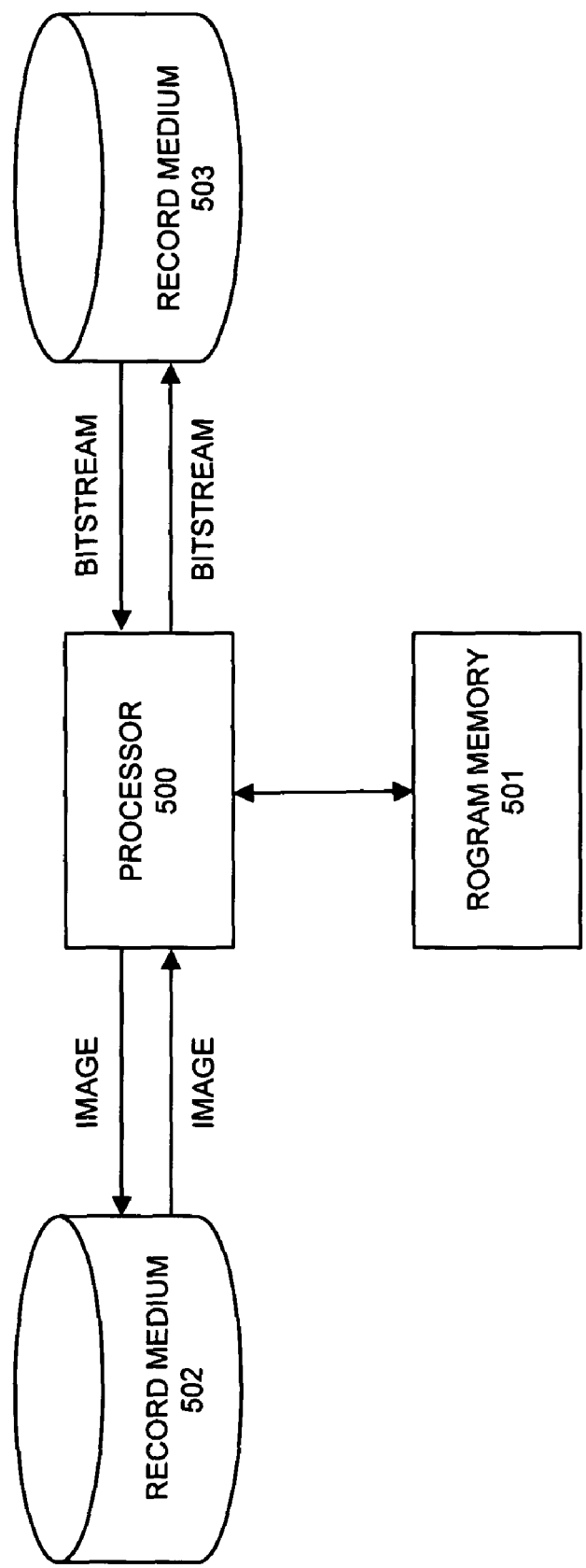
FIG. 42 is a general block configuration view of the information processing system having the moving image coding apparatus in accordance with the present invention implemented.

FIG. 42 is a general block configuration view of an information processing system having the moving image coding apparatus in accordance with the present invention implemented.

The information processing system shown in FIG. 42 is configured of a processor 500, a program memory 501, memory media 502 and 503. The memory media 502 and 503 can be a separate memory medium, and can be a memory region that is configured of the identical memory medium. A magnetic memory medium such as a hard disc can be employed as the memory medium.

The program memory 501 has a program filed for causing the processor 500 to execute processes as the time/space frequency divider 101, the reduced-image signal coder 102, the time/space high-band signal coder 103, the motion-information coder 104, and the multiplexer 105 in the moving image coding apparatus of the foregoing embodiments 1 to 5, and the processor 500, which operates with this program, files its result into the record medium 502 or 503.

Further, the program memory 501 has a program filed for causing the processor 500 to execute the processes as the inverse multiplexer 150, the reduced-image signal decoder 151, the time/space high-band signal decoder 152, the motion-information decoder 153, and the time/space frequency synthesizer 154 in the moving image decoding apparatus of the foregoing embodiments 1 to 5, and the processor 500, which operates with this program, files its result into the record medium 502 or 503.

As apparent from the above explanation, it is also possible to realize one part or the entirety of the hardware with the computer program.

The invention claimed is:

1. A moving image coding apparatus comprising:
a time/space-division filtering section for hierarchizing a moving image signal; and
a signal-coding processor for coding said hierarchized signals, wherein:
said time/space-division filtering section includes:
a time-directional filtering section for filtering the moving image signal in a time direction, thereby to generate a time low-band signal, a time high-band signal, and motion information signifying motion between said image signals;
a reduced-image generator for generating by employing said time low-band signal and said time high-band signal a reduced-image signal to which the moving image signal corresponding to said time high-band signal was reduced; and
a high-band signal generator for generating a time high-band/space high-band signal that is equivalent to a space high-band component for said time high-band signal; and
said signal-coding processor codes said time low-band signal, said reduced decoded-image signal, said time high-band/space high-band signal and said motion information after said time low-band signal or said reduced-image signal is processed by said time/space-division filtering section, thereby allowing the moving image signal to be hierarchized.

2. The moving image coding apparatus according to claim 1, wherein said reduced-image generator includes:
a motion compensator for motion-compensating the time low-band signal based upon the motion information, thereby to generate a predicted image;
a time high-band signal inverse-transformer for generating a moving image signal that corresponds to said time high-band signal from said predicted image and the time high-band signal; and
a low-band signal generator for performing a spatial filtering for the moving image signal generated by said time high-band signal inverse-transformer, thereby to generate a reduced decoded-image signal, being a space low-band component.

3. The moving image coding apparatus according to claim 2, further comprising a weighter for performing a weighting process for said time high-band signal as compared with said time low-band signal or performing a weighting process for a certain part of said time high-band signal to output it to said time high-band signal inverse-transformer.

4. The moving image coding apparatus according to claim 2, wherein said low-band signal generator performs a frequency-component extraction by subband-division.

5. The moving image coding apparatus according to claim 2, wherein:
said low-band signal generator generates a reduced-image signal with a first subsampling filter; and
said high-band signal generator generates a high-band signal with a second subsampling filter to which said first subsampling filter forms a counterpart.

6. A moving image decoding apparatus comprising:
a signal-decoding processor for decoding a coded data of a moving image signal for which a hierarchy coding has been performed, thereby to generate hierarchized signals, and a time/space-synthesis filtering section for synthesizing said hierarchized signals, wherein after said time/space-synthesis filtering section generates space low-band components by space hierarchizing, out of time high-band components by time hierarchizing, based upon a decoded-image signal, being a decoding result in a certain resolution-hierarchy, it performs a space-directional frequency synthesis and a time-directional frequency synthesis, thereby to generate a decoded-image signal in the resolution-hierarchy of which the resolution is higher by one stage.

7. A moving image decoding apparatus comprising:
a signal-decoding processor for decoding a coded data, thereby to generate hierarchized signals, and a time/space-synthesis filtering section for synthesizing the hierarchized signals, wherein said time/space-synthesis filtering section includes:
a time high-band/space low-band reconfigurer for generating, from a time low-band signal and a reduced decoded-image signal, being a synthesis result in a certain resolution-hierarchy, a time high-band/space low-band signal, being a space low-band component of a time high-band signal that forms a counterpart to said time low-band signal;
a space-synthesis filtering section for synthesizing a time high-band/space high-band signal, being a space high-band component of said time high-band signal, and said time high-band/space low-band signal, thereby to generate a time high-band signal; and a time-directional inverse-filtering section for generating a decoded-image signal from said time high-band signal, said time low-band signal, and motion information signifying motion between an image signal;

a reduced-image generator for generating by employing said time low-band signal and said time high-band signal a reduced-image signal to which the moving image signal corresponding to said time high-band signal was reduced; and said signal-decoding processor decodes said time low-band signal, said reduced decoded-image signal, said time high-band/space high-band signal, and said motion information from said coded data.

8. The moving image decoding apparatus according to claim 7, wherein said time high-band/space low-band signal reconfigurer includes:

a motion compensator for motion-compensating said time low-band signal based upon said motion information, thereby to generate a predicted-image;

a low-band signal generator for generating a space low-band predicted-signal, being a space low-band component of said predicted image; and a time high-band signal generator for generating a time high-band component from said space low-band predicted-signal and the reduced decoded-image signal; and said time high-band/space low-band signal reconfigurer outputs an output of said time high-band signal generator as a time high-band/space low-band signal.

9. The moving image decoding apparatus according to claim 8, further comprising:

an inverse weighter for performing a weighting process of compensating an output of said time high-band signal generator for the weighting performed at the time of coding; and outputting an output of said inverse weighter as a time high-band/space low-band signal.

10. The moving image decoding apparatus according to claim 8, wherein said low-band signal generator performs a low-band passing process by subband-division.

11. The moving image decoding apparatus according claim 8, wherein said space-synthesis filtering section performs a subband-synthesis that becomes an inverse transform of said subband-division.

12. The moving image decoding apparatus according to claim 8, wherein said low-band signal generator generates a reduced image with a subsampling filter.

13. The moving image decoding apparatus according to claim 8, wherein said space-synthesis filtering section synthesizes a high-band signal generated in a second subsampling filter to which said subsampling filter forms a counterpart, and a low-band signal generated in said subsampling filter.

14. The moving image decoding apparatus according to claim 7, wherein after said time-directional inverse-filtering section motion-compensates said time low-band signal, it synthesizes the time high-band signal and said time low-band signal to output it as a decoded-image signal.

15. A moving image coding method comprising a time/space-division filtering step of hierarchizing a moving image signal and a signal-coding processing step of coding said hierarchized signals, wherein said time/space-division filtering step includes:

a time-directional filtering step of filtering the moving image signal in a time direction, thereby to generate a time low-band signal, a time high-band signal, and motion information signifying motion between said image signals;

a reduced-image generating step of employing said time high-band signal and said time low-band signal, thereby to generate a reduced image signal to which the moving image signal corresponding to said time high-band signal was reduced; and a high-band signal generating step of generating a time high-band/space high-band signal that is equivalent to a space high-band component for said time high-band signal; and said time low-band signal, said reduced decoded-image signal, said time high-band/space high-band signal, and said motion information are coded in said signal-coding processing step after said time/space-division filtering step is taken for said time low-band signal or said reduced image signal, thereby allowing the moving image signal to be hierarchized.

16. The moving image coding method according to claim 15, wherein said reduced-image generating step includes:

a motion compensating step of motion-compensating the time low-band signal based upon the motion information, thereby to generate a predicted image;

a time high-band signal inverse-transforming step of generating a moving image signal, which corresponds to said time high-band signal, from said predicted image and the time high-band signal; and a low-band signal generating step of performing a spatial filtering for the moving image signal generated in said time high-band signal inverse-transforming step, thereby to generate a reduced decoded-image signal, being a space low-band component.

17. The moving image coding method according to claim 16, wherein a weighting process is performed for said time high band signal as compared with said time low-band signal or a weighting process is performed for a certain part of said time high-band signal before taking said time high-band signal inverse-transforming step.

18. The moving image coding method according to claim 15, wherein said low-band signal generating step is a step of performing a frequency-component extraction by subband-division.

19. The moving image coding method according to claim 15 wherein:

said low-band signal generating step is a step of generating the reduced-image signal with a first subsampling filter; and said high-band signal generating step is a step of generating the high-band signal with a second subsampling filter to which said first sub-sampling filter forms a counterpart.

20. A moving image decoding method comprising a signal-decoding processing step of decoding a coded data of a moving image signal for which hierarchy coding has been performed, thereby to generate hierarchized signals, and a time/space-synthesis filtering step of synthesizing said hierarchized signals, wherein said time/space-synthesis filtering step is a step of, after generating a space low-band component by space hierarchizing out of time high-band components by time hierarchizing based upon a decoded-image signal, being a decoding result in a certain resolution-hierarchy, performing a space-directional frequency synthesis and a time-directional frequency synthesis, thereby to generate a decoded image signal in the resolution-hierarchy of which the resolution is higher by one stage.

21. A moving image decoding method comprising a signal-decoding processing step of decoding a coded data, thereby to generate hierarchized signals, and a time/space-synthesis filtering step of synthesizing hierarchized image signals, wherein said time/space-synthesis filtering step includes:
   a time high-band/space low-band signal reconfiguring step of generating, from a time low-band signal and a reduced decoded-image signal, being a synthesis result in a certain resolution-hierarchy, a time high-band/space low-band signal, being a space high-band component of a time high-band signal that forms a counterpart to said time low-band signal;
   a space-synthesis filtering step of synthesizing a time high-band/space high-band signal, being a space high-band component of said time high-band signal, and said time high-band/space low-band signal, thereby to generate a time high-band signal; and
   a time-directional inverse-filtering step of generating a decoded-image signal from said time high-band signal, said time low-band signal, and motion information signifying motion between an image signal;
   a reduced-image generating step of employing said time high-band signal and said time low-band signal, thereby to generate a reduced image signal to which the moving image signal corresponding to said time high-band signal was reduced; and
   said signal-decoding processing step is a step of decoding said time low-band signal, said reduced decoded-image signal, said time high-band/space high-band signal, and said motion information from said coded data.

22. The moving image decoding method according to claim 21, wherein said time high-band/space low-band signal reconfiguring step includes:
   a motion compensating step of motion-compensating said time low-band signal based upon said motion information, thereby to generate a predicted image;
   a low-band signal generating step of generating a space low-band predicted-signal, being a space low-band component of said predicted image; and
   a time high-band signal, generating step of generating a time high-band component from said space low-band predicted-signal and the reduced decoded-image signal; and
   said time high-band/space low-band signal reconfiguring step is a step of outputting an output of said time high-band signal generating step as a time high-band/space low-band signal.

23. The moving image decoding method according to claim 22, wherein a weighting process is performed of compensating the time high-band component generated in said time high-band signal generating step for the weighting performed at the time of coding, and this weighted signal is output as a time high-band/space low-band signal.

24. The moving image decoding method according to claim 21, wherein said low-band signal generating step is a step of performing a low-band passing process by subband-division.

25. The moving image decoding method according to claim 21, wherein said space-synthesis filtering step is a step of performing a subband-synthesis that becomes an inverse transform of said subband-division.

26. The moving image decoding method according to claim 21, wherein said low-band signal generating step is a step of generating the reduced image by subsampling filter.

27. The moving image decoding method according to claim 21, wherein said space-synthesis filtering step is a step of synthesizing the high-band signal generated in a second subsampling filter to which said subsampling filter forms a counterpart, and the low-band signal generated in said subsampling filter.

28. The moving image decoding method according to claim 21, wherein said time-directional inverse-filtering step is a step of, after motion-compensating said time low-band signal, synthesizing the time high-band signal and said time low-band signal to output it as a decoded-image signal.

29. A non-transitory computer-readable medium storing a controlling program of a moving image coding apparatus comprising a time/space-division filtering section for hierarchizing a moving image signal and a signal-coding processor for coding said hierarchized signals, wherein said controlling program causes said time/space-division filtering section to function as:
   a time-directional filtering section for filtering the moving image signal in a time direction, thereby to generate a time low-band signal, a time high-band signal, and motion information signifying motion between said image signals;
   a reduced-image generator for employing said time high-band signal and said time low-band signal, thereby to generate a reduced image signal to which the moving image signal corresponding to said time high-band signal was reduced; and
   a high-band signal generator for generating a time high-band/space high-band signal that is equivalent to a space high-band component for said time high-band signal; and
   said signal-coding processor codes said time low-band signal, said reduced decoded-image signal, said time high-band/space high-band signal, and said motion information after said time low-band signal or said reduced-image signal is processed by said time/space-division filtering section, thereby allowing the moving image signal to be hierarchized.

30. The non-transitory computer-readable medium according to claim 29, wherein said low-band signal generator performs a frequency-component extraction by subband-division.

31. The non-transitory computer-readable medium according to claim 29, wherein:
   said low-band signal generator generates the reduced-image signal with a first subsampling filter; and
   said high-band signal generator generates the high-band signal with a second subsampling filter to which said first subsampling filter forms a counterpart.

32. The non-transitory computer readable medium according to claim 29, wherein the controlling program causes said reduced-image generator to function as a motion compensator for motion-compensating the time low-band signal based upon the motion information, thereby to generate a predicted image;
   a time high-band signal inverse-transformer for generating a moving image signal that corresponds to said time high-band signal from said predicted image and the time high-band signal; and
   a low-band signal generator for performing a spatial filtering for the moving image signal generated in said time high-band signal inverse-transformer, thereby to generate a reduced decoded-image signal, being a space low-band component.

33. The non-transitory computer-readable medium according to claim 32, wherein the controlling program causes the moving image coding apparatus to function as a weighter for performing a weighting process for said time high-band signal as compared with said time low-band signal, or for performing a weighting process for a certain part of said time high-band signal to output it to said time high-band signal inverse-transformer.

34. A non-transitory computer-readable medium storing a controlling program of a moving image decoding apparatus comprising a signal-decoding processor for decoding coded data of a moving image signal for which hierarchy coding has been performed, thereby to generate hierarchized signals, and a time/space-synthesis filtering section for synthesizing said hierarchized signals, wherein said controlling program causes said time/space-synthesis filtering section to function so as to perform a space-directional frequency synthesis and a time-direction frequency synthesis, thereby to generate a decoded image signal in a resolution-hierarchy of which the resolution is higher by one stage after generating a space low-band component by space hierarchizing, out of time high-band components by time hierarchizing, based upon a decoded-image signal, being a decoding result in a certain resolution-hierarchy.

35. A non-transitory computer-readable medium storing a controlling program of a moving image decoding apparatus comprising a signal-decoding processor for decoding coded data, thereby to generate hierarchized signals, and a time/space-synthesis filtering section for synthesizing hierarchized image signals, wherein said controlling program causes said time/space-synthesis filtering section to function as:
　a time high-band/space low-band signal reconfigurer for generating, from a time low-band signal and a reduced decoded-image signal, being a synthesis result in a certain resolution-hierarchy, a time high-band/space low-band signal, being a space high-band component of a time high-band signal that forms a counterpart to said time low-band signal;
　a space-synthesis filtering section for synthesizing a time high-band/space high-band signal, being a space high-band component of said time high-band signal, and said time high-band/space low-band signal, thereby to generate a time high-band signal; and
　a time-directional inverse-filtering section for generating a decoded-image signal from said time high-band signal, said time low-band signal, and motion information signifying motion between an image signal;
　a reduced-image generator for employing said time high-band signal and said time low-band signal, thereby to generate a reduced image signal to which the moving image signal corresponding to said time high-band signal was reduced; and
　said signal-decoding processor decodes said time low-band signal, said reduced decoded-image signal, said time high-band/space high-band signal, and said motion information from said coded data.

36. The non-transitory computer-readable medium according to claim 35, wherein after said time-directional inverse-filtering section motion-compensates said time low-band signal, it synthesizes the high-band signal and said time low-band signal to output it as a decoded image signal.

37. The non-transitory computer-readable medium according to claim 35, wherein said controlling program causes said time high-band/space low-band signal reconfigurer to function as:
　a motion compensator for motion-compensating said time low-band signal based upon said motion information, thereby to generate a predicted image;
　a low-band signal generator for generating a space low-band predicted-signal, being a space low-band component of said predicted image; and
　a time high-band signal generator for generating a time high-band component from said space low-band predicted-signal and the reduced decoded-image signal; and
　said time high-band/space low-band signal reconfigurer outputs an output of said time high-band signal generator as a time high-band/space low-band signal.

38. The non-transitory computer-readable medium according to claim 37, wherein said controlling program causes said moving image coding apparatus to function as an inverse weighter for performing a weighting process of compensating an output of said time high-band signal generator for the weighting performed at the time of coding; and
　said moving image coding apparatus outputs an output of said inverse weighter as a time high-band/space low-band signal.

39. The non-transitory computer-readable medium according to claim 37, wherein said low-band signal generator performs a low-band passing process by subband-division.

40. The non-transitory computer-readable medium according to claim 37, wherein said space-synthesis filtering section performs a subband-synthesis that becomes an inverse transform of said subband-division.

41. The non-transitory computer-readable medium according to claim 37, said low-band signal generator generates the reduced image by a subsampling filter.

42. The non-transitory computer-readable medium according to claim 37, wherein said space-synthesis filtering section synthesizes a high-band signal generated in a second subsampling filter to which said subsampling filter forms a counterpart, and a low-band signal generated by said subsampling filter.

* * * * *